United States Patent
Taniguchi

(10) Patent No.: US 7,317,713 B2
(45) Date of Patent: Jan. 8, 2008

(54) BIDIRECTIONAL DIGITAL WIRELESS SYSTEM TRANSMITTING AND RECEIVING ASYMMETRIC FRAMES

(75) Inventor: Shohei Taniguchi, Kanagawa-ken (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 1036 days.

(21) Appl. No.: 10/353,704

(22) Filed: Jan. 29, 2003

(65) Prior Publication Data

US 2003/0142649 A1   Jul. 31, 2003

(30) Foreign Application Priority Data

Jan. 30, 2002  (JP) ............................. 2002-022189

(51) Int. Cl.
  *H04J 3/00*  (2006.01)
  *H04J 3/24*  (2006.01)
  *H04L 12/28* (2006.01)
(52) U.S. Cl. ................. 370/345; 370/389; 370/473
(58) Field of Classification Search .............. None
  See application file for complete search history.

(56) References Cited

U.S. PATENT DOCUMENTS

| | | | |
|---|---|---|---|
| 5,719,859 A | | 2/1998 | Iwamoto et al. |
| 5,794,124 A | * | 8/1998 | Ito et al. ................. 340/7.44 |
| 5,959,982 A | | 9/1999 | Federkins et al. |
| 6,044,086 A | | 3/2000 | Albrow et al. |
| 6,925,068 B1 | * | 8/2005 | Stanwood et al. .......... 370/329 |

FOREIGN PATENT DOCUMENTS

| | | |
|---|---|---|
| JP | 02-179140 | 7/1990 |
| JP | 11-055226 | 2/1999 |
| JP | 2001-298401 | 10/2001 |

OTHER PUBLICATIONS

"Universal Mobile Telecommunications System (UMTS); Physical Channels and Mapping of Transport Channels Onto Physical Channels" ETSI TS 125 221 V3.7.0, Jun. 30, 2001, XP0002256457. p. 9, paragraph 5.1—p. 10.

(Continued)

*Primary Examiner*—Huy D. Vu
*Assistant Examiner*—Nittaya Juntima
(74) *Attorney, Agent, or Firm*—Pearne & Gordon LLP

(57) ABSTRACT

Herein disclosed is a bidirectional digital wireless system transmitting and receiving asymmetric transmission frames comprising: a mobile station for transmitting a plurality of uplink transmission frames each including a guard frame portion and a data frame portion carrying a main information segment; and a base station for receiving the uplink transmission frames, and generating and transmitting a plurality of downlink transmission frames each including an information frame element carrying a subsidiary information segment to the mobile station, whereby the base station is operative to divide the information frame element into a predetermined number of information frame portions respectively corresponding to the guard frame portions of the uplink transmission frame with respect to time length, and generate and transmit a plurality of downlink transmission frames each including the information frame portions collectively forming an information frame element carrying a subsidiary information segment to the mobile station.

21 Claims, 21 Drawing Sheets

OTHER PUBLICATIONS

"Universal Mobile Telecommunications system (UMTS); Multiplexing and Channel Coding (TDD)" ETSI TS 125 222 v3.2.1, May 31, 2000, XP002256458. p. 20, paragraph 4.2.6.

3GPP TS 25.222 V3.2.1 (May 2000), Technical Specification: 3rd Generation Partnership Project; Technical Specification Group Radio Access Network; Multiplexing and channel coding (TDD)(Release 1999).

3GPP TS 25.221 V3.7.0 (Jun. 2001), Technical Specification: 3rd Generation Partnership Project; Technical Specification Group Radio Access Network; Physical channels and mapping of transport channels onto physical channels (TDD)(Release 1999).

Japanese Office Action dated Jun. 12, 2007.

* cited by examiner

BIDIRECTIONAL DIGITAL WIRELESS SYSTEM TRANSMITTING AND RECEIVING ASYMMETRIC FRAMES

BACKGROUND OF INVENTION

1. Field of the Invention

The present invention relates to a bidirectional digital wireless system transmitting and receiving asymmetric transmission frames, and more particularly to a bidirectional digital wireless system transmitting and receiving uplink transmission frames and downlink transmission frames wherein the downlink transmission frames are asymmetric to the respective uplink transmission frames with respect to time length.

2. Description of the Related Art

Up until now, there have been proposed a wide variety of bidirectional digital wireless systems, one typical type of which is disclosed in Japanese Laid-Open Patent Application No. H10-150692. Such conventional bidirectional digital wireless system is shown in FIG. 20 as comprising a conventional mobile station 1 and a conventional base station 2.

As shown in FIG. 20, the conventional mobile station 1 comprises a microphone 3, an analog sound signal processing circuit 4, an A-D converter 5, a noise canceller 6, a sound encoding unit 7, an ECC encoding unit 8, a digital modulating unit 9, a sound information transmitting high frequency circuit 10, hereinlater simply referred to as "a sound information transmitting HF circuit 10", a radio frequency transmitting and receiving switching unit 11, hereinlater simply referred to as "a RF transmitting and receiving switching unit 11", a transmitting antenna 61A, a control information receiving high frequency circuit 12, a demodulating unit 13, a system controller 14, a power supply circuit 15, a battery 16, a state indicating unit 17, and a mode switching unit 18.

The microphone 3 is operative to collect an analog sound signal s1 to be converted to an electric signal, i.e., a microphone output signal s2 containing sound components. The analog sound signal processing circuit 4 is operative to process the microphone output signal s2 in terms of, for example, a signal level to output an analog sound signal s3. The A-D converter 5 is operative to convert the analog sound signal s3 into a PCM digital signal s4. The noise canceller 6 is operative to input the PCM digital signal s4 from the A-D converter 5 and cancel noise components such as, for example, ambient noises, from the PCM digital signal s4 to output a noise canceller output s5. The sound encoding unit 7 is operative to encode the noise canceller output s5 into a sound compressed signal s6 at a bit rate lower than that of the noise canceller output s5. The sound encoding unit 7 carries out a Variable Bit Rate (VBR) encoding method. Preferably, the sound encoding unit 7 may encode the noise canceller output s5 into the sound compressed signal s6 in an encoding manner such as, for example, subband encoding, ADPCM (Adaptive Differential Pulse Code Modulation) encoding, or subband ADPCM encoding, so as to realize a delay time appropriate for use of, for example, amplifying the sound components contained in the signal. The ECC encoding unit 8 is operative to perform error correcting coding, interleave process, and, if necessary, error detecting coding to the sound compressed signal s6, and then perform line coding to thus processed sound compressed signal s6 by adding information necessary for transmission such as, for example, bidirectional communication, line connection and synchronous processing to output a transmission frame signal s7. The digital modulating unit 9 is operative to modulate and convert from digital to analog forms the transmission frame signal s7 to output a digital modulated signal s8. The digital modulating unit 9 may modulate the transmission frame signal s7 in a manner such as, for example, δ/4 PSK (Phase-Shift Keying), 8 PSK, MSK (Minimum Shift Keying), or QAM (Quadrature Amplitude Modulation) modulation. Furthermore, the digital modulating unit 9 is operative to limit a bandwidth of the transmission frame signal s7 by means of, for example, Nyquist filtering or Gaussian filtering to prevent interference between codes. In general, the digital modulating unit 9 is operative to allocate bandwidths to uplink and downlink traffics evenly. It is needless to mention that the digital modulating unit 9 may adjust a bandwidth ratio of a bandwidth to be allocated to uplink traffic, viz., "uplink bandwidth" to a bandwidth to be allocated to downlink traffic, viz., "downlink bandwidth" to any value.

Alternatively, digital processes performed by the sound encoding unit 7, the ECC encoding unit 8, and the digital modulating unit 9 may be integrally carried out by a single process such as, for example, a Trellis coding process. The sound information transmitting HF circuit 10 is operative to have the digital modulated signal s8 carried on a carrier frequency of a transmission channel, and then limit a bandwidth of and amplify to a predetermined transmission level the digital modulated signal s8 thus carried on the carrier frequency of the transmission channel to generate a sound information transmission output signal s9.

The RF transmitting and receiving switching unit 11 is operative to extract a receiving control signal d4 from the sound information transmission output signal s9 in accordance with the mobile system control signal ctx14 outputted from the system controller 14A and output the receiving control signal d4 to the control information receiving HF circuit 12. This means that the RF transmitting and receiving switching unit 11 is operative to control a timing of the sound information transmission output signal s9 on the basis of the mobile system control signal ctx14 outputted from the system controller 14A with respect to a time scale in a Time Division Multiplex (TDM) bidirectional system to extract the receiving control signal d4 while, on the other hand, the RF transmitting and receiving switching unit 11 is operative to control a timing of the sound information transmission output signal s9 by means of, for example, frequency filtering, or coupling circuits, in a Frequency Division Multiplex bidirectional system to extract the receiving control signal d4. The sound information transmission output signal s9 is then emitted to the air through the transmitting antenna 51A. The sound information transmission output signal s9 is received by the base station 2.

The sound information transmission output signal s9 is received by the conventional base station 2.

As best shown in FIG. 20, the conventional base station 2 comprises a receiving antenna 61B, a radio frequency transmitting and receiving switching unit 20, hereinlater simply referred to as "RF transmitting and receiving switching unit 20", a sound information receiving high frequency circuit 21, hereinlater simply referred to as a "sound information receiving HF circuit 21", a digital demodulating unit 22, a ECC decoding unit 23, a sound decoding unit 24, a D-A converter 25, an analog sound processing circuit 26, an analog sound output terminal 27, a control information transmitting high frequency circuit 28, a modulating unit 29, a system controller 30, a power supply circuit 31, an external power input terminal 32, an external power source p3, a mode switching unit 33, state indicating unit 34, a digital sound information outputting unit 35, and an external control data I/O unit 36.

The receiving antenna 61B of base station 2 is operative to receive sound information transmission output signal s9 and output a sound information receiving input signal s12 to the RF transmitting and receiving switching unit 20. The RF transmitting and receiving switching unit 20 is operative to receive the sound information receiving input signal s12 in a reverse manner to the RF transmitting and receiving switching unit 11 of the conventional mobile station 1 as described hereinearlier to output the sound information receiving input signal s12. The sound information receiving HF circuit 21 is operative to amplify the sound information receiving input signal s12 to a predetermined level and limit a bandwidth of the sound information receiving input signal s12 to output a baseband signal s13. The sound information receiving HF circuit 21 may process the sound information receiving input signal s12 by means of, for example, double/single super heterodyne system, or direct conversion system. Furthermore, the baseband signal s13 may be obtained by means of intermediate frequency D-A converting method such as, for example, IF (Intermediate Frequency) sampling.

The digital demodulating unit 22 is operative to demodulate the base band signal s13 to output a digital demodulated signal s14.

With regard to the processes performed by sound information receiving HF circuit 21 and the digital demodulating unit 22, space diversity may be carried out. This means that the conventional base station 2 may comprise a plurality of sound information receiving HF circuits 21 and digital demodulating units 22 wherein the numbers of sound information receiving HF circuits 21 and digital demodulating units 22 are equal to the number of diversity branches.

The ECC decoding unit 23 is operative to detect and analyze the information added in the digital demodulated signal s14. The ECC decoding unit 23 is operative to perform de-interleave, error detecting and correcting processes to the digital demodulated signal s14 with reference to the information thus detected and analyzed to output an error corrected signal s15. The sound decoding unit 24 is operative to decode the error corrected signal s15 into a reconstructed PCM digital signal s16. The sound decoding unit 24 carries out a Variable Bit Rate (VBR) decoding method.

The D-A converter 25 is operative to convert the reconstructed PCM digital signal s16 from digital to analog forms to output a D-A converted output signal s17. The analog sound processing circuit 26 is operative to amplify the D-A converted output signal s17 to a predetermined level to output an analog sound signal s18 through the analog sound output terminal 27 from the conventional base station 2.

The sound information transmission output signal s9 emitted from the conventional mobile station 1 and the sound information receiving input signal s12 outputted from the RF transmitting and receiving switching unit 20 of the conventional base station 2 will be hereinlater simply referred to as "uplink information" and "downlink information" in the bidirectional communication system, respectively.

The system controller 14 of the conventional mobile station 1 is operative to manage each of elements constituting the conventional mobile station 1 by inputting and outputting mobile system control signals ctx1 through ctx14 from and to the constituent elements including the microphone 3 through the mode switching unit 18.

Similarly, the system controller 30 of the conventional base station 2 is operative to manage each of elements constituting the conventional base station 2 by inputting and outputting base system control signals crx1 through ctx16 from and to the constituent elements including the antenna 61B through the external control data I/O unit 36.

The description hereinlater will be directed to bidirectional transmission frames transmitted and received between the conventional mobile station 1 and the conventional base station 2 with reference to FIG. 21.

The transmission frame signal s7 generated by the ECC encoding unit 8 and to be inputted to the digital modulating unit 9 is shown in FIG. 21 as comprising an uplink transmission frame, hereinlater simply referred to as "UL transmission frame no.1P", and a downlink transmission frame, hereinlater simply referred to as "DL transmission frame no. 2P". The UL transmission frame no.1P carries main information transmitted from the conventional mobile station 1 to the conventional base station 2 through an uplink transmission line, hereinlater simply referred to as "uplink" and the DL transmission frame no. 2P carries subsidiary information transmitted from the conventional base station 2 to the conventional mobile station 1 through a downlink transmission line, hereinlater simply referred to as "downlink" wherein the main information and the subsidiary information are transmitted by Time Division Multiplexing.

The UL transmission frame no.1P and the DL transmission frame no. 2P include preamble frame portions UL-Pre and DL-Pre, unique word frame portions UL-UW and DL-UW, and control information frame portions UL-Ctrl and DL-Ctrl, respectively. The UL transmission frame no. 1P further includes a main information frame portion UL-Data.

The downlink control information frame portion DL-Ctrl of the DL transmission frame no. 2P may include a pilot signal indicating a receive level as transmit power control information to be used in open loop power control.

The UL transmission frame no.1P and the DL transmission frame no. 2P further include bidirectional guard frame portions DLGuard and ULGuard, respectively. The guard frame portions should be designed to be inserted in the respective transmission frames in consideration of various factors such as, for example, delay times resulting from operations performed in high frequency circuits and radio transmission paths. The main information segment may be, for example, a sound signal segment, which is required to be replayed immediately. The subsidiary information segment d12 may be, for example, an instruction to execute a function or to implement a mode, which is to be visually indicated, and not required to be replayed immediately. Preferably, the frame length of an uplink transmission frame should be 1 to 2 milliseconds or less to realize a requirement of a wireless microphone system for real time replay. The downlink transmission frame is equal to the uplink transmission frame with respect to time length. In other words, the uplink transmission frame is "symmetric" to the downlink transmission frame with respect to time length. This means the frame length of a downlink transmission frame is equal to that of the uplink transmission frame, which should be 1 to 2 milliseconds or less.

The conventional bidirectional digital wireless system, however, encounters a drawback that the conventional bidirectional digital wireless system degrades a frequency utilization efficiency due to the fact that a large amount of downlink information is required to be transmitted on the downlink transmission frame, which is symmetric to the uplink transmission frame with respect to time length, and therefore not optimized to transmit the large amount of information.

The conventional bidirectional digital wireless system encounters another drawback that the conventional bidirectional digital wireless system degrades a frequency utilization efficiency when mobile station transmission power control of open loop type is executed due to the fact that a plurality of unmodulated pilot signals are required to be separately transmitted on the downlink transmission frame, which is symmetric to the uplink transmission frame with respect to time length, and therefore not optimized to transmit the downlink transmission frame containing the unmodulated pilot signals.

Furthermore, the conventional bidirectional digital wireless system encounters another drawback that the conventional bidirectional digital wireless system degrades a frequency utilization efficiency when error correcting, time diversity transmission, or automatic retransmission request process is executed to ensure reliable quality of downlink information due to the increase in an amount of control information to be transmitted on the uplink transmission frame and a downlink transmission frame.

SUMMARY OF THE INVENTION

It is therefore an object of the present invention to provide a bidirectional digital wireless system transmitting and receiving uplink and downlink transmission frames wherein uplink transmission frames are asymmetric to respective downlink transmission frames with respect to time length in order to satisfy respective requirements for replay time so as to reliably and efficiently transmit downlink information as well as to enhance frequency utilization efficiency.

In accordance with a first aspect of the present invention, there is provided a bidirectional digital wireless system transmitting and receiving asymmetric transmission frames comprising: a mobile station for generating and transmitting a plurality of uplink transmission frames each including a guard frame portion and a data frame portion carrying a main information segment in a time division demultiplexing manner; the guard frame portion and the data frame portion being separated from each other with respect to time length; and a base station for receiving the uplink transmission frames, and generating and transmitting a plurality of downlink transmission frames each including an information frame element carrying a subsidiary information segment to the mobile station with reference to the uplink transmission frames in the time division demultiplexing manner, whereby the base station is operative to divide the information frame element into a predetermined number of information frame portions respectively corresponding to the guard frame portions of the uplink transmission frames with respect to time length, and generate and transmit a plurality of downlink transmission frames each including the information frame portions collectively forming an information frame element carrying a subsidiary information segment to the mobile station, and the mobile station is operative to receive the downlink transmission frame in a time division multiplexing manner so as to sequentially extract the information frame portions collectively forming the information frame element, and perform the subsidiary information segment in accordance with the information frame element thus extracted to ensure reliable and efficient communication with the base station.

In accordance with a second aspect of the present invention, the information frame element carrying the subsidiary information segment may include an index frame element indicative of a category of the subsidiary information segment and a state frame element indicative of a state of the subsidiary information segment in the aforesaid bidirectional digital wireless system transmitting and receiving asymmetric transmission frames, wherein the index frame element and the state frame element respectively have frame lengths. The mobile station and the base station may respectively comprise storage units each for storing a reference table showing the frame lengths of the state frame elements in association with the frame lengths of the index frame elements. The base station may generate and transmit a plurality of downlink transmission frames each including an information frame element including an index frame element and a state frame element with reference to the reference table stored in the storage unit. The mobile station may receive the downlink transmission frames in the time division multiplexing manner so as to sequentially extract the information frame portions collectively forming the information frame element, detect the index frame element, identify the frame lengths of, and detect the index frame element and the state frame element with reference to the reference table stored in the storage unit, and perform the subsidiary information segment in accordance with the index frame element and the state frame element thus identified and detected.

In accordance with a third aspect of the present invention, the base station of the aforesaid bidirectional digital wireless system transmitting and receiving asymmetric transmission frames may comprise: a downlink unique word generating unit for generating a downlink unique word signal carrying frame synchronization information; and a downlink information generating unit for generating a pilot signal indicative of transmit power control information, and superimposing the downlink unique word signal on the pilot signal to output a pilot frame element carrying the transmit power control information and the frame synchronization information. The base station is operative to generate and transmit a plurality of downlink transmission frames each including the information frame portions each of which contains the pilot frame element to the mobile station with reference to the uplink transmission frames. The mobile station is operative to receive the downlink transmission frames each including the information frame portions each of which contains the pilot frame element carrying the transmit power control information and the frame synchronization information from the base station in a time division multiplexing manner so as to sequentially extract the pilot frame element, and perform a transmit power control function and a frame synchronization function in accordance with each of the pilot frame elements to ensure reliable and efficient communication with the base station.

In the aforesaid bidirectional digital wireless system transmitting and receiving asymmetric transmission frames, the base station may divide the pilot frame element into a predetermined number of pilot frame fragments collectively forming the pilot frame element so as to generate and transmit a plurality of downlink transmission frames each including the information frame portions collectively forming the pilot frame element carrying the transmit power control information and the frame synchronization information. The mobile station is operative to receive the downlink transmission frames each including the information frame portions collectively forming the pilot frame element carrying the transmit power control information and the frame synchronization information from the base station in a time division multiplexing manner so as to sequentially extract the information frame portions, collectively reconstruct the pilot frame element, and perform a transmit power control function and a frame synchronization function in accordance with each pilot frame element to ensure reliable and efficient communication with the base station.

In accordance with a fourth aspect of the present invention, the base station of the aforesaid bidirectional digital wireless system may comprise: a downlink preamble signal generating unit for generating a downlink preamble signal carrying clock synchronizing information; and a downlink information generating unit for generating a pilot signal indicative of transmit power control information, and superimposing the downlink preamble signal on the pilot signal to output a preamble frame element carrying the transmit power control information and the clock synchronization information. The base station is operative to generate and transmit a plurality of downlink transmission frames each including the information frame portions each of which contains the preamble frame element to the mobile station with reference to the uplink transmission frames. The mobile station is operative to receive the downlink transmission frames each including the information frame portions each of which contains the preamble frame element carrying the transmit power control information and the clock synchronization information from the base station in a time division multiplexing manner so as to sequentially extract the preamble frame element, and perform a transmit power control function and a clock synchronization function in accordance with each of the preamble frame element to ensure reliable and efficient communication with the base station.

In accordance with a fifth aspect of the present invention, the base station of the bidirectional digital wireless system transmitting and receiving asymmetric transmission frames may comprise: a system state managing unit for generating a downlink information signal carrying a subsidiary information segment, and a downlink information generating unit for performing error correcting coding and time diversity transmission processes to the downlink information signal generated by the system state managing unit to generate a predetermined number of data frame portions to be time-divided into a plurality of data frame segments respectively corresponding to the guard frame portions of the uplink transmission frames, and output a downlink transmission frame including the data frame segments. The base station is operative to generate and transmit a plurality of downlink transmission frames each including the data frame segments. This means that the mobile station is operative to receive the downlink transmission frames including the data frame segments in a time division multiplexing manner so as to sequentially extract the predetermined number of data frame portions, perform time diversity receiving and error correcting decoding processes to the data frame portions thus extracted to select a data frame portion which agrees with a majority of the data frame portions from among the data frame portions thus extracted, and assume that the data frame portion thus selected accurately carries the subsidiary information segment from among the data frame portions, and perform the subsidiary information segment in accordance with the data frame portion thus extracted and selected to ensure reliable and efficient communication with the base station.

Alternatively, the base station of the bidirectional digital wireless system transmitting and receiving asymmetric transmission frames may comprise: a system state managing unit for generating a downlink information signal carrying a subsidiary information segment, and a downlink information generating unit for performing error detecting coding and time diversity transmission processes to the downlink information signal generated by the system state managing unit to generate a predetermined number of data frame portions to be time-divided into a plurality of data frame segments respectively corresponding to the guard frame portions of the uplink transmission frames, and output a downlink transmission frame including the data frame segments. The base station is operative to generate and transmit a plurality of downlink transmission frames each including the data frame segments. This means that the mobile station is operative to receive the downlink transmission frames including the data frame segments in a time division multiplexing manner so as to sequentially extract the predetermined number of data frame portions, perform time diversity receiving and error detecting decoding processes to the data frame portions thus extracted to judge whether a predetermined number of the data frame portions are equal to one another or not, select a data frame portion which agrees with a majority of the data frame portions from among the data frame portions thus extracted, and assume that the data frame portion accurately carries the subsidiary information segment when it is judged that the predetermined number of the data frame portions are equal to one another, and perform the subsidiary information segment in accordance with the data frame portion thus extracted and selected to ensure reliable and efficient communication with the base station, and discard the data frame portions when it is judged that the predetermined number of the data frame portions are not equal to one another.

In accordance with a sixth aspect of the present invention, the mobile station of the bidirectional digital wireless system transmitting and receiving asymmetric transmission frames is operative to judge whether the number of times to be performed for a time diversity receiving process thus currently counted is equal to the number of times to be performed for a time diversity receiving process previously counted and stored in the storage unit, determine the number of times to be performed for a time diversity receiving process previously counted and stored in the storage unit to be a number of times to be performed for a subsequent time diversity transmission process in the base station when it is judged that the number of times to be performed for a time diversity receiving process thus currently counted is equal to the number of times to be performed for a time diversity receiving process previously counted and stored in the storage, judge whether the number of times to be performed for a time diversity receiving process thus currently counted is greater than the number previously counted and stored in the storage unit when it is judges that the number of times to be performed for a time diversity receiving process thus currently counted is not equal to the number of times to be performed for a time diversity receiving process previously counted and stored in the storage, determine a number of times greater than the time diversity receiving process stored in the storage to be a number of times to be performed for a subsequent time diversity transmission process in the base station when it is judges that the number of times to be performed for a time diversity receiving process thus currently counted is greater the number of times to be performed for a time diversity receiving process previously counted and stored in the storage, and determine a number of times less than the time diversity receiving process stored in the storage to be a number of times to be performed for a subsequent time diversity transmission process in the base station when it is judges that the number of times to be performed for a time diversity receiving process thus currently counted is not greater the number of times to be performed for a time diversity receiving process previously counted and stored in the storage.

In accordance with a seventh aspect of the present invention, the mobile station of the bidirectional digital wireless system transmitting and receiving asymmetric transmission frames may comprise a receive level detecting unit for detecting a received power level. The mobile station is operative to calculate a distance between the mobile station and the base station with reference to the received power level detected by the receive level detecting unit, and determine a number of times to be performed for a subsequent time diversity transmission process in the base station on the basis of the distance thus calculated.

BRIEF DESCRIPTION OF THE DRAWINGS

The objects, features and advantages of the present invention will become apparent as the description proceeds when taken in conjunction with the accompanying drawings, in which.

DESCRIPTION OF THE PREFERRED EMBODIMENTS

Figure 1:
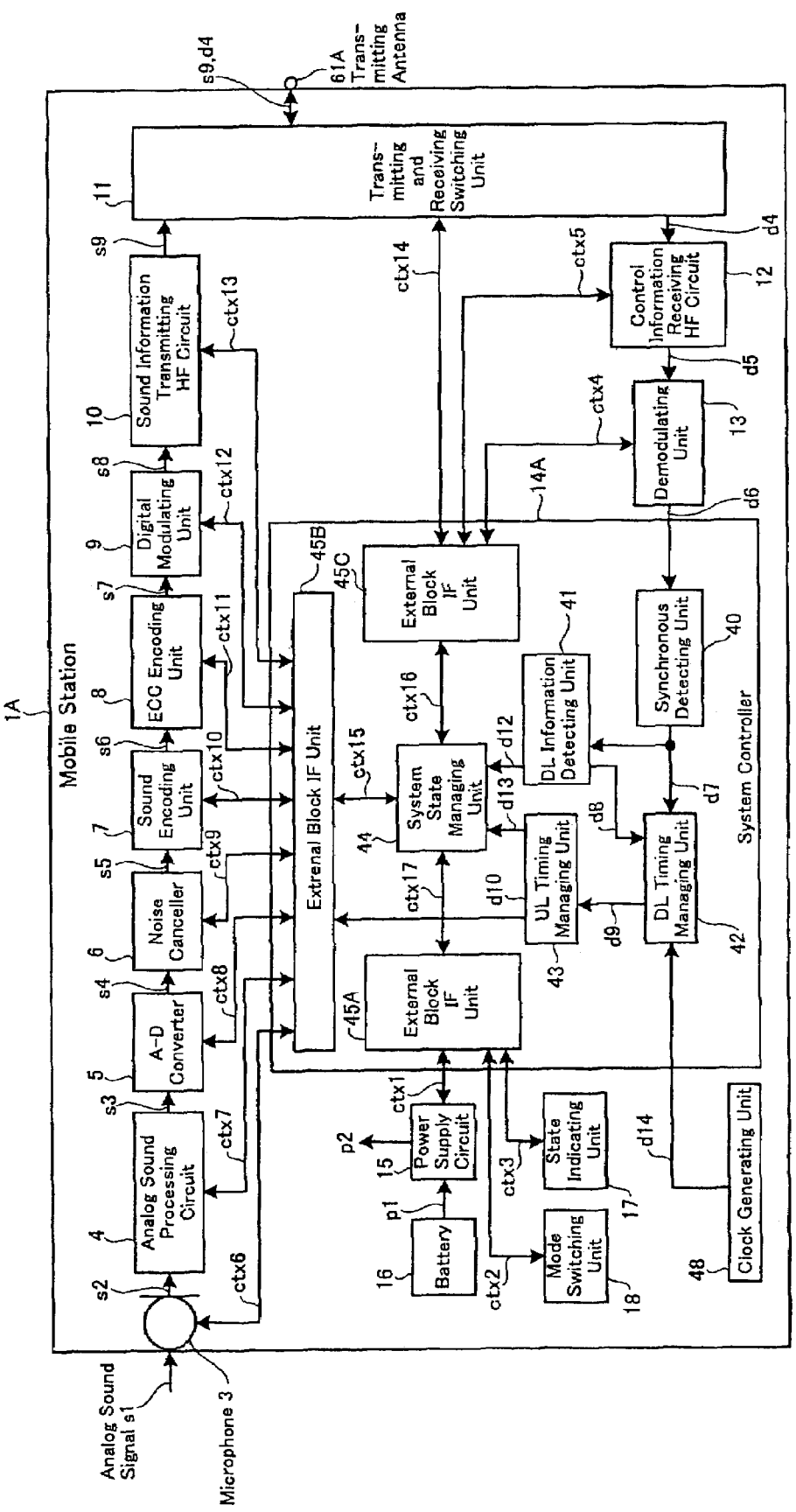
FIG. 1 is a block diagram of a mobile station constituting a first preferred embodiment of the bidirectional digital wireless system according to the present invention.

Throughout the following detailed description, similar reference characters and numbers refer to similar elements in all figures of the drawings.

Figure 2:
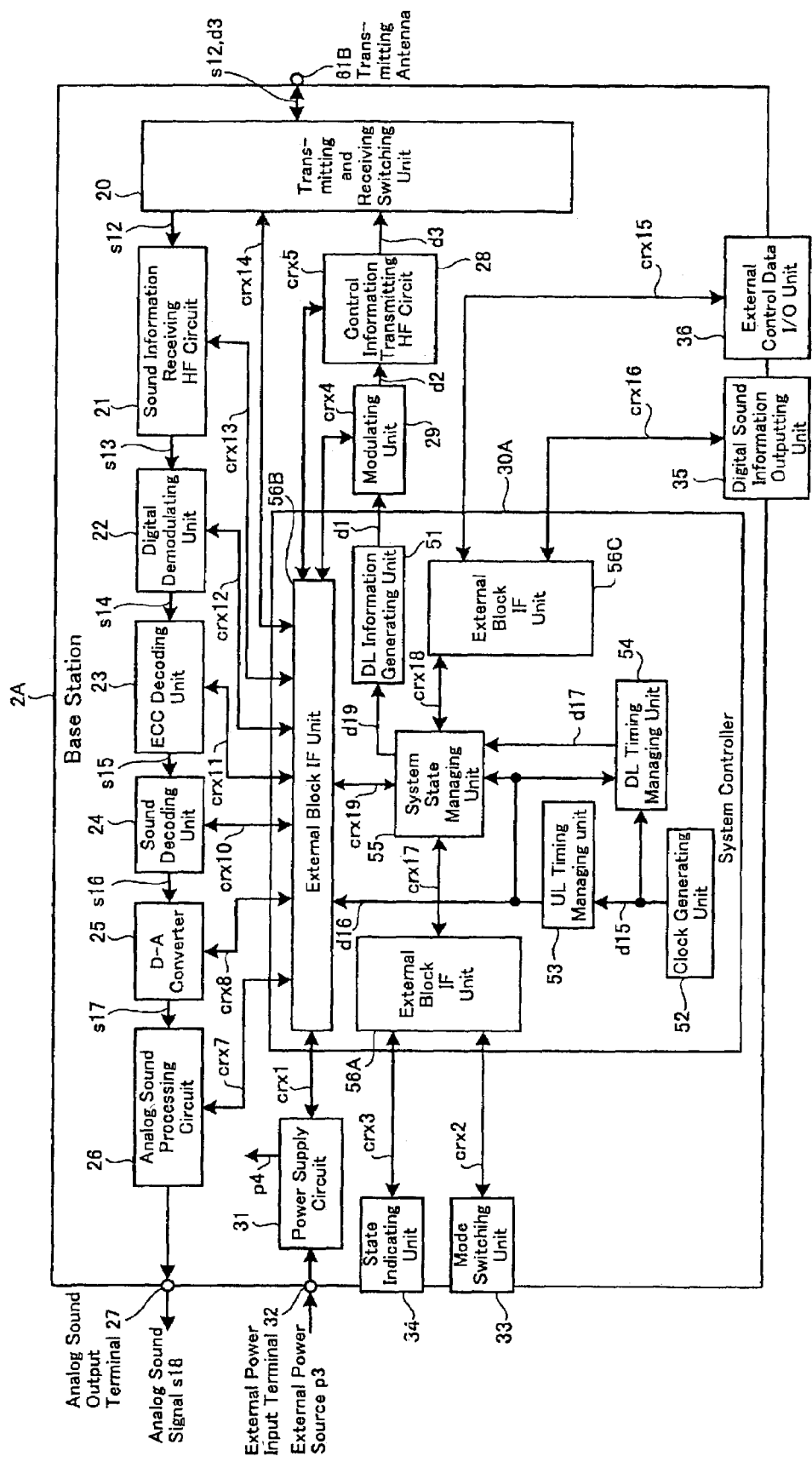
FIG. 2 is a block diagram of a base station constituting a first preferred embodiment of the bidirectional digital wireless system according to the present invention.
Figure 3:
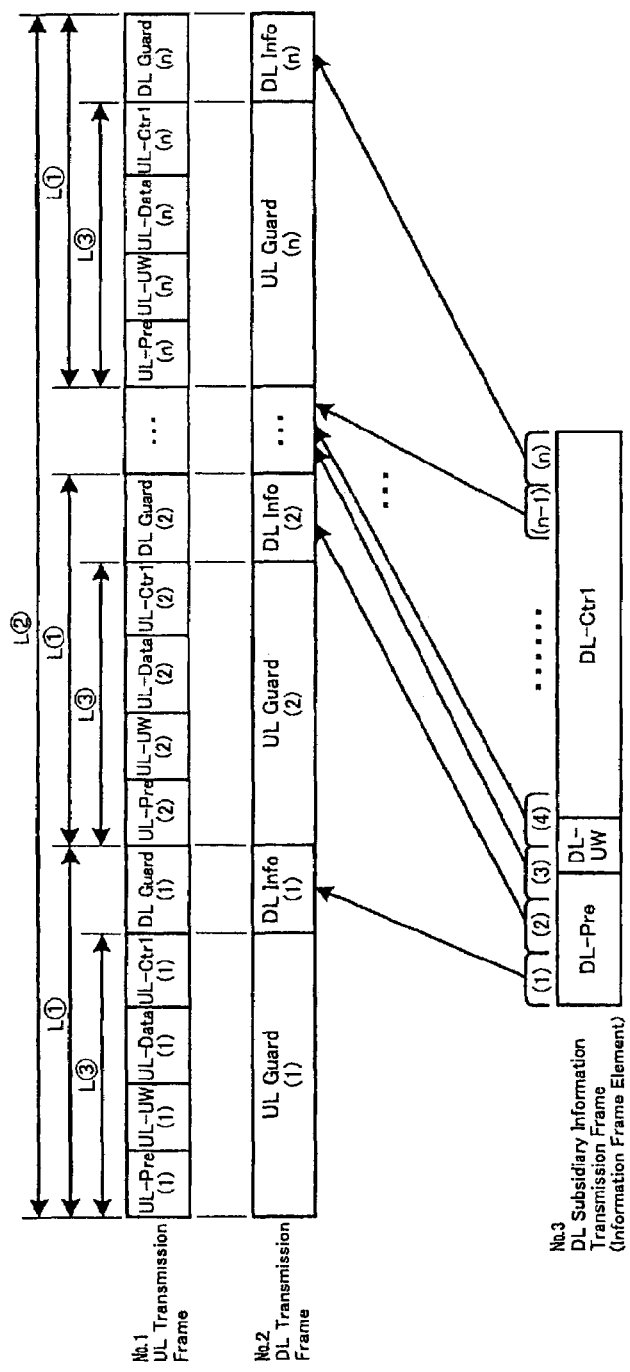
FIG. 3 is a block diagram explaining transmission frames transmitted and received between the mobile station and the base station constituting the first preferred embodiment of the bidirectional digital wireless system according to the present invention.

Referring now to FIGS. 1 through 3 of the drawings, there is shown a first preferred embodiment of the bidirectional digital wireless system transmitting and receiving asymmetric frames according to the present invention. The first preferred embodiment of the bidirectional digital wireless system comprises a mobile station 1A for generating and transmitting a plurality of uplink transmission frames carrying a main information segment, and a base station 2A for receiving the uplink transmission frames, and generating and transmitting a plurality of downlink transmission frames carrying a subsidiary information segment with reference to the uplink transmission frames.

The mobile station 1A constituting the first embodiment of the bidirectional digital wireless system according to the present invention is shown in FIG. 1 as comprising a microphone 3, an analog sound signal processing circuit 4, an A-D converter 5, a noise canceller 6, a sound encoding unit 7, an ECC encoding unit 8, a digital modulating unit 9, a sound information transmitting high frequency circuit 10, hereinlater referred to as "a sound information transmitting HF circuit 10", a radio frequency transmitting and receiving switching unit 11, hereinlater simply referred to as "RF transmitting and receiving switching unit 11", a transmitting antenna 61A, a control information receiving high frequency circuit 12, hereinlater simply referred to as a control information receiving HF circuit 12", a demodulating unit 13, a system controller 14A, a power supply circuit 15, a battery 16, a state indicating unit 17, and a mode switching unit 18.

The microphone 3 is adapted to collect an analog sound signal s1 to be converted to an electric signal, i.e., a microphone output signal s2 containing sound components contained in the signal. The analog sound signal processing circuit 4 is adapted to process the microphone output signal s2 in terms of, for example, a signal level to output an analog sound signal s3. The A-D converter 5 is adapted to convert the analog sound signal s3 into a PCM digital signal s4. The noise canceller 6 is adapted to input the PCM digital signal s4 from the A-D converter 5 and cancel noise components such as, for example, ambient noises, from the PCM digital signal s4 to output a noise canceller output s5. The sound encoding unit 7 is adapted to encode the noise canceller output s5 into a sound compressed signal s6 at a bit rate lower than that of the noise canceller output s5. The sound encoding unit 7 carries out a Variable Bit Rate (VBR) encoding method. Preferably, the sound encoding unit 7 may encode the noise canceller output s5 into the sound compressed signal s6 in an encoding manner such as, for example, subband encoding, ADPCM (Adaptive Differential Pulse Code Modulation) encoding, or subband ADPCM encoding, so as to realize a delay time appropriate for use of, for example, amplifying the sound components. The ECC encoding unit 8 is adapted to perform error correcting coding, interleave process, and/or, if necessary, error detecting coding to the sound compressed signal s6, and then perform line coding to thus processed sound compressed signal s6 by adding information necessary for transmission such as, for example, bidirectional communication, line connection and synchronous processing to output a transmission frame signal s7.

The digital modulating unit 9 is adapted to modulate and convert from digital to analog forms the transmission frame signal s7 to output a digital modulated signal s8. The digital modulating unit 9 may modulate the transmission frame signal s7 in a manner such as, for example, δ/4 PSK (Phase-Shift Keying), 8 PSK, MSK (Minimum Shift Keying), or QAM (Quadrature Amplitude Modulation) modulation. Furthermore, the digital modulating unit 9 is operative to limit a bandwidth of the transmission frame signal s7 by means of, for example, Nyquist filtering or Gaussian filtering to prevent interference between codes. The digital modulating unit 9 may adjust a bandwidth ratio of a bandwidth to be allocated to uplink traffic, i.e., "uplink bandwidth" to a bandwidth to be allocated to downlink traffic, i.e., "downlink bandwidth" to any value. Alternatively, digital processes performed by the sound encoding unit 7, the ECC encoding unit 8, and the digital modulating unit 9 may be integrally carried out by a single process such as, for example, a Trellis coding process. The sound information transmitting HF circuit 10 is adapted to have the digital modulated signal s8 carried on a carrier frequency of a transmission channel, and then limit a bandwidth of and amplify to a predetermined transmission level the digital modulated signal s8 thus carried on the carrier frequency of the transmission channel to generate a sound information transmission output signal s9.

The RF transmitting and receiving switching unit 11 is adapted to extract a receiving control signal d4 from the sound information transmission output signal s9 in accordance with the mobile system control signal ctx14 outputted from the system controller 14A and output the receiving control signal d4 to the control information receiving HF circuit 12. This means that the RF transmitting and receiving switching unit 11 is operative to control a timing of the sound information transmission output signal s9 on the basis of the mobile system control signal ctx14 outputted from the system controller 14A with respect to a time scale in a Time Division Multiplex (TDM) bidirectional system to extract the receiving control signal d4 while, on the other hand, the RF transmitting and receiving switching unit 11 is operative to control a timing of the sound information transmission output signal s9 by means of, for example, frequency filtering, or coupling circuits, in a Frequency Division Multiplex bidirectional system to extract the receiving control signal d4. The sound information transmission output signal s9 is then emitted to the air through the transmitting antenna 51A. The sound information transmission output signal s9 is received by the base station 2A.

The control information receiving HF circuit 12 is adapted to receive the receiving control signal d4 from the RF transmitting and receiving switching unit 11, and output a HF receiving control signal d5 to the demodulating unit 13. The demodulating unit 13 is adapted to demodulate the HF receiving control signal d5 to output a receiving control signal d6 to the system controller 14A.

The base station 2A constituting the first embodiment of the bidirectional digital wireless system according to the present invention is shown in FIG. 2 as comprising a receiving antenna 61B, a RF transmitting and receiving switching unit 20, a sound information receiving high frequency circuit 21, a digital demodulating unit 22, a ECC decoding unit 23, a sound decoding unit 24, a D-A converter 25, an analog sound processing circuit 26, an analog sound output terminal 27, a control information transmitting high frequency circuit 28, hereinlater simply referred to as "a control information transmitting HF circuit 28", a modulating unit 29, a system controller 30A, a power supply circuit 31, an external power input terminal 32, an external power source p3, a mode switching unit 33, a state indicating unit 34, a digital sound information outputting unit 35, and an external control data I/O unit 36.

The receiving antenna 61B of base station 2A is adapted to receive the sound information transmission output signal s9 and output a sound information receiving input signal s12 to the RF transmitting and receiving switching unit 20. The RF transmitting and receiving switching unit 20 is operative to receive the sound information receiving input signal s12 in a reverse manner to the RF transmitting and receiving switching unit 11 of the conventional mobile station 1 as described hereinearlier to output the sound information receiving input signal s12. The sound information receiving HF circuit 21 is adapted to amplify the sound information receiving input signal s12 to a predetermined level and limit a bandwidth of the sound information receiving input signal s12 to output a baseband signal s13. The sound information receiving HF circuit 21 may process the sound information receiving input signal s12 by means of, for example, double/single super heterodyne system, or direct conversion system. Furthermore, the baseband signal s13 may be obtained by means of intermediate frequency D-A converting method such as, for example, IF (Intermediate Frequency) sampling.

The digital demodulating unit 22 is adapted to demodulate the base band signal s13 to output a digital demodulated signal s14.

With regard to the processes performed by sound information receiving HF circuit 21 and the digital demodulating unit 22, space diversity may be carried out. This means that the base station 2A may comprise a plurality of sound information receiving HF circuits 21 and digital demodulating units 22 wherein the numbers of sound information receiving HF circuits 21 and digital demodulating units 22 are equal to the number of diversity branches.

The ECC decoding unit 23 is adapted to detect and analyze the information added in the digital demodulated signal s14. The ECC decoding unit 23 is adapted to perform de-interleave, error detecting and correcting processes to the digital demodulated signal s14 with reference to the information thus detected and analyzed to output an error corrected signal s15. The sound decoding unit 24 is adapted to decode the error corrected signal s15 into a reconstructed PCM digital signal s16. The sound decoding unit 24 carries out a Variable Bit Rate (VBR) decoding method.

The D-A converter 25 is adapted to convert the reconstructed PCM digital signal s16 from digital to analog forms to output a D-A converted output signal s17. The analog sound processing circuit 26 is adapted to amplify the D-A converted output signal s17 to a predetermined level to output an analog sound signal s18 through the analog sound output terminal 27 from the base station 2A.

The sound information transmission output signal s9 emitted from the mobile station 1A and the sound information receiving input signal s12 outputted from the RF transmitting and receiving switching unit 20 of the base station 2A will be hereinlater simply referred to as "uplink information" and "downlink information" in the bidirectional communication system, respectively.

The system controller 14A of the mobile station 1A is adapted to manage each of elements constituting the mobile station 1A by inputting and outputting mobile system control signals ctx1 through ctx14 from and to the constituent elements including the microphone 3 through the mode switching unit 18. The system controller 14A is adapted to input, for example, mobile system control signal ctx1 from and output the mobile system control signal ctx1 to the power supply circuit 15 to manage the power supply circuit 15, input mobile system control signal ctx2 from and output the mobile system control signal ctx2 to the mode switching unit 18 to manage the mode switching unit 18, input mobile system control signal ctx3 from and output the mobile system control signal ctx3 to the state indicating unit 17 to manage the state indicating unit 17, input mobile system control signal ctx4 from and output the mobile system control signal ctx4 to the demodulating unit 13 to manage the demodulating unit 13, input mobile system control signal ctx5 from and output the mobile system control signal ctx5 to the control information receiving HF circuit 12 to manage the control information receiving HF circuit 12, input mobile system control signal ctx6 from and output the mobile system control signal ctx6 to the microphone 3 to manage the microphone 3, input mobile system control signal ctx7 from and output the mobile system control signal ctx7 to the analog sound signal processing circuit 4 to manage the analog sound signal processing circuit 4, input mobile system control signal ctx8 from and output the mobile system control signal ctx to the A-D converter 5 to manage the A-D cqnverter 5, input mobile system control signal ctx9 from and output the mobile system control signal ctx9 to the noise canceller 6 to manage the noise canceller 6, input mobile system control signal ctx10 from and output the mobile system control signal ctx10 to the sound encoding unit 7 to manage the sound encoding unit 7, input mobile system control signal ctx11 from and output the mobile system control signal ctx11 to the ECC encoding unit 8 to manage the ECC encoding unit 8, input mobile system control signal ctx12 from and output the mobile system control signal ctx12 to the digital modulating unit 9 to manage the digital modulating unit 9, input mobile system control signal ctx13 from and output the mobile system control signal ctx13 to the sound information transmitting HF circuit 10 to manage the sound information transmitting HF circuit 10, and input mobile system control signal ctx14 from and output the mobile system control signal ctx14 to the RF transmitting and receiving switching unit 11 to manage the RF transmitting and receiving switching unit 11.

More specifically, the system controller 14A comprises a synchronous detecting unit 40, a downlink information detecting unit 41, a downlink timing managing unit 42, an uplink timing managing unit 43, a system state managing unit 44, and external block interface units 45A, 45B, and 45C.

Similarly, the system controller 30A of the base station 2A is adapted to manage each of elements constituting the base station 2A by inputting and outputting base system control signals crx1 through crx16 from and to the constituent elements including the antenna 61B through the external control data I/O unit 36. The system controller 30A is adapted to input, for example, base system control signal crx1 from and output the base system control signal crx1 to the power supply circuit 31 to manage the power supply circuit 31, input base system control signal crx2 from and output the base system control signal crx2 to the mode switching unit 33 to manage the mode switching unit 33, input base system control signal crx3 from and output the base system control signal crx3 to the state indicating unit 34 to manage the state indicating unit 34, input base system control signal crx4 from and output the base system control signal crx4 to the modulating unit 29 to manage the modulating unit 29, input base system control signal crx5 from and output the base system control signal crx5 to the control information transmitting HF circuit 28 to manage the control information transmitting HF circuit 28, input base system control signal crx7 from and output the base system control signal crx7 to the analog sound processing circuit 26 to manage the an analog sound processing circuit 26, input base system control signal crx8 from and output the base system control signal crx8 to the D-A converter 25 to manage the D-A converter 25, input base system control signal crx9 from and output the base system control signal crx10 to the sound decoding unit 24 to manage the sound decoding unit 24, input base system control signal crx11 from and output the base system control signal crx11 to the ECC decoding unit 23 to manage the ECC decoding unit 23, input base system control signal crx12 from and output the base system control signal crx12, to the digital demodulating unit 22 to manage the digital demodulating unit 22, input base system control signal crx13 from and output the base system control signal crx13 to sound information receiving HF circuit 21 to manage the sound information receiving HF circuit 21, input base system control signal crx14 from and output the base system control signal crx14 to the RF transmitting and receiving switching unit 20 to manage the RF transmitting and receiving switching unit 20, input base system control signal crx15 from and output the base system control signal crx15 to the external control data I/O unit 36 to manage the external control data I/O unit 36, and input base system control signal crx16 from and output the base system control signal crx16 to the digital sound information outputting unit 35 to manage the digital sound information outputting unit 35.

More specifically, the system controller 30A of the base station 2A comprises a downlink information generating unit 51, a clock generating unit 52, an uplink timing managing unit 53, a downlink timing managing unit 54, a system state managing unit 55, and external block interface units 56A, 56B, and 56C.

In the bidirectional digital wireless system transmitting and receiving asymmetric frames according to the present invention, the mobile station 1A is operative to generate and transmit a plurality of uplink transmission frames L1 each including a guard frame portion DL-Guard and a data frame portion UL-DATA carrying a main information segment in a publicly-known time division demultiplexing manner wherein the guard frame portion DL-Guard and the data frame portion UL-DATA are separated from each other with respect to time, and a base station 2A is operative to receive the uplink transmission frames L1, and generate and transmit a plurality of downlink transmission frames L2 each including an information frame element d1 carrying a subsidiary information segment to the mobile station 1A with reference to the uplink transmission frames L1 in the publicly-known time division demultiplexing manner.

The description hereinlater will be directed to a process of generating a plurality of downlink transmission frames L2 performed in the base station 2A with reference to the drawings shown in FIGS. 2 and 3.

The mode switching unit 33 is operative to input an operation signal for switching a mode, and output a base system control signal crx2 to the system controller 30A. The state indicating unit 34 is operative to input an operation signal for indicating a state and output a base system control signal crx3 to the system controller 30A. The external control data I/O unit 36 is operative to input an external control data and output a base system control signal crx 15 to the system controller 30A. The digital sound information outputting unit 35 is operative to input digital sound information and output a base system control signal crx 16.

More specifically, the base system control signal crx2 outputted by the mode switching unit 33 and the base system control signal crx3 outputted by the state indicating unit 34 are inputted to the system state managing unit 55 through the external block IF unit 56A as a base system control signal crx 17. The base system control signal crx 15 outputted by the external control data I/O unit 36 and the base system control signal crx 16 outputted by the digital sound information outputting unit 35 are inputted to the system state managing unit 55 through the external block IF unit 56C as a base system control signal crx 18.

The system state managing unit 55 is operative to input base system control signals crx 4, 5, 7 to 14, from the modulating unit 29, the control information transmitting HF circuit 28, the analog sound processing circuit 26, the D-A converter 25, the sound decoding unit 24, the ECC decoding unit 23, the digital demodulating unit 22, the sound information receiving HF circuit 21, and the RF transmitting and receiving switching unit 20 through the external block IF unit 56B as a base system control signal crx19.

The clock generating unit 52 is operative to generate a reference clock signal d15 to be used as a reference time signal. The UL timing managing unit 53 is operative to manage timings of uplink transmission frames in accordance with the reference clock signal d15 generated by the clock generating unit 52 and output an uplink timing information signal d16.

The DL timing managing unit 54 is operative to manage timings of downlink transmission frames in accordance with the reference clock signal d15 generated by the clock generating unit 52 and the UL timing information signal d16 generated by the UL timing managing unit 53 and output a downlink timing information signal d17.

The system state managing unit 55 is operative to input base system control signals crx 17, 18, and 19, UL timing information signal d16, and DL timing information signal d17. The system state managing unit 55 is operative to extract information segments contained in the base system control signals crx 17, 18, and 19, arrange the information segments thus extracted one after another in consideration of important factors such as, for example, need, priority, and emergency degree, and to generate and output a plurality of downlink information signals d19 each carrying a information segment in accordance with the timings indicated by the downlink timing information signal d17.

The DL information generating unit 51 is operative to input the downlink information signal d19 from the system state managing unit 55 to generate an information frame element.

The information frame element is shown in FIG. 3 as designated by No. 3 DL subsidiary information transmission frame and comprising a preamble signal DL-Pre, a unique word signal UL-DW, and a data frame segment UL Ctrl. The preamble signal DL-Pre is a preamble signal to be used for downlink clock synchronization. The unique word signal UL-DW is a unique word to be used for downlink frame synchronization. The data frame segment UL Ctrl is a data frame segment carrying control signals. The information frame element thus constructed carries a preamble signal, a unique word signal, and a data information segment. A preamble signal, a unique word signal, and a data information segment carried in the information frame element will be hereinlater simply referred to as "a subsidiary information segment". The DL subsidiary information transmission frame shown in FIG. 3 designated by No. 3 constitutes the information frame element according to the present invention.

The DL information generating unit 51 is operative to divide the information frame element thus generated into a predetermined number n of information frame portions DL Info (1) to DL Info (n) so that the information frame portions DL Info (1) to DL Info (n) respectively correspond to the guard frame portions DL Guard (1) to DL Guard (n) of the uplink transmission frames L1 with respect to time length, and then to generate a plurality of downlink transmission frames L2 each including the information frame portions DL Info (1) to DL Info (n) collectively forming an information frame element No.3 carrying the subsidiary information segment. The DL information generating unit 51 is operative to output the downlink transmission frames L2 carrying the subsidiary information segment d1 thus generated to the modulating unit 29.

The base station 2A is operative to transmit the downlink transmission frames L2 to the mobile station 1A in a publicly known manner.

The mobile station 1A is operative to receive the downlink transmission frame L2 in a publicly-known time division multiplexing manner so as to sequentially extract the information frame portions DL Info (1) to DL Info (n) collectively forming the information frame element, and perform the subsidiary information segment in accordance with the information frame element thus extracted to ensure reliable and efficient communication with the base station.

The description hereinlater will be directed to a process of receiving the downlink transmission frame L2 in the time division multiplexing manner so as to sequentially extract the information frame portions DL Info (1) to DL Info (n) collectively forming an information frame element carrying a subsidiary information segment performed in the mobile station 1A with reference to the drawings shown in FIGS. 1 and 3.

The system controller 14A comprises a synchronous detecting unit 40, a downlink information detecting unit 41, a downlink timing managing unit 42, an uplink timing managing unit 43, a system state managing unit 44, and external block interface units 45A, 45B, and 45C.

The demodulating unit 13 is operated to demodulate a HF receiving control signal d5 inputted from the control information receiving HF circuit 12 to output a receiving control signal d6. The synchronous detecting unit 40 is operated to acquire synchronizations with transmission frames and clocks on the basis of the receiving control signal d6 to output a downlink timing information d7. The downlink timing managing unit 42 is operated to generate a replay timing information d9 on the basis of the downlink timing information d7 outputted by the synchronous detecting unit 40. The UL timing managing unit 43 is operated to generate uplink timing information d10, d13, on the basis of the replay timing information d9 generated by the downlink timing managing unit 42. Concurrently, the DL information detecting unit 41 is operated to input the downlink timing information d7, which contains an uplink transmission frame L1, from the synchronous detecting unit 40 to sequentially extract the information frame portions DL Info (1) to DL Info (n) collectively forming the information frame element to reconstruct a subsidiary information segment d12, which is substantially equal to the information frame element. The system state managing unit 44 is operated to input the subsidiary information segment d12 and the uplink timing information d13 to manage each of the elements constituting the mobile station 1A by receiving and transmitting mobile system control signals ctx 15, ctx 16, and ctx 17 through the external block IF units 45A, 45B, and 45C to perform the subsidiary information segment in accordance with the subsidiary information segment d12 thus extracted and reconstructed to ensure reliable and efficient communication with the base station 2A. The main information segment may be, for example but not limited to, a sound signal segment, which is required to be replayed immediately. The subsidiary information segment d12 may be, for example but not limited to, an instruction to execute a function or to implement a mode, which is to be visually indicated, and not required to be replayed immediately.

Preferably, the frame length of the uplink transmission frame shown in FIG. 3 should be 1 to 2 milliseconds or less since the uplink transmission frame carries the main information to be replayed immediately. The frame length of the downlink transmission frame shown in FIG. 3, on the other hand, may be approximately 0.5 to 1 second since the downlink transmission frame carries the subsidiary information segment 12, which is not required to be immediately replayed.

According to the present invention, the first embodiment of the bidirectional digital wireless system comprises a mobile station 1A for generating and transmitting a plurality of uplink transmission frames L1 each of which includes a guard frame portion DL-Guard and a data frame portion UL-DATA carrying a main information segment in a publicly-known time division demultiplexing manner; and a base station 2A for receiving the uplink transmission frames L1, and generating and transmitting a plurality of downlink transmission frames L2 each including an information frame element carrying a subsidiary information segment to the mobile station 1A with reference to the uplink transmission frames L1 in the time division demultiplexing manner, the DL information generating unit 51 of the base station 2A is operative to divide the information frame element into a predetermined number n of information frame portions DL Info (1) to DL Info (n) respectively corresponding to the guard frame portions DL Guard (1) to DL Guard (n) of the uplink transmission frames L1 with respect to time length, and generate a plurality of downlink transmission frames L2 each including the information frame portions DL Info (1) to DL Info (n) collectively forming an information frame element carrying a subsidiary information segment to be transmitted to the mobile station 1A, and the mobile station 1A is operative to receive the downlink transmission frame L2 in a publicly-known time division multiplexing manner and the DL information detecting unit 41 of the mobile station 1A is operative to sequentially extract the information frame portions DL Info (1) to DL Info (n) collectively forming the information frame element d12, and the system state managing unit 44 of the perform the subsidiary information segment in accordance with the information frame element d12 thus extracted to ensure reliable and efficient communication with the base station 2A.

As will be understood from the foregoing description, it is to be understood that the first embodiment of the bidirectional digital wireless system thus constructed can transmit and receive downlink transmission frames asymmetric to respective uplink transmission frames with respect to time length between the base station 2A and mobile station 1A, thereby making it possible for the base station 2A and the mobile station 1A to transmit and receive uplink and downlink transmission frames, which satisfy respective requirements of replay time, for example but not limited to, uplink transmission frames of 1 to 2 milliseconds or less, and downlink transmission frames of 0.5 to 1 second, so as to reliably and efficiently transmit downlink information as well as to enhance frequency utilization efficiency.

Figure 4:
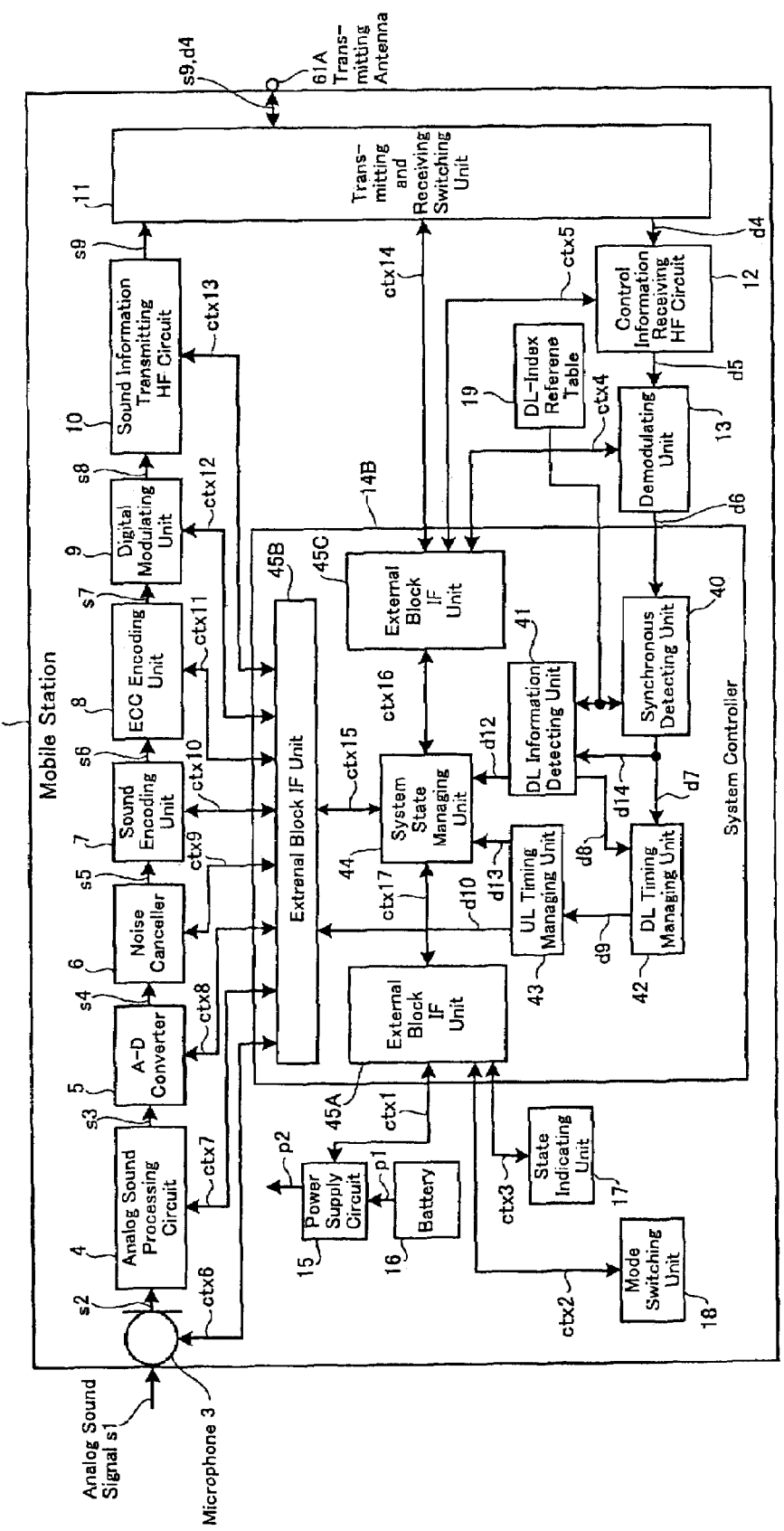
FIG. 4 is a block diagram of a mobile station constituting a second preferred embodiment of the bidirectional digital wireless system according to the present invention.
Figure 5:
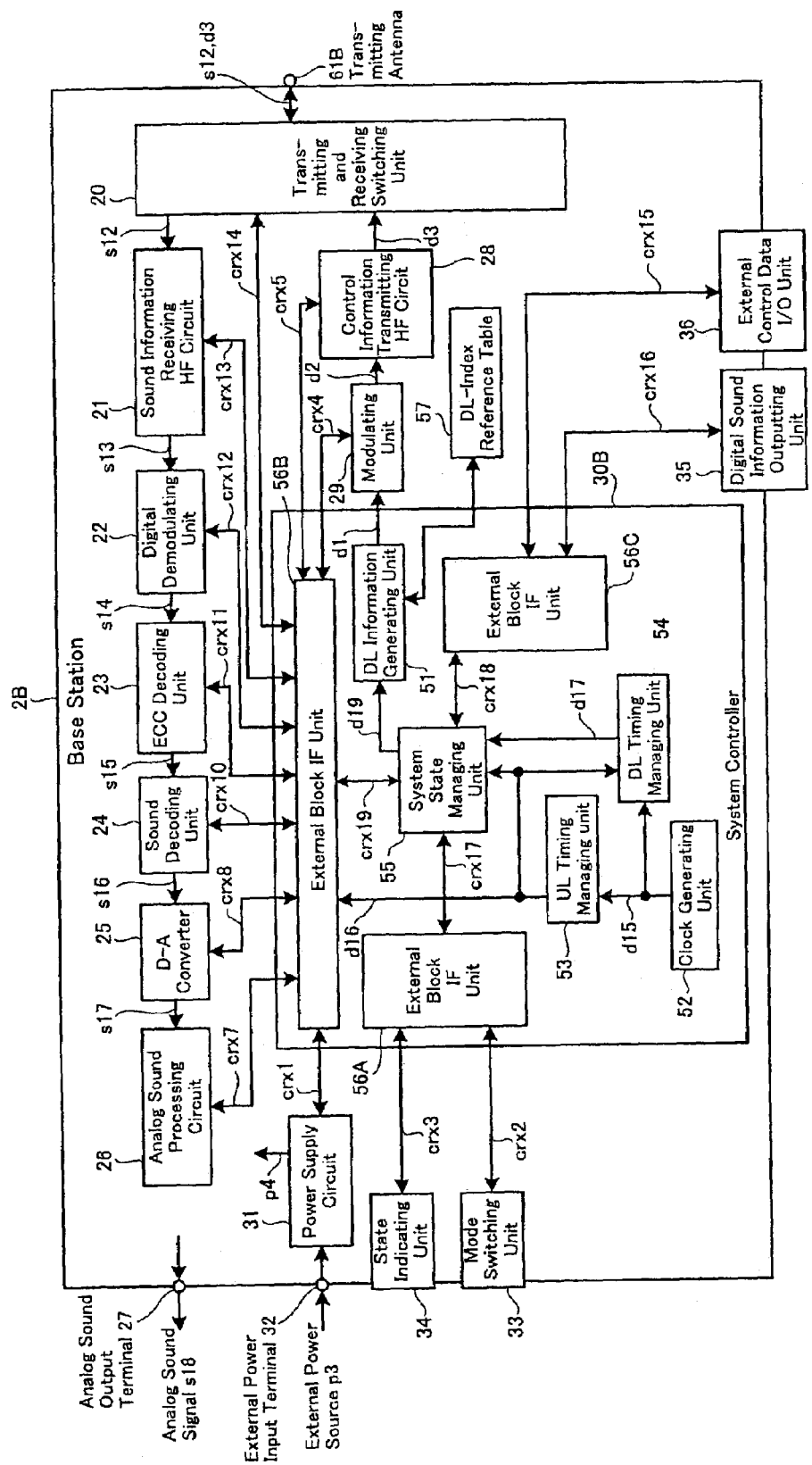
FIG. 5 is a block diagram of a base station constituting a second preferred embodiment of the bidirectional digital wireless system according to the present invention.
Figure 6:
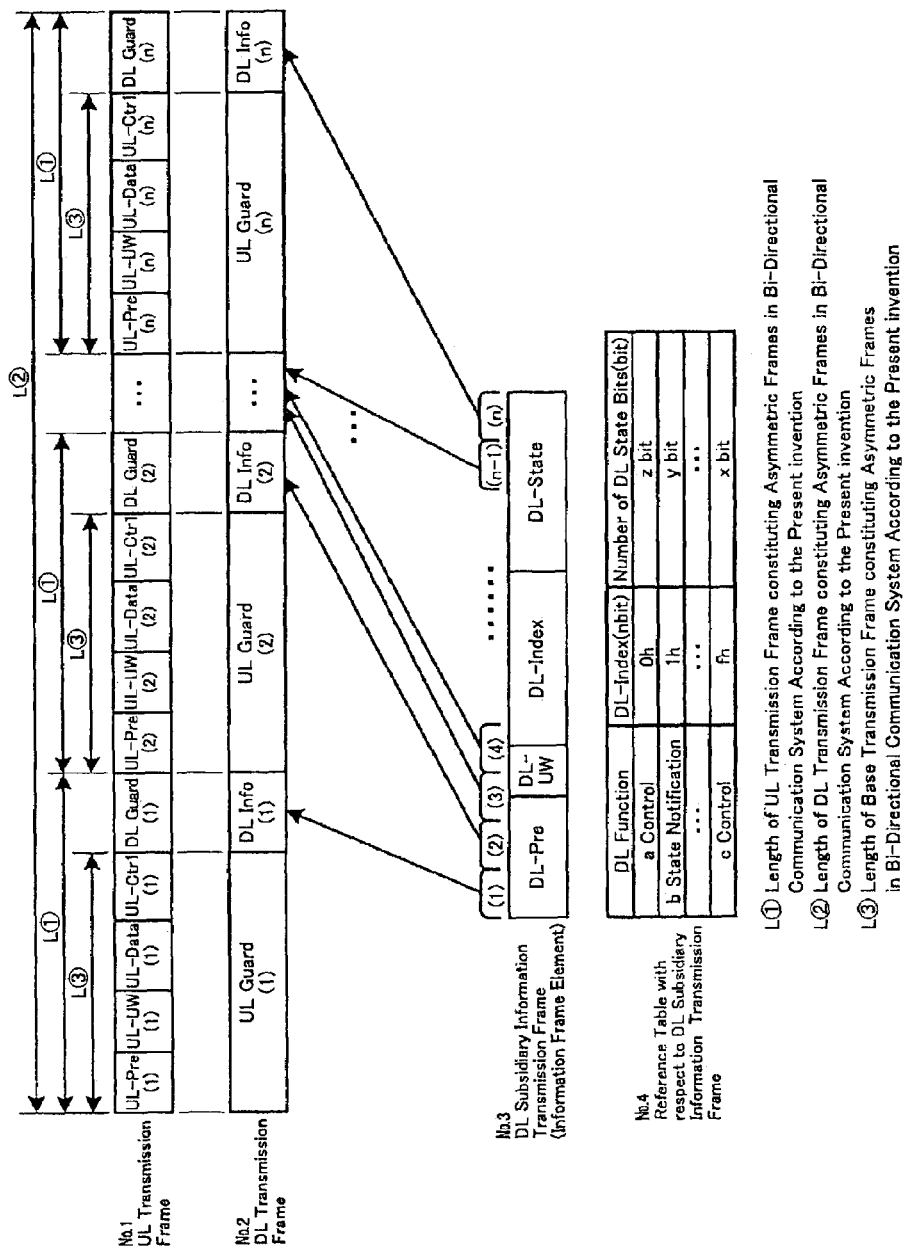
FIG. 6 is a block diagram explaining transmission frames transmitted and received between the mobile station and the base station constituting the second preferred embodiment of the bidirectional digital wireless system according to the present invention.

Referring next to FIGS. 4 through 6 of the drawings, there is shown a second preferred embodiment of the bidirectional digital wireless system transmitting and receiving asymmetric frames according to the present invention. The second preferred embodiment of the bidirectional digital wireless system comprises mobile station 1B for generating and transmitting a plurality of uplink transmission frames carrying a main information segment, and a base station 2B for receiving the uplink transmission frames, and generating and transmitting a plurality of downlink transmission frames carrying a subsidiary information segment with reference to the uplink transmission frames.

As shown in FIGS. 4 and 5, the mobile station 1B and the base station 2B constituting the second embodiment of the bidirectional digital wireless system is substantially similar to the mobile station 1A and the base station 2A of the first embodiment except for the fact that the mobile station 1B and the base station 2B respectively comprises a downlink index reference table 19 and a downlink reference table 57, hereinlater simply referred to as "a DL index reference table 19" and "a DL index reference table 57". Each of the DL index reference table 19" and the DL index reference table 57 is adapted to store a reference table, which will be described later. The DL index reference table 19 and the DL index reference table 57 respectively constitute the storage units of the mobile station 1B and the base station 2B according to the present invention. Description about the same process of the second embodiment as those of the first preferred embodiment will be omitted to avoid tedious repetition.

The description hereinlater will be directed to a process of generating a plurality of downlink transmission frames L2 performed in the base station 2B with reference to the drawings shown in FIGS. 5 and 6.

The DL information generating unit 51 of the base station 2B is adapted to generate a plurality of downlink transmission frames L2 each including an information frame element d1 on the basis of the downlink information signal 19 inputted from the system state managing unit 55 with reference to the reference table stored in the DL index reference table 57.

As best shown in FIG. 3, the information frame element carrying a subsidiary information segment contained in the downlink transmission frame L2 generated by the DL information generating unit 51 is shown in FIG. 6 as designated by No. 3 DL subsidiary information transmission frame and comprising a preamble signal DL-Pre, a unique word signal UL-DW, an index frame element DL-Index and a state frame element DL-State. The index frame element DL-Index is indicative of a category of the subsidiary information segment such as, for example, a control information segment, or a state notification segment. The state frame element DL-State is indicative of a state of the subsidiary information segment. According to the present invention, the index frame element DL-Index and the state frame element DL-State may collectively constitute the data frame segment UL Ctrl carrying a data information segment.

The index frame element DL-Index and the state frame element DL-State respectively have frame lengths. The index frame elements DL-Index have respective frame lengths of bit numbers. The state frame elements DL-State have respective frame lengths of bit numbers associated with the index frame elements DL-index. The reference table stored in the DL index reference table 57 and the DL index reference table 19 is shown in FIG. 6 as designated by No. 4. The reference table shows the frame lengths of the state frame elements DL-State in association with the frame lengths of the index frame elements DL-Index. Preferably, the DL index reference table 57 and the DL index reference table 19 should be rewritable memories so that new index frame elements DL-Index or state frame elements DL-State may be added or index frame elements DL-Index or state frame elements DL-State no longer required may be deleted. The information frame element thus constructed carries a preamble signal, a unique word signal, and a data information segment. The DL subsidiary information transmission frame shown in FIG. 6 constitutes the information frame element according to the present invention.

The DL information generating unit 51 of the base station 2B is operative to generate a plurality of downlink transmission frames L2, each of which includes an information frame element including an index frame element DL-Index and a state frame element DL-State with reference to the reference table stored in the DL-index reference table 57, and the base station 2B is operative to transmit the plurality of downlink transmission frames L2 in a publicly-known time division demultiplexing manner.

The mobile station 1B is operative to receive the downlink transmission frames L2 in a publicly-known time division multiplexing manner so as to sequentially extract the information frame portions DL Info (1) to DL Info (n) collectively forming the information frame element shown in FIG. 6 as designated by No. 3 and perform the subsidiary information segment in accordance with the information frame element thus extracted to ensure reliable and efficient communication with the base station.

The description hereinlater will be directed to a process of receiving and processing the downlink transmission frame L2 performed in the mobile station 1B with reference to the drawings shown in FIGS. 4 and 6.

The DL information detecting unit 41 is operated to input the downlink timing information d7 from the synchronous detecting unit 40 to sequentially extract the information frame portions DL Info (1) to DL Info (n) collectively forming the information frame element shown in FIG. 6 as designated by No. 3 to reconstruct a subsidiary information segment d12, which is substantially equal to the information frame element. The system state managing unit 44 is operated to input the subsidiary information segment d12 and the uplink timing information d13 to detect the index frame element DL-Index and identify the frame lengths of the index frame element DL-Index and the state frame element DL-State with reference to the reference table stored in the DL-index reference table 19, and detect the index frame element DL-Index and the state frame element DL-State. The system state managing unit 44 is then operated to manage each of the elements constituting the mobile station 1A by receiving and transmitting mobile system control signals ctx 15, ctx 16, and ctx 17 through the external block IF units 45A, 45B, and 45C to perform the subsidiary information segment in accordance with the index frame element DL-Index and the state frame element DL-State thus detected and identified to ensure reliable and efficient communication with the base station 2A.

In the second embodiment of the bidirectional digital wireless system according to the present invention, the information frame element carrying the subsidiary information segment includes an index frame element DL-Index indicative of a category of the subsidiary information segment and a state frame element DL-State indicative of a state of the subsidiary information segment, the base station 2B is operative to generate and transmit a plurality of downlink transmission frames L2 each including an information frame element including an index frame element DL-Index and a state frame element DL-State with reference to the reference table stored in the DL-index reference table 57, whereby the mobile station 1B is operative to receive the downlink transmission frames L2 in the publicly-known time division multiplexing manner so as to sequentially extract the information frame portions DL Info (1) to DL Info (n) collectively forming the information frame element, detect the index frame element DL-Index, identify the frame lengths of, and detect the index frame element DL-Index and the state frame element DL-State with reference to the reference table stored in the DL-index reference table 19, and perform the subsidiary information segment in accordance with the index frame element DL-Index and the state frame element DL-State thus identified and detected.

As will be understood from the foregoing description, it is to be understood that the second embodiment of the bidirectional digital wireless system thus constructed makes it possible for the base station 2B and the mobile station 1B to transmit and receive downlink transmission frames having variable frame lengths and therefore asymmetric to uplink transmission frames with respect to time length with reference to the respective reference tables stored in the DL index reference table 57 and DL index reference table 19.

According to the present invention, the DL index reference table 57 and the DL index reference table 19 may be rewritable memories, thereby enabling to add new index frame elements DL-Index or state frame elements DL-State and delete index frame elements DL-Index or state frame elements DL-State no longer required.

Furthermore, the second embodiment of the bidirectional digital wireless system thus constructed, can transmit and receive downlink transmission frames asymmetric to respective uplink transmission frames with respect to time length, thereby making it possible to transmit and receive uplink and downlink transmission frames, which satisfy respective requirements of replay time, for example but not limited to, uplink transmission frames of 1 to 2 milliseconds or less, and downlink transmission frames of 0.5 to 1 second, so as to reliably and efficiently transmit downlink information as well as to enhance frequency utilization efficiency.

Figure 7:
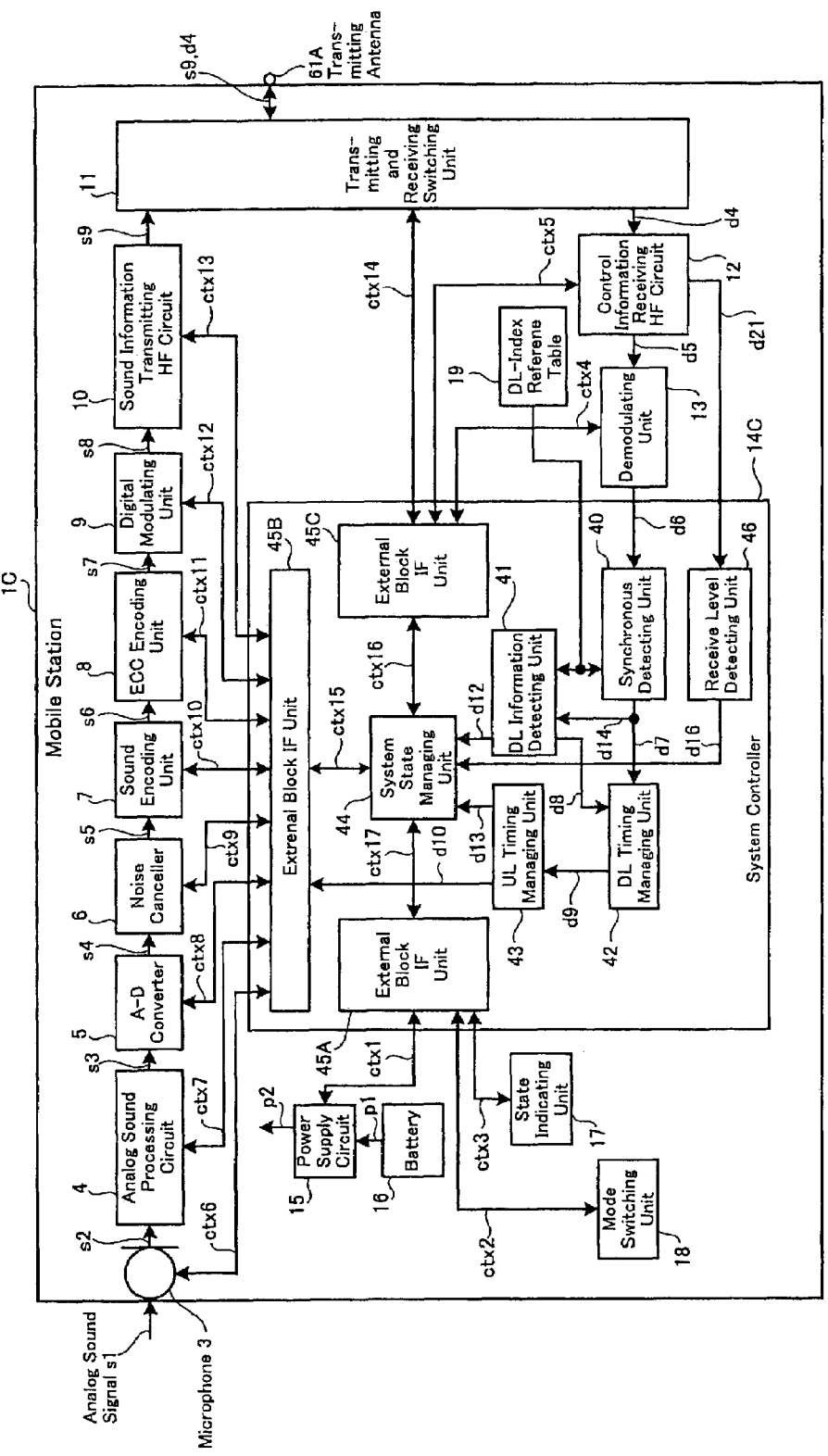
FIG. 7 is a block diagram of a mobile station constituting a third preferred embodiment of the bidirectional digital wireless system according to the present invention.
Figure 8:
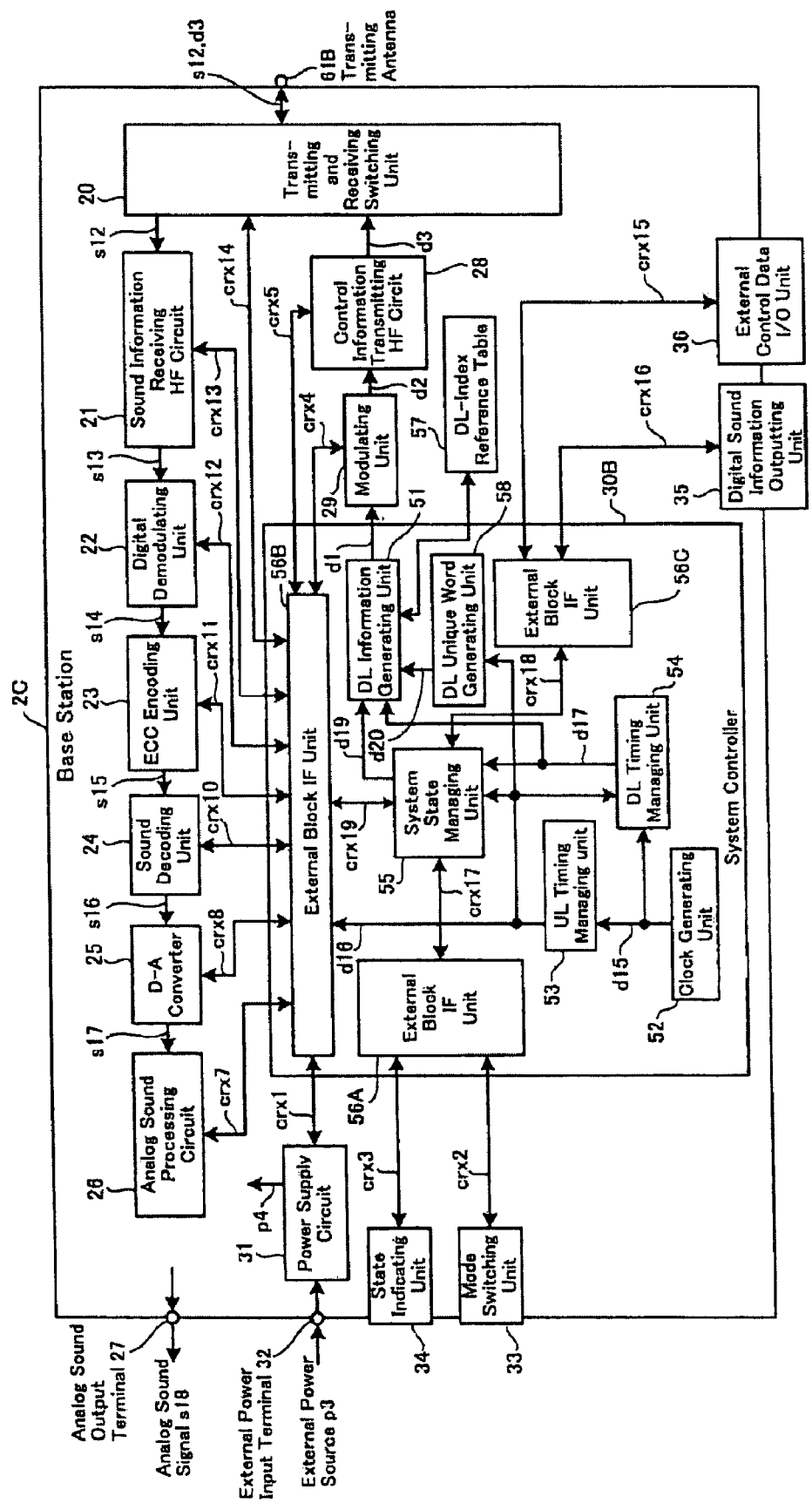
FIG. 8 is a block diagram of a base station constituting a third preferred embodiment of the bidirectional digital wireless system according to the present invention.
Figure 9:
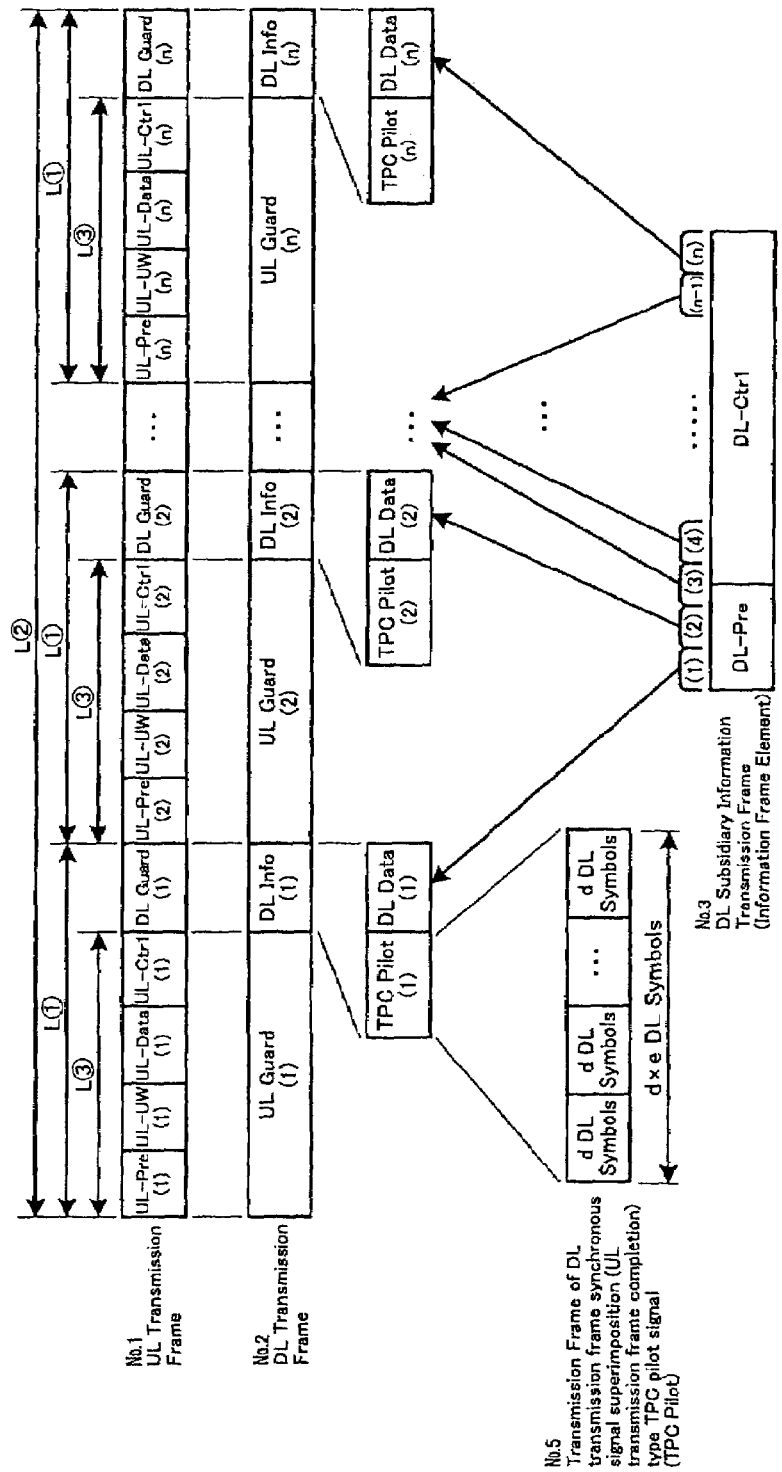
FIG. 9 is a block diagram explaining transmission frames transmitted and received between the mobile station and the base station constituting the third preferred embodiment of the bidirectional digital wireless system according to the present invention.

Referring then to FIGS. 7 through 9 of the drawings, there is shown a third preferred embodiment of the bidirectional digital wireless system transmitting and receiving asymmetric frames according to the present invention. The third preferred embodiment of the bidirectional digital wireless system comprises a mobile station 1C for generating and transmitting a plurality of uplink transmission frames carrying a main information segment, and a base station 2C for receiving the uplink transmission frames, and generating and transmitting a plurality of downlink transmission frames carrying a subsidiary information segment with reference to the uplink transmission frames.

As shown in FIGS. 7 and 8, the mobile station 1C and the base station 2C constituting the third embodiment of the bidirectional digital wireless system is substantially similar to the mobile station 1B and the base station 2B of the second embodiment shown in FIGS. 4 and 5 except for the fact that the mobile station 1C and the base station 2C respectively comprises a receive level detecting unit 46 and a downlink unique word generating unit 58, hereinlater simply referred to as "a DL unique word generating unit 58". The receive level detecting unit 46 is adapted to calculate and detect a received power level on the basis of an RSSI (Recived Signal Strength Indicator) signal d21 outputted from the control information receiving HF circuit 12 and output a power level signal d22. The system state managing unit 44 is adapted to input the power level signal d22 from the receive level detecting unit 46 and manage the sound information transmitting HF circuit 10 by transmit mobile system control signal ctx13 through the external block IF unit 45B to perform a transmit power control function of the open loop type. Description about the same process of the third embodiment as those of the second preferred embodiment will be omitted to avoid tedious repetition.

The DL unique word generating unit 58 is adapted to input the UL timing information signal d16 generated by the UL timing managing unit 53 to generate a downlink unique word signal d20 carrying frame synchronization information.

The base station 2C is operative to generate and transmit a plurality of downlink transmission frames L2 each including the information frame portions DL Info (1) to DL Info (n) each of which contains a pilot frame element TPC Pilot to the mobile station 1C with reference to the uplink transmission frames L1.

The description hereinlater will be directed to a process of generating a plurality of downlink transmission frames L2 each including an information frame element carrying transmit power control information and the frame synchronization information performed in the base station 2C with reference to the drawings shown in FIGS. 8 and 9.

The DL unique word generating unit 58 is adapted to input the UL timing information signal d16 generated by the UL timing managing unit 53 to generate a downlink unique word signal d20 carrying frame synchronization information. The DL information generating unit 51 is operated to input the downlink information signals d19 from the system state managing unit 55 and the downlink unique word signals d20 to generate a pilot signal indicative of transmit power control information, and superimposing the downlink unique word signal d20 on the pilot signal to generate a pilot frame element TPC Pilot carrying the transmit power control information and the frame synchronization information.

The pilot frame element TPC Pilot will be described in detail with reference to the drawings shown in FIG. 9. The pilot frame element TPC Pilot designated by No. 5 comprises a predetermined number e of d downlink symbols, each indicating a value of 0 or 1, and collectively constituting a unique word signal carrying frame synchronization information. Furthermore, the pilot frame element TPC Pilot, which comprises the number e of d DL symbols, has a time length long enough to transmit pilot signals indicative of transmit power control information to be used in open loop power control as well, wherein e and d are any integer values.

The DL information generating unit 51 is then operated to generate a plurality of downlink transmission frames L2 each including the information frame portions DL Info (1) to DL Info (n) each of which contains the pilot frame element TPC Pilot. The base station 2C is operative to transmit a plurality of downlink transmission frames L2 each including the information frame portions DL Info (1) to DL Info (n) each of which contains the pilot frame element TPC Pilot to the mobile station 1C with reference to the uplink transmission frames L1 in a publicly known manner.

The mobile station 1C is operative to receive the downlink transmission frame L2 in a publicly-known time division multiplexing manner so as to sequentially extract the pilot frame element TPC Pilot, and perform a transmit power control function and a frame synchronization function.

The description hereinlater will be directed to a process of receiving the downlink transmission frame L2 in the time division multiplexing manner so as to sequentially extract transmit power control information and the frame synchronization information performed in the mobile station 1C with reference to the drawings shown in FIG. 7.

The mobile station 1C is operative to receive the downlink transmission frames L2 each including the information frame portions DL Info (1) to DL Info (n) each of which contains a pilot frame element TPC Pilot carrying the transmit power control information and the frame synchronization information from the base station 2C in the publicly-known time division multiplexing manner.

The demodulating unit 13 is operated to demodulate a HF receiving control signal d5 inputted from the control information receiving HF circuit 12 to output a receiving control signal d6 containing a pilot frame element TPC Pilot carrying the transmit power control information and the frame synchronization information. The synchronous detecting unit 40 is operated to acquire synchronizations with transmission frames on the basis of the frame synchronization information carried on the pilot frame element TPC Pilot contained in the receiving control signal d6 to output a downlink timing information d7. The DL information detecting unit 41 is operated to input the downlink timing information d7 from the synchronous detecting unit 40 to sequentially extract the pilot frame element TPC Pilot and output a subsidiary information segment d12 containing the pilot frame element TPC Pilot. The system state managing unit 44 is operated to input the subsidiary information segment d12 containing the pilot frame element TPC Pilot from the DL information detecting unit 41 and manage the sound information transmitting HF circuit 10 by transmit mobile system control signal ctx13 through the external block IF unit 45B to perform a transmit power control function in accordance with the transmit power control information carried on the pilot frame element TPC Pilot to ensure reliable and efficient communication with the base station 2C.

Furthermore, the receive level detecting unit 46 is operated to calculate and detect a received power level on the basis of an RSSI (Recived Signal Strength Indicator) signal d21 outputted from the control information receiving HF circuit 12 and output a power level signal d22. The system state managing unit 44 is operated to input the power level signal d22 from the receive level detecting unit 46 and manage the sound information transmitting HF circuit 10 by transmit mobile system control signal ctx13 through the external block 1F unit 45B to perform a transmit power control function.

In the third embodiment of the bidirectional digital wireless system according the present invention, the base station 2C is operative to generate and transmit a plurality of downlink transmission frames L2 each including the information frame portions DL Info (1) to DL Info (n) each of which contains the pilot frame element TPC Pilot to the mobile station 1C with reference to the uplink transmission frames L1, and the mobile station 1C is operative to receive the downlink transmission frames L2 each including the information frame portions DL Info (1) to DL Info (n) each of which contains the pilot frame element TPC Pilot carrying the transmit power control information and the frame synchronization information from the base station 2C in a time division multiplexing manner so as to sequentially extract the pilot frame element TPC Pilot, and perform a transmit power control function and a frame synchronization function in accordance with each of the pilot frame elements TPC Pilot (1) to TPC (n) to ensure reliable and efficient communication with the base station 2C.

As will be understood from the foregoing description, it is to be understood that the third embodiment of the bidirectional digital wireless system thus constructed can transmit and receive downlink transmission frames asymmetric to respective uplink transmission frames with respect to time length between the base station 2C and mobile station 1C, thereby enabling to transmit and receive the downlink transmission frames L2 each including the information frame portions DL Info (1) to DL Info (n) each of which contains the pilot frame element TPC Pilot carrying the transmit power control information and the frame synchronization information, and making it possible for the mobile station 1C to perform the frame synchronization function and the transmission power control function of open loop type while reliably and efficiently communicating with the base station 2C.

Figure 10:
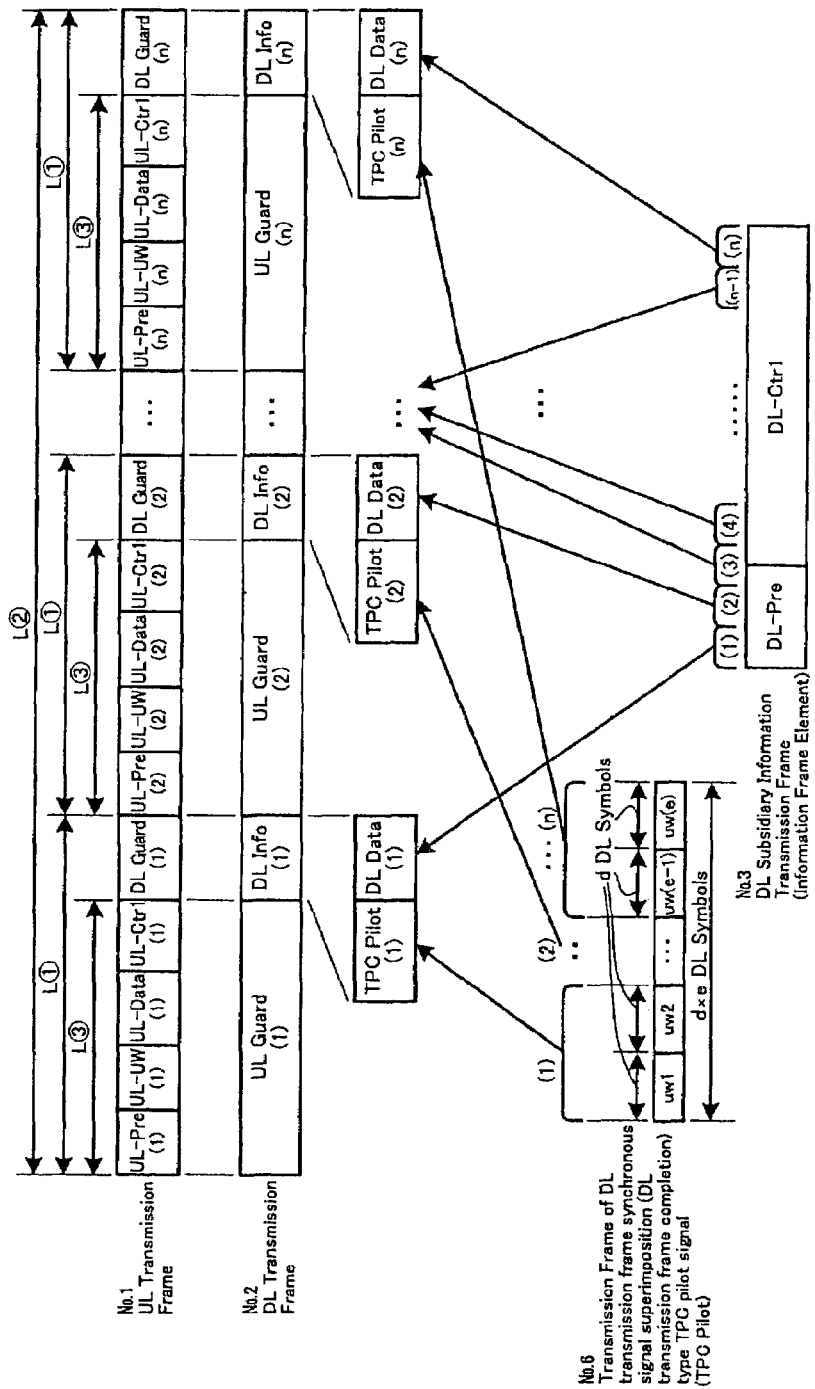
FIG. 10 is a block diagram explaining transmission frames transmitted and received between the mobile station and the base station constituting a fourth preferred embodiment of the bidirectional digital wireless system according to the present invention.

Referring then to FIGS. 7, 8 and 10 of the drawings, there is shown a fourth preferred embodiment of the bidirectional digital wireless system transmitting and receiving asymmetric frames according to the present invention.

The mobile station 1C and the base station 2C constituting the fourth embodiment of the bidirectional digital wireless system is substantially similar to the mobile station 1C and the base station 2C of the third embodiment except for the fact that the DL unique word generating unit 58 of the base station 2C is adapted to input the UL timing information signal d16 generated by the UL timing managing unit 53 to generate a pilot frame element TPC Pilot carrying the transmit power control information and the frame synchronization information, and the base station 2C is adapted divide the pilot frame element TPC Pilot into a predetermined number n of pilot frame fragments TPC Pilot (1) to TPC Pilot (n) collectively forming the pilot frame element TPC Pilot.

Description about the same process of the fourth embodiment as those of the third preferred embodiment will be omitted to avoid tedious repetition.

The description hereinlater will be directed to a process of generating a plurality of downlink transmission frames L2 each including an information frame element carrying transmit power control information and the frame synchronization information performed in the base station 2C with reference to the drawings shown in FIGS. 8 and 10.

The DL unique word generating unit 58 is adapted to input the UL timing information signal d16 generated by the UL timing managing unit 53 to generate a downlink unique word signal d20 carrying frame synchronization information. The DL information generating unit 51 is operated to input the downlink information signals d19 from the system state managing unit 55 and the downlink unique word signals d20 to generate a pilot signal indicative of transmit power control information, and superimposing the downlink unique word signal d20 on the pilot signal to generate a pilot frame element TPC Pilot carrying the transmit power control information and the frame synchronization information. The DL information generating unit 51 is then operated to divide the pilot frame element TPC Pilot into a predetermined number n of pilot frame fragments TPC Pilot (1) to TPC Pilot (n) collectively forming the pilot frame element TPC Pilot carrying the transmit power control information and the frame synchronization information.

The pilot frame fragments TPC Pilot (1) to TPC Pilot (n) will be described in detail with reference to the drawings shown in FIG. 10. In the pilot frame element TPC Pilot designated by No. 6, number e of d DL symbols comprises unique word portions of "uw 1", "uw 2", ... "uw (e−1)", and "uw (e)". The DL information generating unit 51 is operated to divide the pilot frame element TPC Pilot designated by No. 6 which comprises a predetermined number e of d DL symbols, viz. "uw 1", "uw 2", ... "uw (e−1)", and "uw(e), into a predetermined number n of pilot frame fragments TPC Pilot (1) to TPC Pilot (n) collectively forming the pilot frame element TPC Pilot carrying the transmit power control information and the frame synchronization information, wherein d, e and n are any integer values, and e is an integral multiple of n.

As shown in FIG. 10, the pilot frame element TPC Pilot designated by No. 6 comprises a predetermined number e of d DL symbols, viz. "uw 1", "uw 2", ... "uw (e−1)", and "uw(e), collectively constituting a unique word signal carrying frame synchronization information. Furthermore, the pilot frame element TPC Pilot, which comprises the number e of d DL symbols, has a time length long enough to transmit pilot signals indicative of transmit power control information to be used in open loop power control 1 as well.

The DL information generating unit 51 is then operated to generate a plurality of downlink transmission frames L2 each including the information frame portions DL Info (1) to DL Info (n) collectively forming the pilot frame element TPC Pilot carrying the transmit power control information and the frame synchronization information. The base station 2C is operative to transmit a plurality of downlink transmission frames L2 each including the information frame portions DL Info (1) to DL Info (n) collectively forming the pilot frame element TPC Pilot carrying the transmit power control information and the frame synchronization information to the mobile station 1C with reference to the uplink transmission frames L1 in a publicly known manner.

The mobile station 1C is operative to receive the downlink transmission frame L2 in a publicly-known time division multiplexing manner so as to sequentially extract the pilot frame element TPC Pilot, and perform a transmit power control function and a frame synchronization function.

The description hereinlater will be directed to a process of receiving the downlink transmission frame L2 in the time division multiplexing manner so as to sequentially extract transmit power control information and the frame synchronization information performed in the mobile station 1C with reference to the drawings shown in FIGS. 7 and 10.

The mobile station 1C is operative to receive the downlink transmission frames L2 each including the information frame portions DL Info (1) to DL Info (n) collectively forming a pilot frame element TPC Pilot carrying the transmit power control information and the frame synchronization information from the base station 2C in the publicly-known time division multiplexing manner.

The synchronous detecting unit 40 is operated to input a receiving control signal d6 containing a plurality of pilot frame elements collectively carrying the transmit power control information and the frame synchronization information from the demodulating unit 13, and acquire synchronizations with transmission frames on the basis of the frame synchronization information carried on the pilot frame element TPC Pilot contained in a receiving control signal d6 to output a downlink timing information d7. The DL information detecting unit 41 is operated to input the downlink timing information d7 from the synchronous detecting unit 40 to sequentially extract the information frame portions DL Info (1) to DL Info (n), collectively reconstruct the pilot frame element TPC Pilot and output a subsidiary information segment d12 containing the pilot frame element TPC Pilot thus reconstructed. The system state managing unit 44 is operated to input the subsidiary information segment d12 containing the pilot frame element TPC Pilot from the DL information detecting unit 41 and manage the sound information transmitting HF circuit 10 by transmit mobile system control signal ctx13 through the external block IF unit 45B to perform a transmit power control function in accordance with the transmit power control information carried on the pilot frame element TPC Pilot to ensure reliable and efficient communication with the base station 2C.

In the fourth preferred embodiment of the bidirectional digital wireless system, the base station 2C is operative to divide the pilot frame element TPC Pilot into a predetermined number n of pilot frame fragments TPC Pilot (1) to TPC Pilot (n) collectively forming the pilot frame element TPC Pilot so as to generate and transmit a plurality of downlink transmission frames L2 each including the information frame portions DL Info (1) to DL Info (n) collectively forming the pilot frame element TPC Pilot carrying the transmit power control information and the frame synchronization information, and the mobile station 1C is operative to receive the downlink transmission frames L2 each including the information frame portions DL Info (1) to DL Info (n) collectively forming the pilot frame element TPC Pilot carrying the transmit power control information and the frame synchronization information from the base station 2C in a time division multiplexing manner so as to sequentially extract the information frame portions DL Info (1) to DL Info (n), collectively reconstruct the pilot frame element TPC Pilot, and perform a transmit power control function and a frame synchronization function in accordance with each pilot frame element TPC Pilot to ensure reliable and efficient communication with the base station 2C.

As will be seen from the foregoing description, it is to be understood that the fourth embodiment of the bidirectional digital wireless system thus constructed can transmit and receive downlink transmission frames asymmetric to respective uplink transmission frames with respect to time length between the base station 2C and mobile station 1C, thereby enabling to transmit and receive the downlink transmission frames L2 each including the information frame portions DL Info (1) to DL Info (n) collectively forming a pilot frame element TPC Pilot carrying the transmit power control information and the frame synchronization information, and making it possible for the mobile station 1C to perform the frame synchronization function and the transmission power control function of open loop type while reliably and efficiently communicating with the base station 2C.

Figure 11:
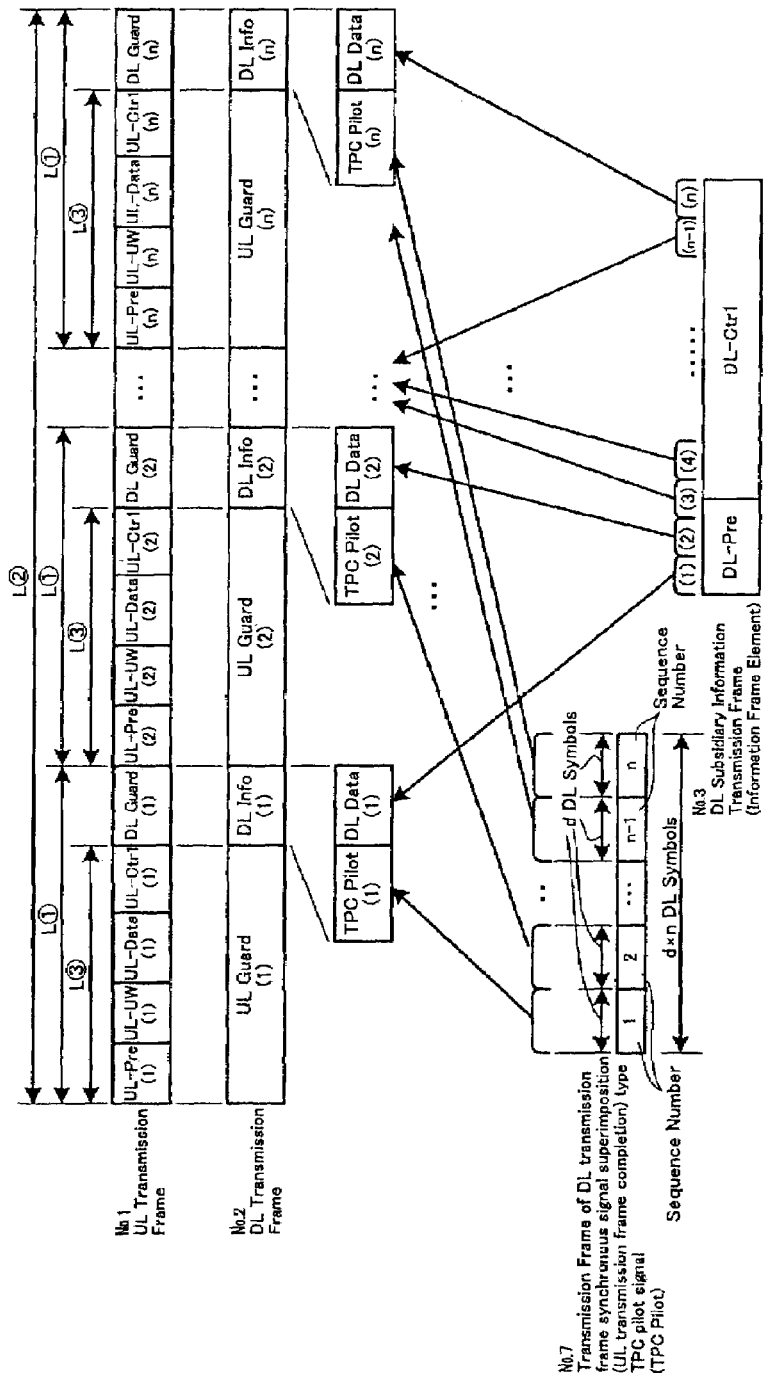
FIG. 11 is a block diagram explaining transmission frames transmitted and received between the mobile station and the base station constituting a fifth preferred embodiment of the bidirectional digital wireless system according to the present invention.

Referring then to FIGS. 7, 8 and 11 of the drawings, there is shown a fifth preferred embodiment of the bidirectional digital wireless system transmitting and receiving asymmetric frames according to the present invention.

The mobile station 1C and the base station 2C constituting the fifth embodiment of the bidirectional digital wireless system is substantially similar to the mobile station 1C and the base station 2C of the fourth embodiment except for the fact that the DL unique word generating unit 58 of the base station 2C is adapted to input the UL timing information signal d16 generated by the UL timing managing unit 53 to generate a pilot frame element TPC Pilot carrying the transmit power control information and the frame synchronization information, and the downlink information generating unit 51 is operated to divide the pilot frame element TPC Pilot into a predetermined number n of pilot frame fragments TPC Pilot (1) to TPC Pilot (n) collectively forming the pilot frame element TPC Pilot, and respectively attach unique numbers to the pilot frame fragments TPC Pilot (1) to TPC Pilot (n) so as to generate and transmit a plurality of downlink transmission frames L2 each including the information frame portions DL Info (1) to DL Info (n) having respective unique numbers, and collectively forming the pilot frame element TPC Pilot carrying the transmit power control information and the frame synchronization information.

Description about the same process of the fifth embodiment as those of the fourth preferred embodiment will be omitted to avoid tedious repetition.

The description hereinlater will be directed to a process of generating a plurality of downlink transmission frames L2 each including an information frame element carrying transmit power control information and the frame synchronization information performed in the base station 2C with reference to the drawings shown in FIGS. 8 and 11.

The DL information generating unit 51 is operated to generate a pilot frame element TPC Pilot carrying the transmit power control information and the frame synchronization information. The DL information generating unit 51 is then operated to divide the pilot frame element TPC Pilot into a predetermined number n of pilot frame fragments TPC Pilot (1) to TPC Pilot (n) collectively forming the pilot frame element TPC Pilot, and respectively attach unique numbers to the pilot frame fragments TPC Pilot (1) to TPC Pilot (n) so as to generate a plurality of downlink transmission frames L2 each including the information frame portions DL Info (1) to DL Info (n) having respective unique numbers, and collectively forming the pilot frame element TPC Pilot carrying the transmit power control information and the frame synchronization information.

The pilot frame fragments TPC Pilot (1) to TPC Pilot (n) will be described in detail with reference to the drawings shown in FIG. 11. In the pilot frame element TPC Pilot designated by No. 7, a number n of d DL symbols are divided into a number n of blocks. The DL information generating unit 51 is operated to divide the pilot frame element TPC Pilot designated by No. 7 into a predetermined number n of pilot frame fragments TPC Pilot (1) to TPC Pilot (n) respectively having blocks and collectively forming the pilot frame element TPC Pilot and respectively attach unique numbers such as, for example, 1, . . . , n−1, and n to the pilot frame fragments TPC Pilot (1) to TPC Pilot (n) so as to generate and transmit a plurality of downlink transmission frames L2 each including the information frame portions DL Info (1) to DL Info (n) having respective unique numbers, i.e., 1, . . . , n−1, and n, and collectively forming the pilot frame element TPC Pilot carrying the transmit power control information and the frame synchronization information. The base station 2C is operative to transmit a plurality of downlink transmission frames L2 each including the information frame portions DL Info (1) to DL Info (n) having respective unique numbers, i.e., 1, . . . , n−1, and n, and collectively forming the pilot frame element TPC Pilot carrying the transmit power control information and the frame synchronization information to the mobile station 1C with reference to the uplink transmission frames LI in a publicly known manner.

The mobile station 1C is operative to receive the downlink transmission frame L2 in a publicly-known time division multiplexing manner so as to sequentially extract the pilot frame element TPC Pilot, and perform a transmit power control function and a frame synchronization function.

The description hereinlater will be directed to a process of receiving the downlink transmission frame L2 in the time division multiplexing manner so as to sequentially extract the transmit power control information and the frame synchronization information performed in the mobile station 1C with reference to the drawings shown in FIGS. 7 and 11.

The mobile station 1C is operative to receive the downlink transmission frames L2 each including the information frame portions DL Info (1) to DL Info (n) having respective unique numbers, i.e., 1, . . . , n−1, and n, and collectively forming the pilot frame element TPC Pilot carrying the transmit power control information and the frame synchronization information from the base station 2C in the publicly-known time division multiplexing manner.

The synchronous detecting unit 40 is operated to input a receiving control signal d6 containing a plurality of pilot frame elements collectively carrying the transmit power control information and the frame synchronization information from the demodulating unit 13, and acquire synchronizations with transmission frames on the basis of the frame synchronization information carried on the pilot frame element TPC Pilot contained in a receiving control signal d6 to output a downlink timing information d7. The DL information detecting unit 41 is operated to input the downlink timing information d7 from the synchronous detecting unit 40 to sequentially extract the information frame portions DL Info (1) to DL Info (n), collectively reconstruct the pilot frame element TPC Pilot with reference to the respective unique numbers, i.e., 1, . . . , n−1, and n, and output a subsidiary information segment d12 containing the pilot frame element TPC Pilot thus reconstructed. The system state managing unit 44 is operated to input the subsidiary information segment d12 containing the pilot frame element TPC Pilot from the DL information detecting unit 41 and manage the sound information transmitting HF circuit 10 by transmit mobile system control signal ctx13 through the external block IF unit 45B to perform a transmit power control function in accordance with the transmit power control information carried on the pilot frame element TPC Pilot to ensure reliable and efficient communication with the base station 2C.

In the fifth preferred embodiment of the bidirectional digital wireless system, the base station 2C is operative to divide the pilot frame element TPC Pilot into a predetermined number n of pilot frame fragments TPC Pilot (1) to TPC Pilot (n) collectively forming the pilot frame element TPC Pilot, and respectively attach unique numbers to the pilot frame fragments TPC Pilot (1) to TPC Pilot (n) so as to generate and transmit a plurality of downlink transmission frames L2 each including the information frame portions DL Info (1) to DL Info (n) having respective unique numbers, and collectively forming the pilot frame element TPC Pilot carrying the transmit power control information and the frame synchronization information, and the mobile station 1C is operative to receive the downlink transmission frames L2 each including the information frame portions DL Info (1) to DL Info (n) having respective unique numbers, and collectively forming the pilot frame element TPC Pilot carrying the transmit power control information and the frame synchronization information from the base station 2C in a time division multiplexing manner so as to sequentially extract the information frame portions DL Info (1) to DL Info (n), collectively reconstruct the pilot frame element TPC Pilot with reference to the respective unique numbers, and perform a transmit power control function and a frame synchronization function in accordance with each pilot frame element TPC Pilot to ensure reliable and efficient communication with the base station 2C.

As will be seen from the foregoing description, it is to be understood that the fifth embodiment of the bidirectional digital wireless system thus constructed can transmit and receive downlink transmission frames asymmetric to respective uplink transmission frames with respect to time length between the base station 2C and mobile station 1C, thereby enabling to transmit and receive the downlink transmission frames L2 each including the information frame portions DL Info (1) to DL Info (n), and collectively forming a pilot frame element TPC Pilot carrying the transmit power control information and the frame synchronization information, and making it possible for the mobile station 1C to perform the frame synchronization function and the transmission power control function of open loop type while reliably and efficiently communicating with the base station 2C.

Furthermore, the base station 2C constituting the fifth embodiment is operative to receive the downlink transmission frames L2 each including the information frame portions DL Info (1) to DL Info (n) having respective unique numbers, thereby making it easy for the base station 2C to reconstruct the pilot frame element TPC Pilot with reference to the respective unique numbers.

As will be seen from the foregoing description, it is to be understood that the fifth embodiment of the bidirectional digital wireless system thus constructed can transmit and receive downlink transmission frames asymmetric to respective uplink transmission frames with respect to time length between the base station 2C and mobile station 1C, thereby enabling to transmit and receive the downlink transmission frames L2 each including the information frame portions DL Info (1) to DL Info (n) collectively forming a pilot frame element TPC Pilot carrying the transmit power control information and the frame synchronization information, and making it possible for the mobile station 1C to perform the frame synchronization function and the transmission power control function of open loop type while reliably and efficiently communicating with the base station 2C.

Figure 12:
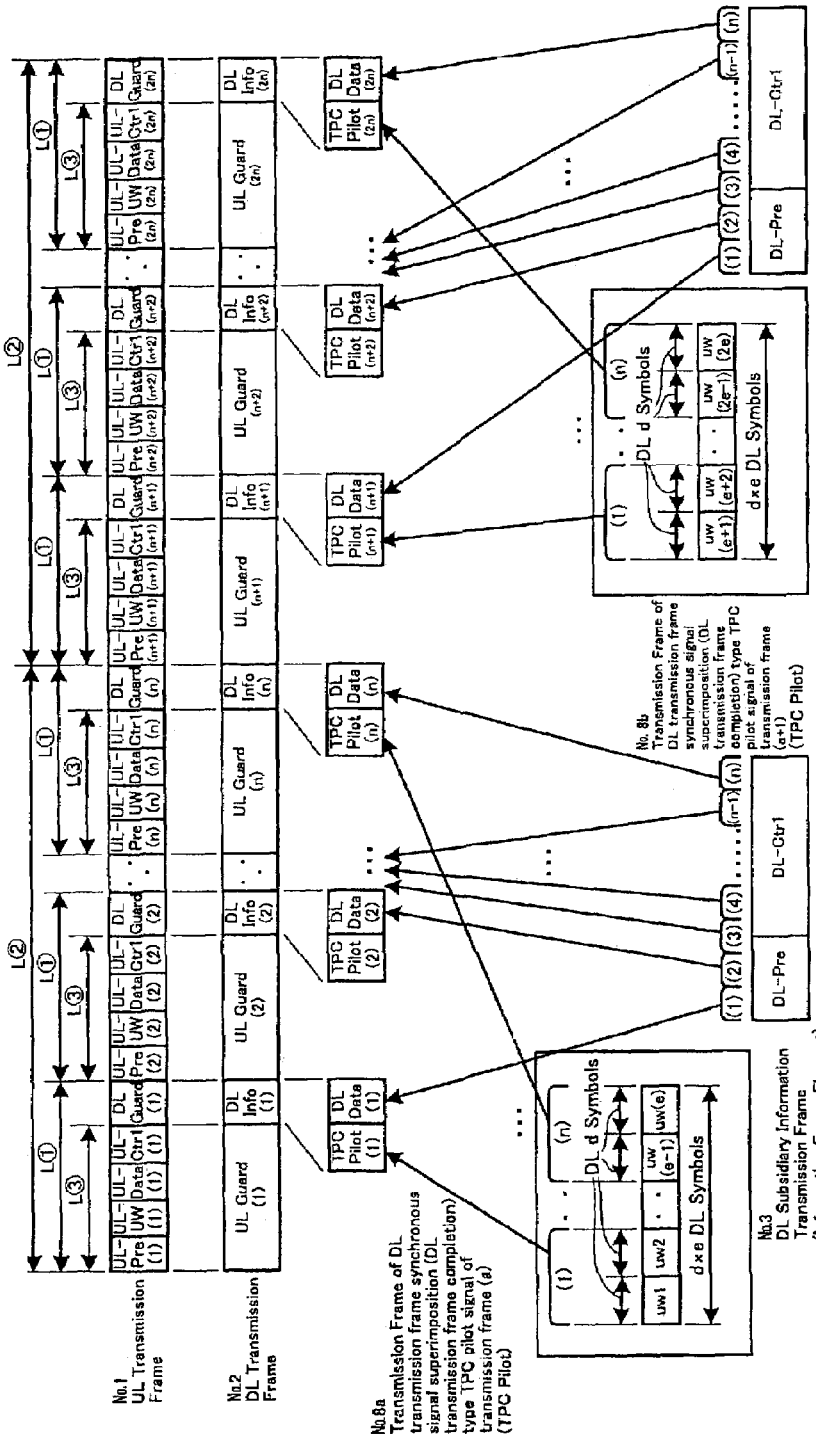
FIG. 12 is a block diagram explaining transmission frames transmitted and received between the mobile station and the base station constituting a sixth preferred embodiment of the bidirectional digital wireless system according to the present invention.

Referring then to FIGS. 7, 8 and 12 of the drawings, there is shown a sixth preferred embodiment of the bidirectional digital wireless system transmitting and receiving asymmetric frames according to the present invention.

The mobile station 1C and the base station 2C constituting the sixth embodiment of the bidirectional digital wireless system is substantially similar to the mobile station 1C and the base station 2C of the fourth embodiment except for the fact that the base station 2C is operative to generate a pilot frame element TPC Pilot carrying the transmit power control information and the frame synchronization information for each of the downlink transmission frames L2, and divide the pilot frame element TPC Pilot into a predetermined number n of pilot frame fragments TPC Pilot (1) to TPC Pilot (n) collectively forming the pilot frame element TPC Pilot so as to generate and transmit a plurality of downlink transmission frames L2 each including the information frame portions DL Info (1) to DL Info (n) collectively forming the pilot frame element TPC Pilot carrying the transmit power control information and the frame synchronization information.

Description about the same process of the sixth embodiment as those of the fourth preferred embodiment will be omitted to avoid tedious repetition.

The description hereinlater will be directed to a process of generating a plurality of downlink transmission frames L2 each including the information frame portions DL Info (1) to DL Info (n) collectively forming the pilot frame element TPC Pilot carrying the transmit power control information and the frame synchronization information performed in the base station 2C with reference to the drawings shown in FIGS. 8 and 12.

The DL information generating unit 51 is operated to generate a pilot frame element TPC Pilot carrying the transmit power control information and the frame synchronization information for each of the downlink transmission frames L2, and divide the pilot frame element TPC Pilot into a predetermined number n of pilot frame fragments TPC Pilot (1) to TPC Pilot (n) collectively forming the pilot frame element TPC Pilot so as to generate and transmit a plurality of downlink transmission frames L2 each including the information frame portions DL Info (1) to DL Info (n) collectively forming the pilot frame element TPC Pilot carrying the transmit power control information and the frame synchronization information.

The pilot frame fragments TPC Pilot (1) to TPC Pilot (n) will be described in detail with reference to the drawings shown in FIG. 12. The pilot frame element TPC Pilot is generated for each of the downlink transmission frames L2. This means that the pilot frame element TPC Pilot generated for the downlink transmission frame (a) designated by No. 8a comprises a number e of d DL symbols comprising unique word portions of uw 1, uw 2, . . . "uw (e−1), and uw(e) while, on the other hand, the pilot frame element TPC Pilot generated for the downlink transmission frame (a+1) designated by No. 8a comprises a number e of d DL symbols comprising unique word portions of uw (e+1), "uw (e+2), . . . "uw (2e−1), and uw(2e). The pilot frame element TPC Pilot generated for the downlink transmission frame (a) may be different from the pilot frame element TPC Pilot generated for the downlink transmission frame (a+1).

The base station 2C is operative to transmit a plurality of downlink transmission frames L2 each including the information frame portions DL Info (1) to DL Info (n) having respective unique numbers, i.e., 1, . . . , n−1, and n, and collectively forming the pilot frame element TPC Pilot carrying the transmit power control information and the frame synchronization information to the mobile station 1C with reference to the uplink transmission frames L1 in a publicly known manner.

The mobile station 1C is operative to receive the downlink transmission frame L2 in a publicly-known time division multiplexing manner so as to sequentially extract the pilot frame element TPC Pilot, and perform a transmit power control function and a frame synchronization function.

The description hereinlater will be directed to a process of receiving the downlink transmission frame L2 in the time division multiplexing manner so as to sequentially extract the pilot frame element TPC Pilot performed in the mobile station IC with reference to the drawings shown in FIGS. 7 and 12.

The mobile station 1C is operative to receive the downlink transmission frames L2 each including the information frame portions DL Info (1) to DL Info (n), and collectively forming the pilot frame element TPC Pilot carrying the transmit power control information and the frame synchronization information from the base station 2C in the publicly-known time division multiplexing manner. The system state managing unit 44 is operated to input a subsidiary information segment d12 containing the pilot frame element TPC Pilot from the DL information detecting unit 41 and manage the sound information transmitting HF circuit 10 by transmit mobile system control signal ctx13 through the external block IF unit 45B to perform a transmit power control function in accordance with the transmit power control information carried on the pilot frame element TPC Pilot to ensure reliable and efficient communication with the base station 2C.

The sixth embodiment of the bidirectional digital wireless system according to the present invention, thus constructed, permits the mobile station 1C to acquire synchronization with each of the downlink transmission frames L2; thereby preventing the mobile station 1C to erroneously detect subsidiary information segments contained in the downlink transmission frames L2.

Figure 13:
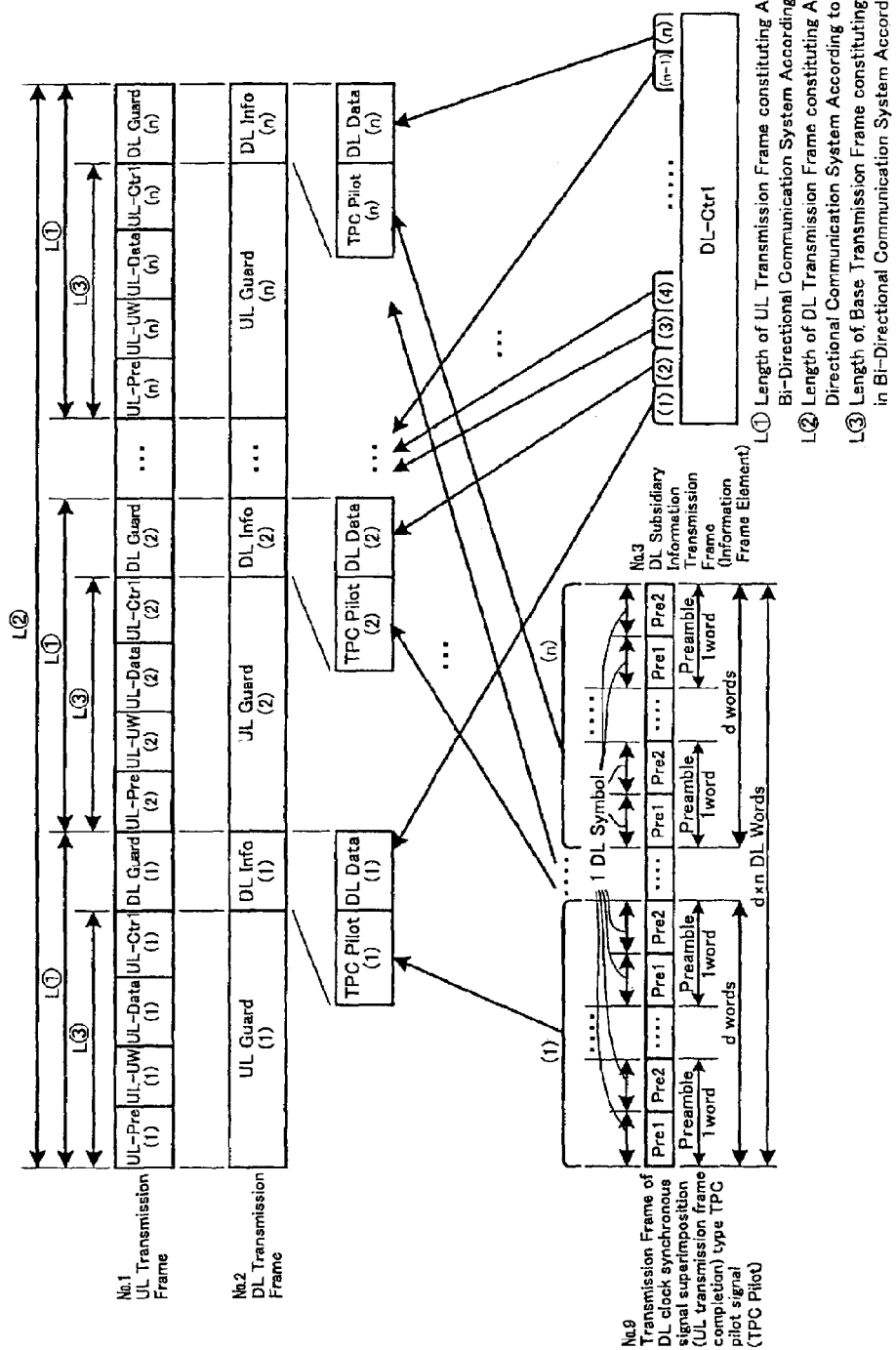
FIG. 13 is a block diagram explaining transmission frames transmitted and received between the mobile station and the base station constituting a seventh preferred embodiment of the bidirectional digital wireless system according to the present invention.

Referring then to FIGS. 7, 8 and 13 of the drawings, there is shown a seventh preferred embodiment of the bidirectional digital wireless system transmitting and receiving asymmetric frames according to the present invention. Description about the same process of the seventh embodiment as those of the sixth preferred embodiment will be omitted to avoid tedious repetition.

The mobile station 1C and the base station 2C constituting the seventh embodiment of the bidirectional digital wireless system is substantially similar to the mobile station 1C and the base station 2C of the sixth embodiment except for the fact that the base station 2C is operative to generate a preamble frame element d words carrying the transmit power control information and the clock synchronization information, and the base station 2C is operative to generate and transmit a plurality of downlink transmission frames L2 each including the information frame portions DL Info (1) to DL Info (n) each of which contains the preamble frame element d words to the mobile station 1C with reference to the uplink transmission frames Ll.

Description about the same process of the seventh embodiment as those of the sixth preferred embodiment will be omitted to avoid tedious repetition.

The description hereinlater will be directed to a process of generating a plurality of downlink transmission frames L2 each including an information frame element carrying transmit power control information and the clock synchronization information performed in the base station 2C with reference to the drawings shown in FIGS. 8 and 13.

The DL unique word generating unit 58 is operated to input the UL timing information signal d16 generated by the UL timing managing unit 53 to generate a preamble frame element carrying clock synchronization information. The downlink information generating unit 51 is operated to input the preamble frame element from the UL unique word generating unit 58 to generate a pilot signal indicative of transmit power control information, and superimposing the preamble frame element on the pilot signal to generate a pilot frame element TPC Pilot carrying the transmit power control information and the clock synchronization information. The DL information generating unit 51 is then operated to divide the pilot frame element TPC Pilot into a predetermined number n of pilot frame fragments TPC Pilot (1) to TPC Pilot (n) collectively forming the pilot frame element TPC Pilot carrying the transmit power control information and the clock synchronization information.

The pilot frame element TPC Pilot will be described in detail with reference to the drawings shown in FIG. 13. It is assumed that the pilot frame element TPC Pilot carries, by way of example, clock synchronization information to be used detect a zero crossing or judge increase or decrease in Phase Shift Keying. The pilot frame element TPC Pilot designated by No. 9 comprises a predetermined number n of d downlink words collectively carrying clock synchronization information wherein n and d are any integer values. Each word includes downlink symbols Pre 1 and Pre2 wherein the DL symbols Pre1 and Pre2 are 180 degree shifted in phase. Furthermore, the pilot frame element TPC Pilot, which comprises a predetermined number n of d downlink words, has a time length long enough to transmit pilot signals indicative of transmit power control information to be used in open loop power control.

The DL information generating unit 51 is then operated to divide the pilot frame element TPC Pilot into a predetermined number n of pilot frame fragments TPC Pilot (1) to TPC Pilot (n) each containing preamble frame element "d words", and generate a plurality of downlink transmission frames L2 each including the information frame portions DL Info (1) to DL Info (n) each of which contains the preamble frame element "d words" carrying the transmit power control information and the clock synchronization information to be transmitted to the mobile station 1C with reference to the uplink transmission frames L1.

The base station 2C is operative to transmit a plurality of downlink transmission frames L2 each including the information frame portions DL Info (1) to DL Info (n) each of which contains the preamble frame element "d words" carrying the transmit power control information and the clock synchronization information to the mobile station 1C with reference to the uplink transmission frames L1 in a publicly known manner.

The mobile station 1C is operative to receive the downlink transmission frame L2 in a publicly-known time division multiplexing manner so as to sequentially extract the pilot frame element TPC Pilot, and perform a transmit power control function and a frame synchronization function.

The description hereinlater will be directed to a process of receiving the downlink transmission frame L2 in the time division multiplexing manner so as to sequentially extract the pilot frame element TPC Pilot performed in the mobile station 1C with reference to the drawings shown in FIGS. 7 and 13.

The mobile station 1C is operative to receive the downlink transmission frames L2 each including the information frame portions DL Info (1) to DL Info (n) each of which contains the preamble frame element "d words" carrying the transmit power control information and the clock synchronization information from the base station 2C in the publicly-known time division multiplexing manner.

The synchronous detecting unit 40 is operated to input a receiving control signal d6 containing preamble frame element "d words" carrying the transmit power control information and the clock synchronization information from the demodulating unit 13, and acquire clock synchronizations with transmission frames on the basis of the clock synchronization information carried on the preamble frame element "d words" contained in the receiving control signal d6 to output a downlink timing information d7. The DL information detecting unit 41 is operated to input the downlink timing information d7 from the synchronous detecting unit 40 to sequentially extract and reconstruct preamble frame element "d words" and output a subsidiary information segment d12 containing the preamble frame element "d words" thus reconstructed. The system state managing unit 44 is operated to input the subsidiary information segment d12 containing preamble frame element "d words" from the DL information detecting unit 41 and manage the sound information transmitting HF circuit 10 by transmit mobile system control signal ctx13 through the external block IF unit 45B to perform a transmit power control function in accordance with the transmit power control information carried on preamble frame element "d words" to ensure reliable and efficient communication with the base station 2C.

In the seventh embodiment of the bidirectional digital wireless system according to the present invention, the base station 2C is operative to generate a preamble frame element d words carrying the transmit power control information and the clock synchronization information, and the base station 2C is operative to generate and transmit a plurality of downlink transmission frames L2 each including the information frame portions DL Info (1) to DL Info (n) each of which contains the preamble frame element d words to the mobile station 1C with reference to the uplink transmission frames L1, and the mobile station 1C is operative to receive the downlink transmission frames L2 each including the information frame portions DL Info (1) to DL Info (n) each of which contains the preamble frame element d words carrying the transmit power control information and the clock synchronization information from the base station 2C in a time division multiplexing manner so as to sequentially extract the preamble frame element d words, and perform a transmit power control function and a clock synchronization function in accordance with each of the preamble frame element d words to ensure reliable and efficient communication with the base station 2C.

While it has been described in FIG. 13 that the downlink control information frame portion DL-Ctrl carries a subsidiary information segment, the downlink control information frame portion DL-Ctrl may carry a downlink unique word frame portions UL-UW, or the downlink unique word signal d20 and the preamble frame element may be superimposed on the pilot signal.

As will be seen from the foregoing description, it is to be understood that the seventh embodiment of the bidirectional digital wireless system thus constructed can transmit and receive downlink transmission frames asymmetric to respective uplink transmission frames with respect to time length between the base station 2C and mobile station 1C, thereby enabling to transmit and receive the downlink transmission frames L2 each including the information frame portions DL Info (1) to DL Info (n) each of which contains the preamble frame element "d words" carrying the transmit power control information and the clock synchronization information, and making it possible for the mobile station 1C to perform the clock synchronization function and the transmission power control function of open loop type while reliably and efficiently communicating with the base station 2C.

Figure 14:
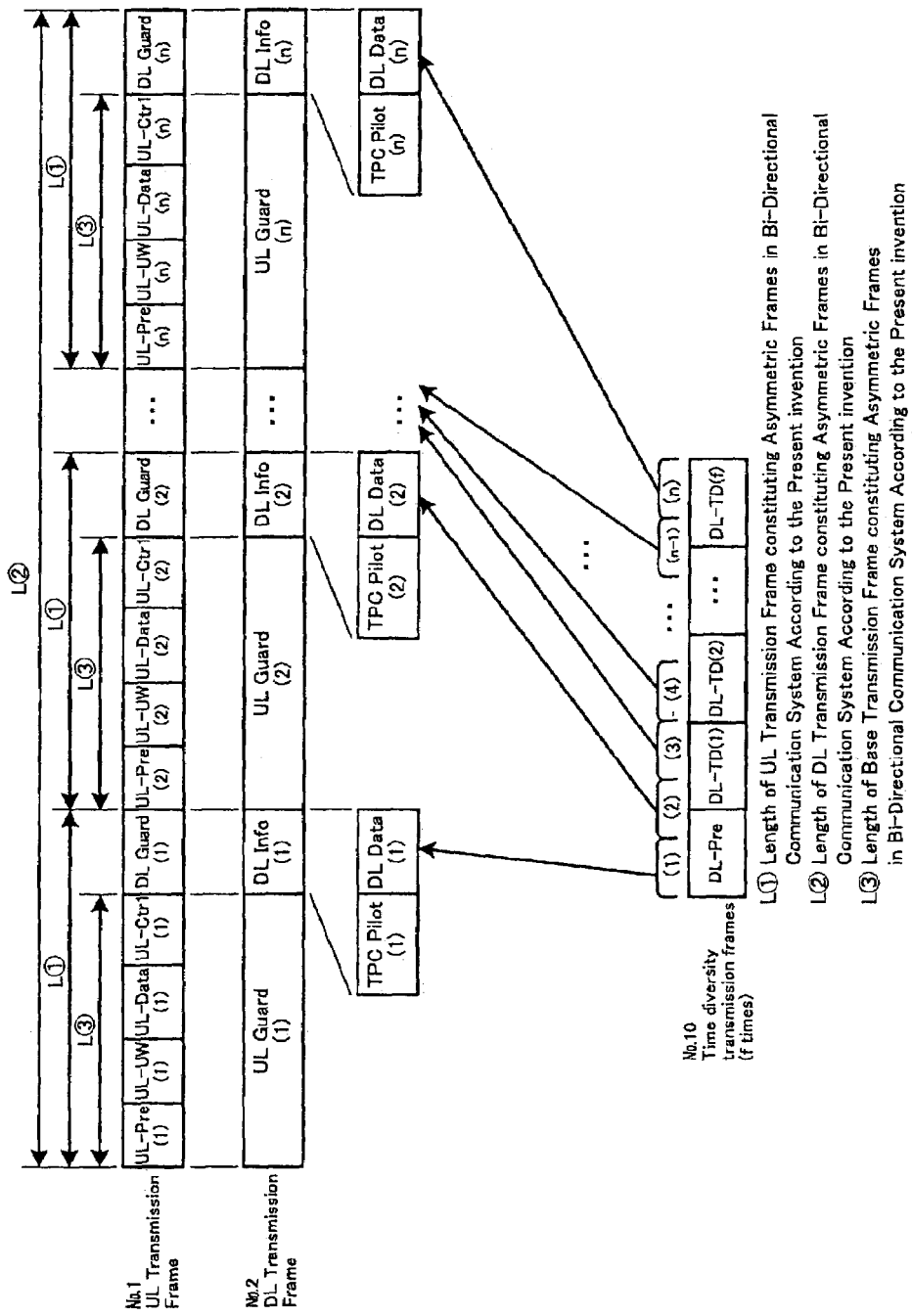
FIG. 14 is a block diagram explaining transmission frames transmitted and received between the mobile station and the base station constituting an eighth preferred embodiment of the bidirectional digital wireless system according to the present invention.

Referring then to FIGS. 7, 8 and 14 of the drawings, there is shown an eighth preferred embodiment of the bidirectional digital wireless system transmitting and receiving asymmetric frames according to the present invention.

The mobile station 1C and the base station 2C constituting the eighth embodiment of the bidirectional digital wireless system is substantially similar to the mobile station 1C and the base station 2C of the seventh embodiment except for the fact that the base station 2C is operative to perform error correcting coding and time diversity transmission processes to the downlink information signal d19 generated by the downlink information generating unit 51 to generate a predetermined number f of data frame portions DL-TD(1) to DL-TD(f) to be time-divided into a plurality of data frame segments DL Data (1) to DL Data (n) respectively corresponding to the guard frame portions DL Guard (1) to DL Guard (n) of the uplink transmission frames L1, and output a downlink transmission frame including the data frame segments DL Data (1) to DL Data (n).

Description about the same process of the eighth embodiment as those of the seventh preferred embodiment will be omitted to avoid tedious repetition.

The description hereinlater will be directed to a process of generating a plurality of downlink transmission frames L2 performed in the base station 2C with reference to the drawings shown in FIGS. 8 and 14.

The system state managing unit 55 is operated to generate a downlink information signal d19 carrying a subsidiary information segment in accordance with the timings indicated by the downlink timing information signal d17. The downlink information generating unit 51 is operated to perform error correcting coding and time diversity transmission processes to the downlink information signal d19 generated by the system state managing unit 55 to generate a predetermined number f of data frame portions DL-TD(1) to DL-TD(f) to be time-divided into a plurality of data frame segments DL Data (1) to DL Data (n) respectively corresponding to the guard frame portions DL Guard (1) to DL Guard (n) of the uplink transmission frames L1, and output a downlink transmission frame L2 including the data frame segments DL Data (1) to DL Data (n). The base station 2C is operative to transmit a plurality of downlink transmission frames L2 each including the data frame segments DL Data (1) to DL Data (n) to the mobile station 1C.

The mobile station 1C is operative to receive the downlink transmission frame L2 in a publicly known time division multiplexing manner so as to sequentially extract data frame portions DL-TD(1) to DL-TD(f), and perform the subsidiary information segment.

The description hereinlater will be directed to a process of receiving the downlink transmission frame L2 in the time division multiplexing manner so as to sequentially extract the data frame portions DL-TD(1) to DL-TD(f) performed in the mobile station 1C with reference to the drawings shown in FIGS. 7 and 14.

The mobile station 1C is operative to receive the downlink transmission frames L2 including the data frame segments DL Data (1) to DL Data (n) in a time division multiplexing manner.

The DL information detecting unit 41 is operated to input a downlink timing information d7 from the synchronous detecting unit 40 to sequentially extract the predetermined number f of data frame portions DL-TD(1) to DL-TD(f). The DL information detecting unit 41 is then operated to perform time diversity receiving and error correcting decoding processes to the data frame portions DL-TD (1) to DL-TD (f) thus extracted. The DL information detecting unit 41 is operated to judge whether a predetermined number of data frame portions are received or not.

When it is judged that the predetermined number of data frame portions are received, the DL information detecting unit 41 is operated to select a data frame portion DL-TD(i) which agrees with a majority of the data frame portions DL-TD(1) to DL-TD(f) from among the data frame portions DL-TD(1) to DL-TD(f) thus received, and assume that the data frame portion DL-TD(i) thus selected accurately carries the subsidiary information segment. Preferably, the DL information detecting unit 41 should select a data frame portion DL-TD(i) which agrees with a predetermined number of the data frame portions DL-TD(1) to DL-TD(f) from among the data frame portions DL-TD(1) to DL-TD(f), and assume that the data frame portion DL-TD(i) thus selected accurately carries the subsidiary information segment. The DL information detecting unit 41 is then operated to generate and output a subsidiary information segment d12 on the basis of the data frame portion DL-TD(i), and the system state managing unit 44 is operated to input the subsidiary information segment d12 to manage each of the elements constituting the mobile station 1A by receiving and transmitting mobile system control signals ctx 15, ctx 16, and ctx 17 through the external block IF units 45A, 45B, and 45C to perform the subsidiary information segment in accordance with the subsidiary information segment d12 thus extracted and reconstructed to ensure reliable and efficient communication with the base station 2C.

While it has been described in the above that the DL information detecting unit 41 is operative to select a data frame portion DL-TD(i) which agrees with a majority of the data frame portions DL-TD(1) to DL-TD(f) from among the data frame portions DL-TD(1) to DL-TD(f) thus received, and assume that the data frame portion DL-TD(i) thus selected accurately carries the subsidiary information segment, and generate and output a subsidiary information segment d12 on the basis of the data frame portion DL-TD (i), the DL information detecting unit 41 may judge whether a predetermined number of the data frame portions (DL-TD (1) to DL-TD(f)) are equal to one another or not. The DL information detecting unit 41 is then operated to select a data frame portion DL-TD (i) which agrees with a majority of the data frame portions DL-TD(1) to DL-TD(f) from among the data frame portions DL-TD(1) to DL-TD(f) thus extracted, and assume that the data frame portion DL-TD(i) accurately carries the subsidiary information segment when it is judged that the predetermined number of the data frame portions DL-TD(1) to DL-TD(f) are equal to one another, and perform the subsidiary information segment in accordance with the data frame portion (DL-TD) thus extracted and selected to ensure reliable and efficient communication with the base station 2C. When it is judged that the predetermined number of the data frame portions DL-TD (1) to DL-TD (f) are not equal to one another, the DL information detecting unit 41 is operated to discard the data frame portions DL-TD (1) to DL-TD (f) and the mobile station 2C is operated to send a retransmission request to the base station 1C to ensure a transmission quality.

As will be understood from the foregoing description, it is to be understood that the eighth embodiment of the bidirectional digital wireless system thus constructed can transmit and receive downlink transmission frames asymmetric to respective uplink transmission frames with respect to time length between the base station 2C and mobile station 1C, thereby enabling the base station 2C to perform error correcting coding and time diversity transmission processes to generate a predetermined number f of data frame portions DL-TD(1) to DL-TD(f) to be time-divided into a plurality of data frame segments DL Data (1) to DL Data (n) respectively corresponding to the guard frame portions DL Guard (1) to DL Guard (n) of the uplink transmission frames L1, and transmit a downlink transmission frame including the data frame segments DL Data (1) to DL Data (n), and making it possible the mobile station 1C to perform error correcting and time diversity receiving process while reliably and efficiently communicating with the base station 2C. Furthermore, the eighth embodiment of the bidirectional digital wireless system thus constructed can prevent the mobile station 1C from erroneously detecting subsidiary information segments contained in the downlink transmission frames L2.

Figure 15:
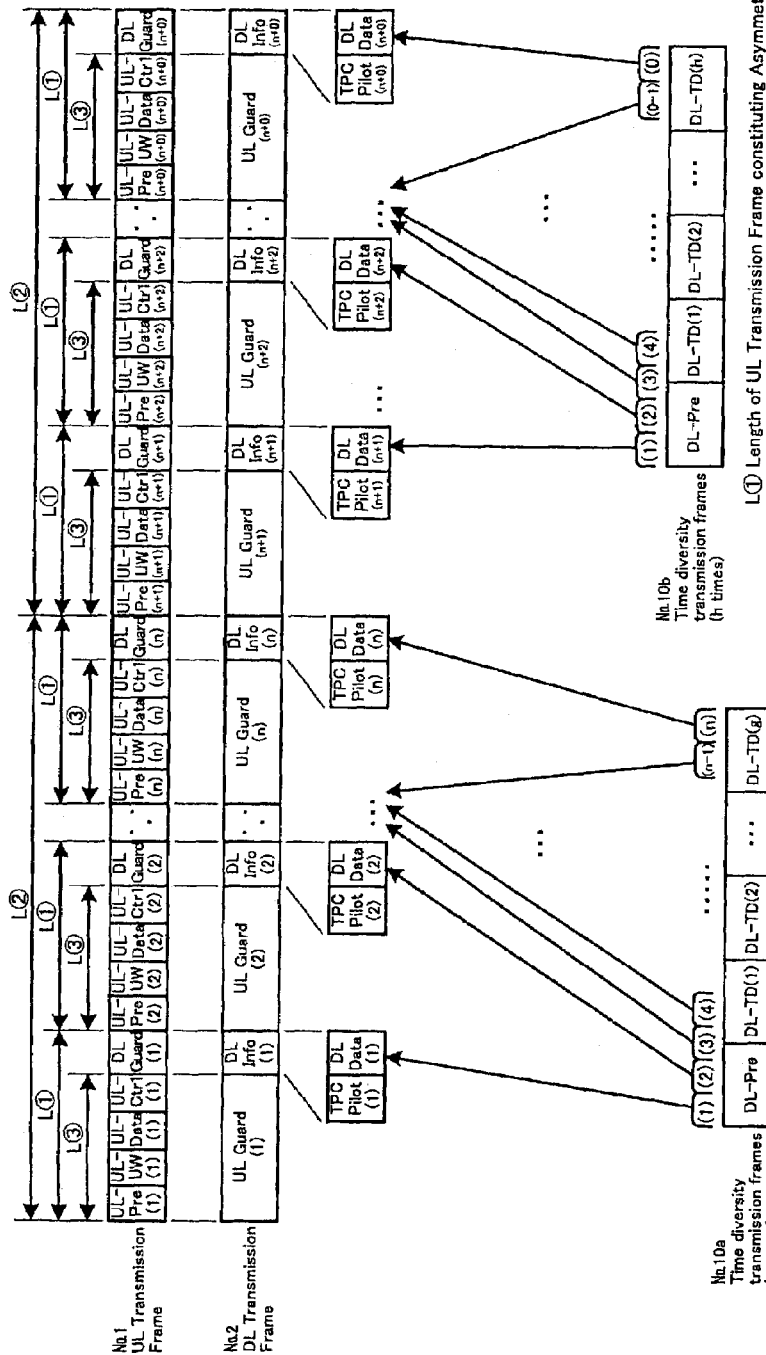
FIG. 15 is a block diagram explaining transmission frames transmitted and received between the mobile station and the base station constituting a ninth preferred embodiment of the bidirectional digital wireless system according to the present invention.

Referring to FIGS. 7, 8 and 15 of the drawings, there is shown a ninth preferred embodiment of the bidirectional digital wireless system transmitting and receiving asymmetric frames according to the present invention.

The mobile station 1C and the base station 2C constituting the ninth embodiment of the bidirectional digital wireless system is substantially similar to the mobile station 1C and the base station 2C of the eighth embodiment except for the fact that the downlink information generating unit 51 of the base station 2C is operative to perform the diversity transmission process for a variable number g of times to generate a number g of data frame portions DL-TD(1) to DL-TD(g) to be time-divided into a plurality of data frame segments DL Data (1) to DL Data (n) respectively corresponding to the guard frame portions DL Guard (1) to DL Guard (n) of the uplink transmission frames L1, and output a downlink transmission frame L2 including the data frame segments DL Data (1) to DL Data (n), and the mobile station IC is operative to receive the downlink transmission frames L2 including the data frame segments DL Data (1) to DL Data (n) in a time division multiplexing manner so as to sequentially extract the number g of data frame portions DL-TD(1) to DL-TD(g), perform time diversity receiving and error processing decoding processes to the data frame portions DL-TD(1) to DL-TD(g) thus extracted to select a data frame portion DL-TD which agrees with a majority of the data frame portions DL-TD(1) to DL-TD(g) from among the data frame portions (DL-TD(1) to DL-TD(g), and perform the subsidiary information segment in accordance with the data frame portion (DL-TD) thus extracted and selected to ensure reliable and efficient communication with the base station 2C.

Description about the same process of the ninth embodiment as those of the eighth preferred embodiment will be omitted to avoid tedious repetition.

The description hereinlater will be directed to a process of generating a plurality of downlink transmission frames L2 performed in the base station 2C with reference to the drawings shown in FIGS. 8 and 15.

The downlink information generating unit 51 is operative to perform the diversity transmission process to the downlink information signal d19 generated by the system state managing unit 55 for a variable number, for example, g of times to generate a number g of data frame portions DL-TD (1) to DL-TD(g) to be time-divided into a plurality of data frame segments DL Data (1) to DL Data (n) respectively corresponding to the guard frame portions (DL Guard (1) to DL Guard (n) of the uplink transmission frame L1, and output a downlink transmission frame L2 including the data frame segments DL Data (1) to DL Data (n).

The downlink information generating unit 51 is then operative to perform the diversity transmission process to the downlink information signal d19 generated by the system state managing unit 55 for a number h of times to generate a number h of data frame portions DL-TD(1) to DL-TD(h) to be time-divided into a plurality of data frame segments DL Data (n+1) to DL Data (n+o) respectively corresponding to the guard frame portions DL Guard (n+1) to DL Guard (n+o) of the subsequent uplink transmission frame L1, and output a downlink transmission frame L2 including the data frame segments DL Data (n+1) to DL Data (n+o).

The downlink information generating unit 51 may change a number of time diversities to be performed to the downlink information signal d19 for each of downlink transmission frames L2. The system state managing unit 55 may send an instruction signal indicative of the number of time diversities via the downlink information signal 19, and the downlink information generating unit 51 may perform the diversity transmission process for the number of times in accordance with the instruction signal thus received from the system state managing unit 55. The number of data frame portions thus generated as a result of the diversity transmission process may be specific to each of the downlink transmission frames L2, and the time length of the downlink transmission frames L2 may change in proportion to the number of time diversities performed by the downlink information generating unit 51.

The mobile station 1C is operative to receive the downlink transmission frame L2 in a publicly known time division multiplexing manner so as to sequentially extract data frame portions DL-TD(1) to DL-TD(g); DL-TD(1) to DL-TD(h), and perform the subsidiary information segment.

The description hereinlater will be directed to a process of receiving the downlink transmission frame L2 in the time division multiplexing manner so as to sequentially extract the data frame portions DL-TD(1) to DL-TD(g); DL-TD(1) to DL-TD(h),performed in the mobile station 1C with reference to the drawings shown in FIGS. 7 and 15.

The mobile station 1C is operative to receive the downlink transmission frames L2 including the data frame portions DL-TD(1) to DL-TD(g); DL-TD(1) to DL-TD(h) in a time division multiplexing manner.

The DL information detecting unit 41 is operated to input a downlink timing information d7 from the synchronous detecting unit 40 to sequentially extract the predetermined number g of data frame portions DL-TD(1) to DL-TD(g). The DL information detecting unit 41 is operated to perform time diversity receiving and error processing decoding processes to the data frame portions DL-TD (1) to DL-TD (g) thus extracted to select a data frame portion DL-TD which agrees with a majority of the data frame portions DL-TD (1) to DL-TD (g) from among the data frame portions DL-TD (1) to DL-TD (g).

The DL information detecting unit 41 is then operated to input a subsequent downlink timing information d7 from the synchronous detecting unit 40 to sequentially extract the predetermined number h of data frame portions DL-TD(1) to DL-TD(h). The DL information detecting unit 41 is operated to perform time diversity receiving and error processing decoding processes to the data frame portions DL-TD (1) to DL-TD (h) thus extracted to select a data frame portion DL-TD which agrees with a majority of the data frame portions DL-TD (1) to DL-TD (h) from among the data frame portions DL-TD (1) to DL-TD (h).

This means that the DL information detecting unit 41 may extract a variable number of data frame portions each of the downlink transmission frames L2, and perform time diversity receiving and error correcting decoding processes to the data frame portions thus extracted. The DL information detecting unit 41 is operated to perform time diversity receiving and error processing decoding processes to the data frame portions thus extracted to select a data frame portion DL-TD which agrees with a majority of the data frame portions from among the data frame portions.

The DL information detecting unit 41 is then operated to generate and output a subsidiary information segment d12 on the basis of the data frame portion DL-TD thus selected, and the system state managing unit 44 is operated to input the subsidiary information segment d12 to manage each of the elements constituting the mobile station 1A by receiving and transmitting mobile system control signals ctx 15, ctx 16, and ctx 17 through the external block IF units 45A, 45B, and 45C to perform the subsidiary information segment in accordance with the subsidiary information segment d12 thus extracted and reconstructed to ensure reliable and efficient communication with the base station 2C.

As will be understood from the foregoing description, it is to be understood that the ninth embodiment of the bidirectional digital wireless system thus constructed can transmit and receive downlink transmission frames asymmetric to respective uplink transmission frames with respect to time length between the base station 2C and mobile station 1C, thereby enabling the base station 2C to perform error correcting coding and time diversity transmission processes to generate a variable number of data frame portions to be time-divided into a plurality of data frame segments DL Data (1) to DL Data (n) respectively corresponding to the guard frame portions DL Guard (1) to DL Guard (n) of the uplink transmission frames L1, and output a downlink transmission frame including the data frame segments DL Data (1) to DL Data (n), and making it possible the mobile station 1C to perform error correcting and time diversity receiving process while reliably and efficiently communicating with the base station 2C. This leads to the fact that the ninth embodiment of the bidirectional digital wireless system can maintain transmission quality in accordance with a state of a downlink transmission frame L2.

Figure 16:
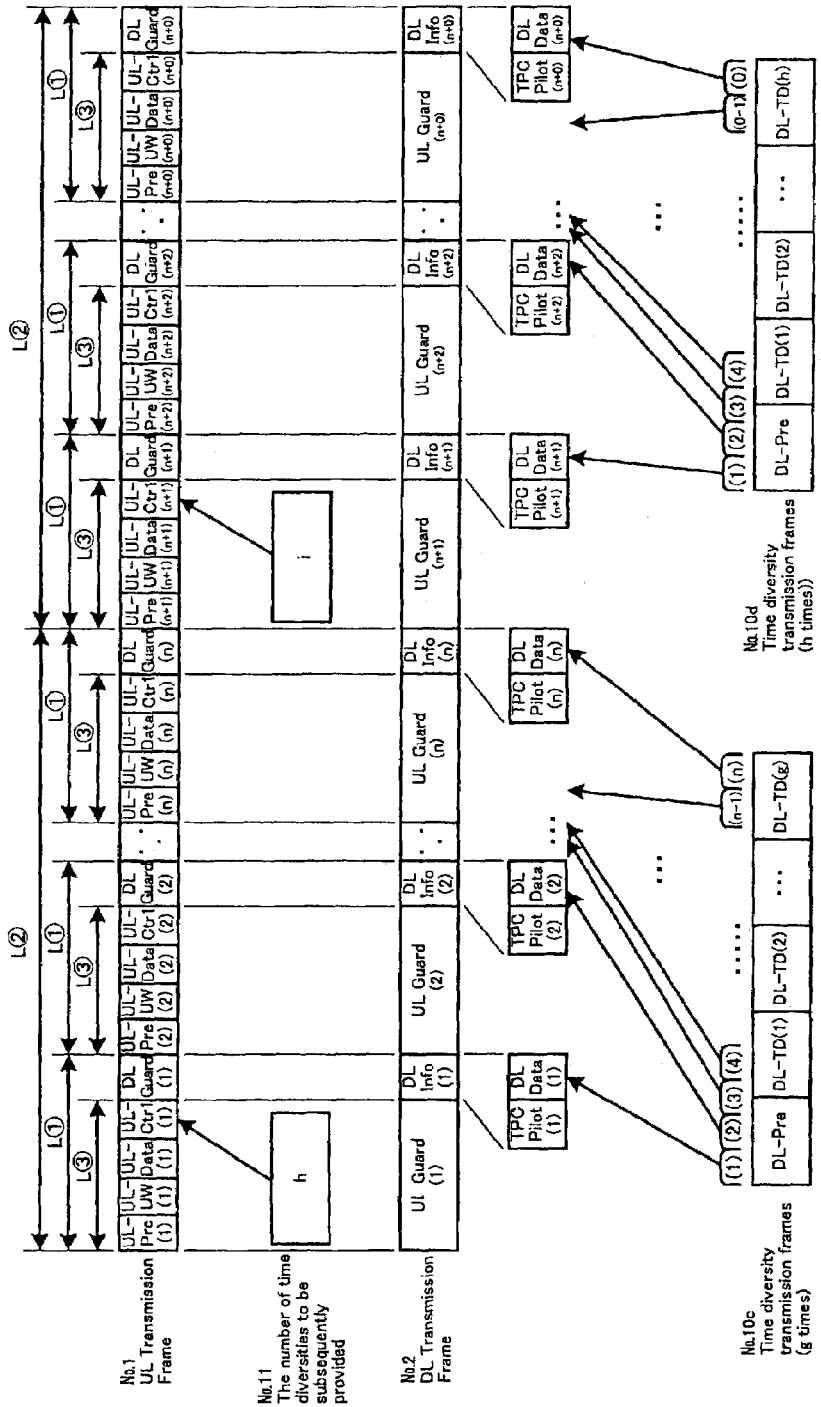
FIG. 16 is a block diagram explaining transmission frames transmitted and received between the mobile station and the base station constituting a tenth preferred embodiment of the bidirectional digital wireless system according to the present invention.

Referring to FIGS. 7, 8 and 16 of the drawings, there is shown a tenth preferred embodiment of the bidirectional digital wireless system transmitting and receiving asymmetric frames according to the present invention. Description about the same process of the tenth embodiment as those of the ninth preferred embodiment will be omitted to avoid tedious repetition.

The mobile station 1C and the base station 2C constituting the tenth embodiment of the bidirectional digital wireless system is substantially similar to the mobile station 1C and the base station 2C of the ninth embodiment except for the fact that the mobile station 1C is operative to generate a diversity signal indicative of a number of times to be performed for time diversity, generate and transmit an uplink transmission frame L1 including the diversity signal carrying a main information segment including the number of times, and the base station 2C is operative to receive the uplink transmission frame L1 including the diversity signal carrying a main information segment including the number of times from the mobile station 1C, and the downlink information generating unit 51 of the base station 2C is operative extract the diversity signal from the uplink transmission frames L1, and perform the time diversity transmission process for a number of times indicated by the diversity signal to generate and transmit a downlink transmission frame L2 including the data frame segments.

Description about the same process of the tenth embodiment as those of the ninth preferred embodiment will be omitted to avoid tedious repetition.

The description hereinlater will be directed to a process of generating a plurality of uplink transmission frames L1 performed in the mobile station 1C with reference to the drawings shown in FIGS. 7 and 16.

The system state managing unit 44 is operative to generate a diversity signal indicative of a number of times to be performed for time diversity in accordance with a diversity signal indicative of a number of times, for example, h, i, contained in the mobile system control signal ctx 15, which is to be outputted to the ECC Encoding unit 8 through the external block IF unit 45B. The diversity signal is shown in FIG. 16 as designated by No. 11. The mobile station 1C is operated to transmit an uplink transmission frame L1 including carrying a main information segment including the diversity signal indicative of the number of times h, i.

The description hereinlater will be directed to a process of receiving and processing the uplink transmission frame L1 including carrying a main information segment including the diversity signal indicative of the number of times h, i performed by the base station 2C with reference to the drawings shown in FIGS. 8 and 16.

The base station 2C is operative to receive the uplink transmission frame L1 carrying a main information segment including the diversity signal indicative of the number of times, for example, h from the mobile station 1C.

The ECC Encoding unit 23 is operated to detect and analyze the information added in the digital demodulated signal s14 to extract the diversity signal No. 11. The downlink information generating unit 51 is operative to perform the time diversity transmission process for a number h of times indicated by the diversity signal to generate a number h of data frame portions DL-TD(1) to DL-TD(h) to be time-divided into a plurality of data frame segments DL Data (1) to DL Data (n) respectively corresponding to the guard frame portions DL Guard (1) to DL Guard (n) of the uplink transmission frames L1, and output a downlink transmission frame L2 including the data frame segments DL Data (1) to DL Data (n) thus generated and time-divided.

The ECC Encoding unit 23 is operated to detect and analyze the information added in the digital demodulated signal s14 to extract the diversity signal No. 11. The downlink information generating unit 51 is operative to perform the time diversity transmission process for a number i of times indicated by the diversity signal to generate a number i of data frame portions DL-TD(1) to DL-TD(i) to be time-divided into a plurality of data frame segments DL Data (n+1) to DL Data (n+o) respectively corresponding to the guard frame portions DL Guard (n+1) to DL Guard (n+o) of the subsequent uplink transmission frames L1, and output a downlink transmission frame L2 including the data frame segments DL Data (n+1) to DL Data (n+o) thus generated and time-divided.

As will be understood from the foregoing description, it is to be understood that the tenth embodiment of the bidirectional digital wireless system thus constructed can transmit and receive downlink transmission frames asymmetric to respective uplink transmission frames with respect to time length between the base station 2C and mobile station 1C, and enables the base station 2C to perform error correcting coding and time diversity transmission processes to generate a variable number of data frame portions in accordance with a diversity signal transmitted from the mobile station 1C, thereby making it possible the mobile station 1C to perform error correcting and time diversity receiving process while reliably and efficiently communicating with the base station 2C. This leads to the fact that the tenth embodiment of the bidirectional digital wireless system can maintain transmission quality in accordance with a state of a downlink transmission frame L2.

Referring to FIGS. 7, 8 and 16 of the drawings, there is shown an eleventh preferred embodiment of the bidirectional digital wireless system transmitting and receiving asymmetric frames according to the present invention. Description about the same process of the eleventh embodiment as those of the ninth preferred embodiment will be omitted to avoid tedious repetition.

The mobile station 1C and the base station 2C constituting the eleventh embodiment of the bidirectional digital wireless system is substantially similar to the mobile station 1C and the base station 2C of the ninth embodiment except for the fact that the mobile station 1C is operative to generate and transmit a plurality of uplink transmission frames L1 carrying a main information segment including the diversity signal indicative of the number of times wherein the plurality of uplink transmission frames L1 correspond to a downlink transmission frame L2 with respect to time length.

Description about the same process of the eleventh embodiment as those of the ninth preferred embodiment will be omitted to avoid tedious repetition.

The description hereinlater will be directed to a process of generating a plurality of uplink transmission frames L1 performed in the mobile station 1C with reference to the drawings shown in FIGS. 7 and 16.

The system state managing unit 44 is operative to generate a diversity signal indicative of a number of times to be performed for time diversity in accordance with a diversity signal indicative of a number of times, for example, h, i, contained in the mobile system control signal ctx 15, which is to be outputted to the ECC Encoding unit 8 through the external block IF unit 45B. The diversity signal is shown in FIG. 16 as designated by No. 11. The mobile station 1C is operated to transmit a plurality of uplink transmission frames L1 carrying a main information segment including the diversity signal indicative of the number of times wherein the plurality of uplink transmission frames L1 correspond to a downlink transmission frame L2 with respect to time length. The mobile station 1C may, for example, divide the diversity signal into a predetermined number of diversity signal segments so as to generate the predetermined number of uplink transmission frames respectively containing the diversity signal segments collectively forming the diversity signal wherein the predetermined number of uplink transmission frames L1 correspond to a downlink transmission frame L2 with respect to time length. The mobile station 1C is operated to transmit the predetermined number of uplink transmission frames respectively containing the diversity signal segments collectively forming the diversity signal indicative of a number of times, i.e., h, i to the base station C2.

The description hereinlater will be directed to a process of receiving and processing the uplink transmission frame L1 including carrying a main information segment including the diversity signal indicative of the number of times h, i performed by the base station 2C with reference to the drawings shown in FIGS. 8 and 16.

The base station 2C is operated to receive the predetermined number of uplink transmission frames respectively containing the diversity signal segments collectively forming the diversity signal indicative of a number of times h from the mobile station 1C.

The ECC Encoding unit 23 is operated to detect and analyze the information added in the digital demodulated signal s14 to extract the diversity signal segments collectively forming the diversity signal No. 11. The downlink information generating unit 51 is operative to perform the time diversity transmission process for a number h of times indicated by the diversity signal to generate a number h of data frame portions DL-TD(1) to DL-TD(h) to be time-divided into a plurality of data frame segments DL Data (1) to DL Data (n) respectively corresponding to the guard frame portions DL Guard (1) to DL Guard (n) of the uplink transmission frames L1, and output a downlink transmission frame L2 including the data frame segments DL Data (1) to DL Data (n) thus generated and time-divided.

The base station 2C is then operated to receive the predetermined number of uplink transmission frames respectively containing the diversity signal segments collectively forming the diversity signal indicative of a number of times i from the mobile station 1C.

The ECC Encoding unit 23 is operated to detect and analyze the information added in the digital demodulated signal s14 to extract the diversity signal segments collectively forming the diversity signal No. 11. The downlink information generating unit 51 is operative to perform the time diversity transmission process for a number i of times indicated by the diversity signal to generate a number i of data frame portions DL-TD(1) to DL-TD(h) to be time-divided into a plurality of data frame segments DL Data (1) to DL Data (n) respectively corresponding to the guard frame portions DL Guard (n+1) to DL Guard (n+0) of the subsequent uplink transmission frame L1, and output a downlink transmission frame L2 including the data frame segments DL Data (1) to DL Data (n) thus generated and time-divided.

The eleventh embodiment of the bidirectional digital wireless system thus constructed can maintain transmission quality in accordance with a state of a downlink transmission frame L2.

Figure 17:
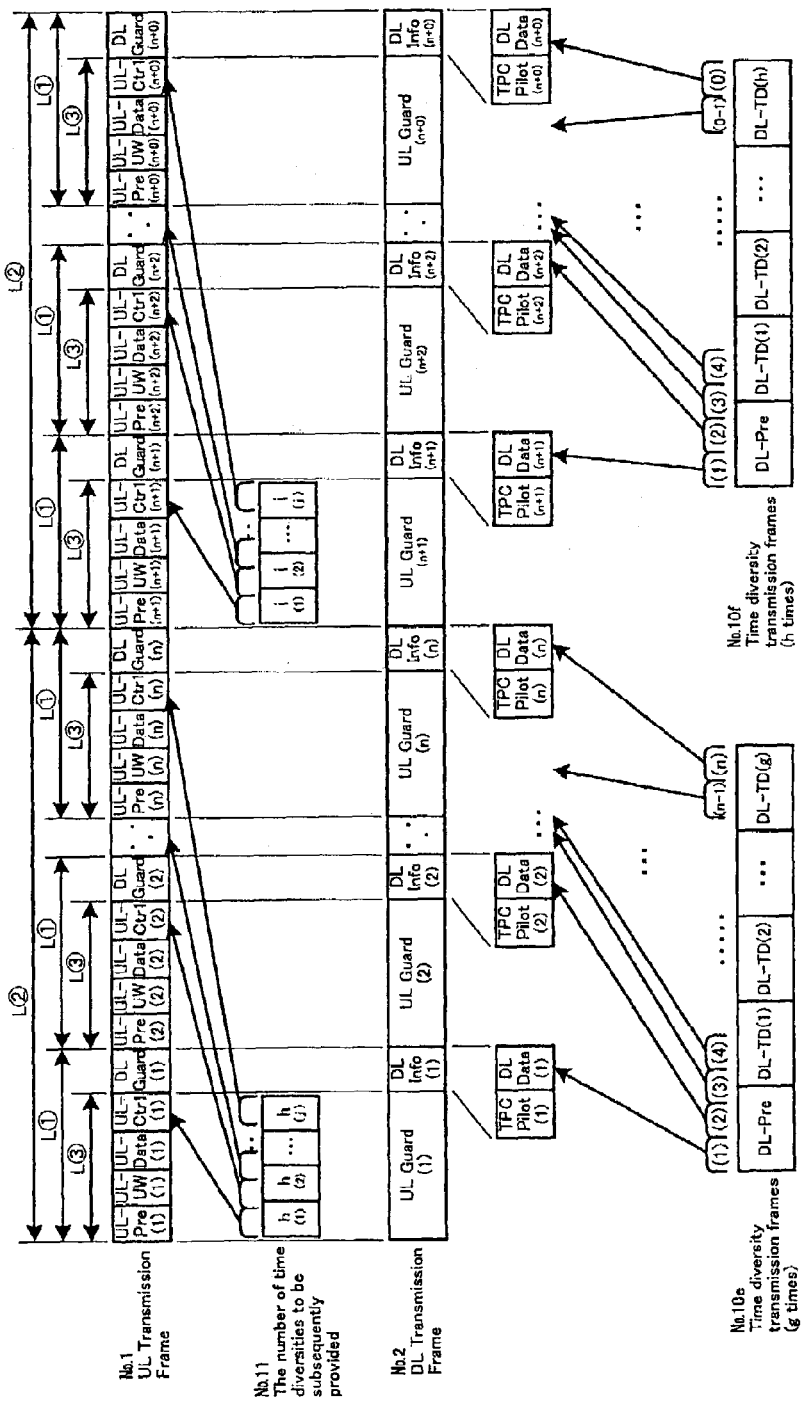
FIG. 17 is a block diagram explaining transmission frames transmitted and received between the mobile station and the base station constituting an eleventh preferred embodiment of the bidirectional digital wireless system according to the present invention.

Referring to FIGS. 7, 8 and 17 of the drawings, there is shown a twelfth preferred embodiment of the bidirectional digital wireless system transmitting and receiving asymmetric frames according to the present invention. Description about the same process of the twelfth embodiment as those of the eleventh preferred embodiment will be omitted to avoid tedious repetition.

The mobile station 1C and the base station 2C constituting the twelfth embodiment of the bidirectional digital wireless system is substantially similar to the mobile station 1C and the base station 2C of the eleventh embodiment except for the fact that the mobile station 1C is operative to generate a diversity signal indicative of a number of times h to be performed for time diversity in the base station 2C, performs a time diversity transmission process to the diversity signal to output a predetermined number j of data frame elements (1) to (j) to be time-divided into a predetermined number n of data frame segments UL Ctr (1) to UL Ctrl (n) collectively containing the data frame elements (1) to (j) carrying the diversity signal, and transmit the uplink transmission frame L1 including the data frame segments UL Ctrl (1) to UL Ctrl (n), and the base station 2C is operative to receive the uplink transmission frame L1 including the data frame segments UL Ctrl (1) to UL Ctrl (n) carrying the diversity signal from the mobile station 1C in a time division multiplexing manner so as to sequentially extract the data frame elements (1) to (j) collectively contained in predetermined number of data frame segments UL Ctrl (1) to UL Ctrl (n), perform a time diversity receiving process to the data frame elements (1) to (j) thus extracted, select a data frame element (i) which agrees with a majority of the data frame elements (1) to (j) from among the data frame elements (1) to (j) thus extracted, and assume that data frame element (i) thus selected accurately carries the diversity signal (No. 11) from among the data frame elements (1) to (j) by majority, and perform the time diversity transmission process in accordance with the diversity signal indicative of a number of times h to be performed for time diversity in the base station 2C.

Description about the same process of the twelfth embodiment as those of the eleventh preferred embodiment will be omitted to avoid tedious repetition.

The description hereinlater will be directed to a process of generating a plurality of uplink transmission frames L1 performed in the mobile station 1C with reference to the drawings shown in FIGS. 7 and 17.

The system state managing unit 44 is operated to generate a diversity signal indicative of a number of times to be performed for time diversity in accordance with a diversity signal indicative of a number of times, for example, h, contained in the mobile system control signal ctx 15, which is to be outputted to the ECC Encoding unit 8 through the external block IF unit 45B. The system state managing unit 44 is then operated to perform time a diversity transmission process to the diversity signal, i.e., h for a predetermined number of times, for example, j, to output a predetermined number j of data frame elements (1) to (j) to be time-divided into a predetermined number of data frame segments UL Ctrl (1) to UL Ctrl (n) collectively containing the data frame elements (1) to (j) carrying the diversity signal. The mobile station 1C is operated to transmit the uplink transmission frame L1 including the data frame segments UL Ctrl (1) to UL Ctrl (n) to the base station 2C.

The description hereinlater will be directed to a process of receiving and processing the uplink transmission frame L1 including the data frame segments UL Ctrl (1) to UL Ctrl (n) performed by the base station 2C with reference to the drawings shown in FIGS. 8 and 17.

The base station 2C is operated to receive the uplink transmission frames respectively including the data frame segments UL Ctrl (1) to UL Ctrl (n) carrying the diversity signal from the mobile station 1C in a publicly-known time division multiplexing manner. The ECC decoding unit 23 is operated to input the base band signal containing the uplink transmission frame L1 including the data frame segments UL Ctrl (1) to UL Ctrl (n) collectively containing the data frame elements (1) to (j) carrying the diversity signal indicative of a number of times, h so as to sequentially extract the data frame elements (1) to (j) collectively contained in predetermined number of data frame segments UL Ctrl (1) to UL Ctrl (n), perform a time diversity receiving process to the data frame elements (1) to (j) thus extracted to select a data frame element (i) which agrees with a majority of the data frame elements (1) to (j) from among the data frame elements (1) to (j) thus extracted, and assume that data frame element (i) thus selected accurately carries the diversity signal from among the data frame elements (1) to (j) by majority, and perform the time diversity transmission process in accordance with the diversity signal indicative of a number of times h to be performed for time diversity in the base station 2C.

The description hereinlater will be directed to a process of generating a plurality of uplink transmission frames L1 performed in the mobile station 1C with reference to the drawings shown in FIGS. 7 and 17.

The system state managing unit 44 is then operated to generate a diversity signal indicative of a number of times to be performed for time diversity in accordance with a diversity signal indicative of a number of times, for example, i, contained in the mobile system control signal ctx 15, which is to be outputted to the ECC Encoding unit 8 through the external block IF unit 45B. The system state managing unit 44 is then operated to perform time a diversity transmission process to the diversity signal, i.e., i for a predetermined number of times, i.e., j, to output a predetermined number j of data frame elements (1) to (j) to be time-divided into a predetermined number of data frame segments UL Ctrl (1) to UL Ctrl (n) collectively containing the data frame elements (1) to (j) carrying the diversity signal. The mobile station 1C is operated to transmit the subsequent uplink transmission frame L1 including the data frame segments UL Ctrl (1) to UL Ctrl (n) to the base station 2C.

The description hereinlater will be directed to a process of receiving and processing the uplink transmission frame L1 including the data frame segments UL Ctrl (1) to UL Ctrl (n) performed by the base station 2C with reference to the drawings shown in FIGS. 8 and 17.

The base station 2C is operated to receive the uplink transmission frames respectively including the data frame segments UL Ctrl (1) to UL Ctrl (n) carrying the diversity signal from the mobile station 1C in a publicly-known time division multiplexing manner. The ECC decoding unit 23 is operated to input the base band signal containing the uplink transmission frame L1 including the data frame segments UL Ctrl (1) to UL Ctrl (n) collectively containing the data frame elements (1) to (j) carrying the diversity signal indicative of a number of times, i so as to sequentially extract the data frame elements (1) to (j) collectively contained in predetermined number of data frame segments UL Ctrl (1) to UL Ctrl (n), perform a time diversity receiving process to the data frame elements (1) to (j) thus extracted to select a data frame element (i) which agrees with a majority of the data frame elements (1) to (j) from among the data frame elements (1) to (j) thus extracted, and assume that data frame element (i) thus selected accurately carries the diversity signal from among the data frame elements (1) to (j) by majority, and perform the time diversity transmission process in accordance with the diversity signal indicative of a number of times i to be performed for time diversity in the base station 2C.

As will be understood from the foregoing description, it is to be understood that the twelfth embodiment of the bidirectional digital wireless system thus constructed can transmit and receive downlink transmission frames asymmetric to respective uplink transmission frames with respect to time length between the base station 2C and mobile station 1C, and enables the base station 2C to generate a diversity signal indicative of a number of times h to be performed for time diversity in the base station 2C, performs a time diversity transmission process to the diversity signal to output a predetermined number j of data frame elements (1) to (j) to be time-divided into a predetermined number n of data frame segments UL Ctr (1) to UL Ctrl (n) collectively containing the data frame elements (1) to (j) carrying the diversity signal, and transmit the uplink transmission frame L1 including the data frame segments UL Ctrl (1) to UL Ctrl (n). The twelfth embodiment of the bidirectional digital wireless system thus constructed can prevent the base station 1C from erroneously detecting main information segments contained in the uplink transmission frames L1. Furthermore, the twelfth embodiment of the bidirectional digital wireless system can maintain transmission quality in accordance with a state of a downlink transmission frame L2.

Figure 18:
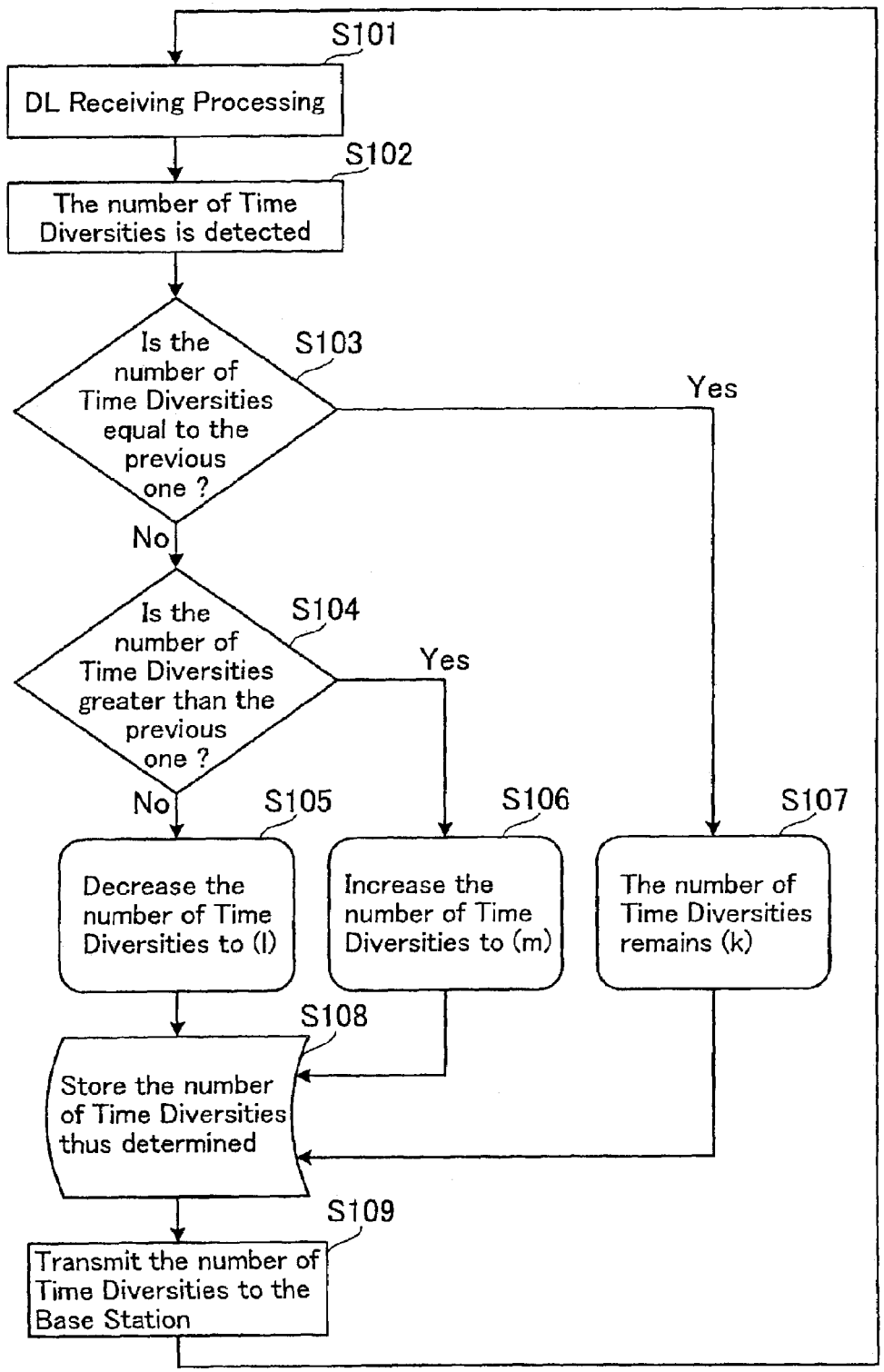
FIG. 18 is a flowchart explaining a process performed in a twelfth preferred embodiment of the bidirectional digital wireless system according to the present invention.

Referring to FIGS. 7, 8 and 18 of the drawings, there is shown a thirteenth preferred embodiment of the bidirectional digital wireless system transmitting and receiving asymmetric frames according to the present invention. Description about the same process of the thirteenth embodiment as those of the eleventh preferred embodiment will be omitted to avoid tedious repetition.

The mobile station 1C and the base station 2C constituting the thirteenth embodiment of the bidirectional digital wireless system is substantially similar to the mobile station 1C and the base station 2C of the eleventh embodiment except for the fact that the mobile station 1C the mobile station 1C is operative to receive the downlink transmission frames L2 including the data frame segments DL Data (1) to DL Data (n) in a time division multiplexing manner so as to count a number of times to be performed for a time diversity receiving process, and the mobile station 1C further comprises a storage unit for storing the number of times to be performed for a time diversity receiving process thus counted, whereby the mobile station 1C is operative to receive the downlink transmission frames L2 including the data frame segments DL Data (1) to DL Data (n) in a time division multiplexing manner so as to count a number of times to be performed for a time diversity receiving process, compare the number of times to be performed for a time diversity receiving process thus currently counted with the number previously counted, and determine a number of times to be performed for a subsequent time diversity transmission process in the base station 2C on the basis of a result of comparison performed between the number of times to be performed for a time diversity receiving process currently counted with the number previously counted and stored in the storage unit.

Description about the same process of the thirteenth embodiment as those of the eleventh preferred embodiment will be omitted to avoid tedious repetition.

The description hereinlater will be directed to a process of generating a plurality of uplink transmission frames L1 performed in the mobile station 1C with reference to the drawings shown in FIGS. 7 and 18

The mobile station 1C is operated to receive the downlink transmission frames L2 including the data frame segments DL Data (1) to DL Data (n) in a time division multiplexing manner. The DL information detecting unit 41 is operated to input the downlink timing information d7, which contains an uplink transmission frame L1, from the synchronous detecting unit 40 to so as to count a number of times to be performed for a time diversity receiving process. The mobile station 1C further comprises a diversity storage unit, not shown, for storing the number of times to be performed for a time diversity receiving process thus counted by the DL information detecting unit 41.

More specifically, the mobile station 1C is operated to receive the downlink transmission frames L2 including the data frame segments DL Data (1) to DL Data (n) in a time division multiplexing manner. The DL information detecting unit 41 is operated to input and perform the downlink timing information d7, which contains an uplink transmission frame L1, from the synchronous detecting unit 40 so as to count a number of times to be performed for a time diversity receiving process. The DL information detecting unit 41 is then operated to compare the number of times to be performed for a time diversity receiving process thus currently counted with the number previously counted and stored in the diversity storage unit, and determine a number of times to be performed for a subsequent time diversity transmission process in the base station 2C on the basis of a result of comparison performed between the number of times to be performed for a time diversity receiving process currently counted with the number previously counted and stored in the diversity storage unit.

One operation of the DL information detecting unit 41 to determine a number of times to be performed for a subsequent time diversity transmission process in the base station 2C will be described by way of example, hereinlater with the drawings shown in FIG. 18.

In step S101, the DL information detecting unit 41 is operated to input the downlink timing information d7, which contains an uplink transmission frame L1, and perform a downlink receiving processing. Step S101 goes forward to step S102, in which the DL information detecting unit 41 is operated to count and detect the number of times to be performed for a time diversity receiving process, for example, k. Step S102 goes forward to step S103, in which the DL information detecting unit 41 is operated to judge whether the number of times to be performed for a time diversity receiving process thus currently counted, viz. k is equal to the number of times to be performed for a time diversity receiving process previously counted and stored in the diversity storage unit or not. If it is judged that the number of times to be performed for a time diversity receiving process thus currently counted is not equal to the number of times to be performed for a time diversity receiving process previously stored in the diversity storage unit in step S103, step S103 goes forward to step S107 in which the DL information detecting unit 41 is operated to determine the number of times to be performed for a time diversity receiving process previously counted and stored in the diversity storage unit, viz. k, to be a number of times to be performed for a subsequent time diversity transmission process in the base station 2C when it is judged that the number of times to be performed for a time diversity receiving process thus currently counted is equal to the number of times, k, to be performed for a time diversity receiving process previously counted and stored in the diversity storage.

If it is judged that the number of times to be performed for a time diversity receiving process, viz. k, thus currently counted on the other hand, is not equal to the number of times to be performed for a time diversity receiving process previously stored in the diversity storage unit in step S103, step S103 goes forward to step S104, in which the DL information detecting unit 41 is operated to judge whether the number of times to be performed for a time diversity receiving process, viz. k, thus currently counted is greater than the number previously counted and stored in the diversity storage unit or not. If it is judged that the number of times to be performed for a time diversity receiving process, viz. k, thus currently counted is greater than the number previously counted and stored in the diversity storage unit in step S104, step S104 goes forward to S106, in which the DL information detecting unit 41 is operated to determine a number of times m greater than the time diversity receiving process stored in the diversity storage to be a number of times to be performed for a subsequent time diversity transmission process in the base station 2C.

If it is judged that the number of times to be performed for a time diversity receiving process, viz. k, thus currently counted is not greater than the number previously counted and stored in the diversity storage unit in step S104, step S104 goes forward to S105, in which the DL information detecting unit 41 is operated to determine a number of times 1 less than the time diversity receiving process stored in the storage to be a number of times to be performed for a subsequent time diversity transmission process in the base station 2C.

The thirteenth embodiment of the bidirectional digital wireless system according to the present invention thus constructed, in which the mobile station 1C and the base station 2C can transmit and receive downlink transmission frames asymmetric to respective uplink transmission frames with respect to time length between the base station 2C and mobile station 1C, thereby enabling the base station 2C to perform error correcting coding and time diversity transmission processes to generate a predetermined number of data frame portions to be time-divided into a plurality of data frame segments DL Data (1) to DL Data (n) respectively corresponding to the guard frame portions DL Guard (1) to DL Guard (n) of the uplink transmission frames L1, and transmit a downlink transmission frame including the data frame segments DL Data (1) to DL Data (n), and making it possible the mobile station 1C to perform error correcting and time diversity receiving process while reliably and efficiently communicating with the base station 2C. The thirteenth embodiment of the bidirectional digital wireless system thus constructed can prevent the mobile station 1C from erroneously detecting subsidiary information segments contained in the downlink transmission frames L2. Furthermore, the thirteenth embodiment of the bidirectional digital wireless system according to the present invention thus constructed, in which the mobile station 1C is operative to count a number of times to be performed for a time diversity receiving process, compare the number of times to be performed for a time diversity receiving process thus currently counted with the number previously counted, and determine a number of times to be performed for a subsequent time diversity transmission process in the base station 2C on the basis of a result of comparison performed between the number of times to be performed for a time diversity receiving process currently counted with the number previously counted and stored in the storage unit, can maintain transmission quality in accordance with a state of a downlink transmission frame L2.

Figure 19:
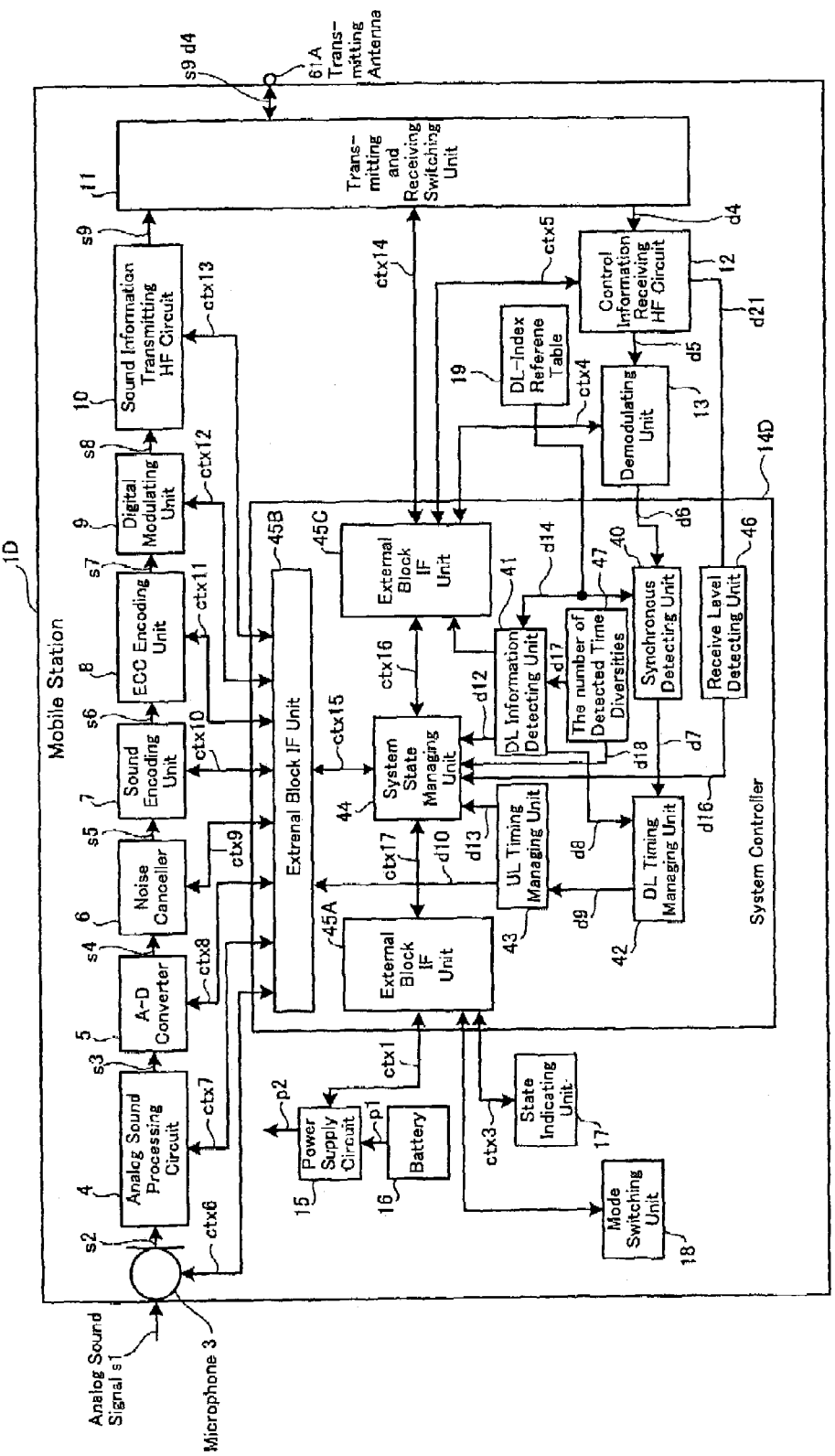
FIG. 19 is a block diagram of a mobile station constituting a thirteenth preferred embodiment of the bidirectional digital wireless system according to the present invention.
Figure 20:
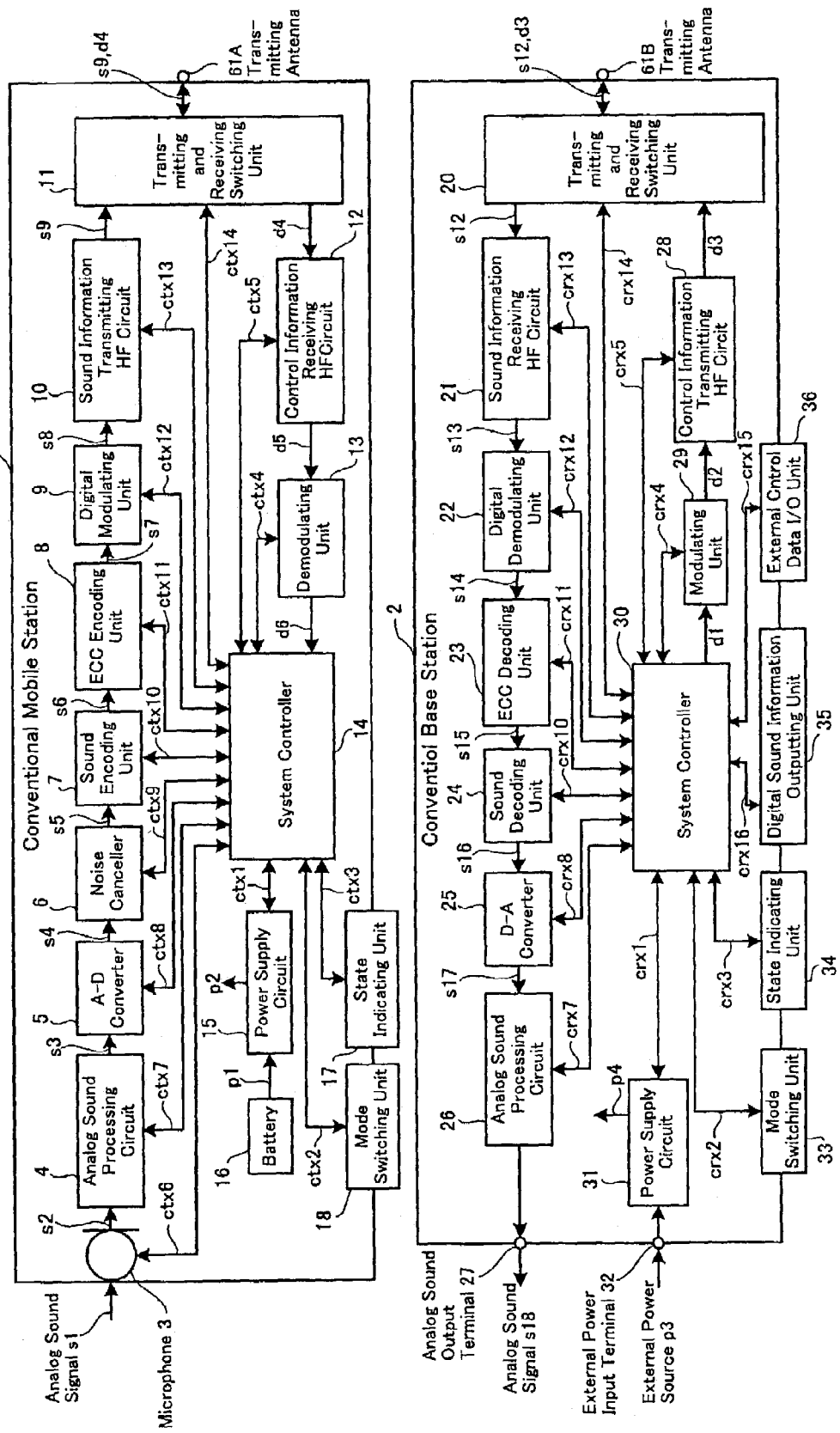
FIG. 20 is a block diagram of a conventional mobile station and a conventional base station constituting a conventional bidirectional digital wireless system according to the present invention.
Figure 21:
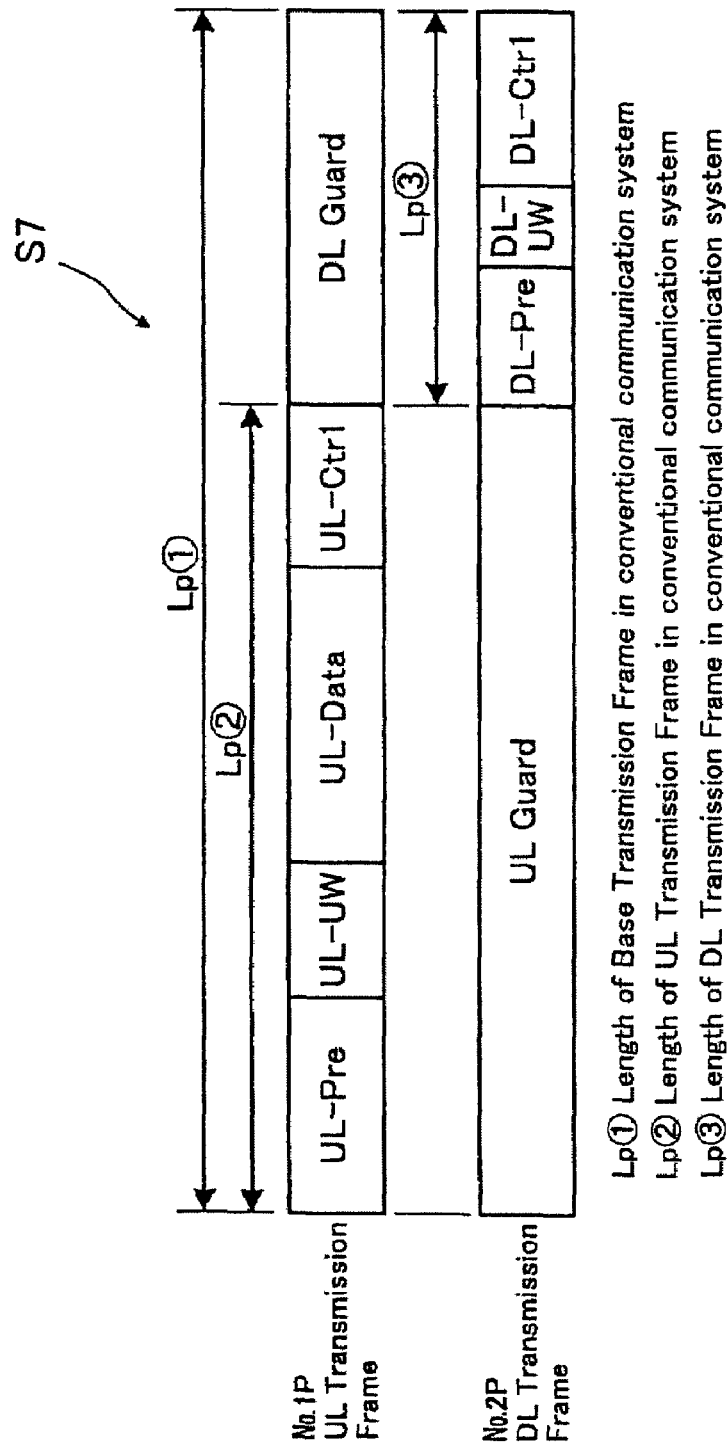
FIG. 21 is a block diagram explaining transmission frames transmitted and received in the conventional bidirectional digital wireless system according to the present invention.

Referring to FIG. 19 of the drawings, there is shown a fourteenth preferred embodiment of the bidirectional digital wireless system transmitting and receiving asymmetric frames according to the present invention. Description about the same process of the fourteenth embodiment as those of the eleventh preferred embodiment will be omitted to avoid tedious repetition.

The mobile station 1D and the base station 2C constituting the fourteenth embodiment of the bidirectional digital wireless system is substantially similar to the mobile station 1D and the base station 2D of the eleventh embodiment except for the fact that the mobile station 1D is operative to calculate a distance between the mobile station 1D and the base station 2D with reference to the received power level d22 detected by the receive level detecting unit 46, and determine a number of times to be performed for a subsequent time diversity transmission process in the base station 2D on the basis of the distance thus calculated. Description about the same process of the fourteenth embodiment as those of the eleventh preferred embodiment will be omitted to avoid tedious repetition.

As shown in FIG. 19, the mobile station 1D comprises a receive level detecting unit 46 for detecting a received power level d22. The system state managing unit 44 is adapted to input the power level signal d22 from the receive level detecting unit 46 and calculate a distance between the mobile station 1D and the base station 2D with reference to the received power level d22 detected by the receive level detecting unit 46, and determine a number of times to be performed for a subsequent time diversity transmission process in the base station 2D on the basis of the distance thus calculated. Preferably, the system state managing unit 44 may increase the number of times to be performed for a subsequent time diversity transmission process in the base station 2D when the distance the distance between the mobile station 1D and the base station 2D thus calculated increases, and the system state managing unit 44, on the other hand, may decrease the number of times to be performed for a subsequent time diversity transmission process in the base station 2D when the distance the distance between the mobile station 1D and the base station 2D thus calculated decreases.

The fourteenth embodiment of the bidirectional digital wireless system according to the present invention thus constructed can maintain transmission quality in accordance with a state of a downlink transmission frame L2.

While the third to fourteenth embodiments of the bidirectional digital wireless system according to the present invention have been described by way of example as comprising the mobile station and base station respectively including DL index reference table 19 and the DL index reference table 57, it is apparent that the third to fourteenth embodiments of the bidirectional digital wireless system according to the present invention may transmit and receive downlink transmission frames asymmetric to respective uplink transmission frames with respect to time length between the base station and mobile station without the DL index reference table 19 and the DL index reference table 57 in other manners known to those skilled in the art.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly, all suitable modifications and equivalents may be resorted to, falling with the scope of the invention.

What is claimed is:

1. A bidirectional digital wireless system using asymmetric transmission frames comprising:
 a mobile station for generating and transmitting a plurality of uplink transmission frames each including a guard frame portion and a data frame portion carrying a main information segment in a time division duplexing manner; said guard frame portion and said data frame portion being separated from each other with respect to time length; and
 a base station for receiving said uplink transmission frames, and generating and transmitting a plurality of downlink transmission frames each including an information frame element carrying a subsidiary information segment to said mobile station with reference to said uplink transmission frames in said time division duplexing manner, wherein said base station is operative to divide said information frame element into a predetermined number of information frame portions respectively corresponding to said guard frame portions of said uplink transmission frames with respect to time length, and generate and transmit a plurality of downlink transmission frames each including said information frame portions collectively forming said information frame element carrying a subsidiary information segment to said mobile station, said information frame element carrying said subsidiary information segment includes an index frame element indicative of a category of said subsidiary information segment and a state frame element indicative of a state of said subsidiary information segment, said index frame element and said state frame element respectively have frame lengths, said mobile station and said base station respectively comprise storage units each for storing a reference table showing said frame lengths of said state frame elements in association with said frame lengths of said index frame elements, said base station is operative to generate and transmit a plurality of downlink transmission frames each including an information frame element including an index frame element and a state frame element with reference to said reference table stored in said storage unit, and said mobile station is operative to receive said downlink transmission frames in said time division duplexing manner so as to sequentially extract said information frame portions collectively forming said information frame element, detect said index frame element, identify said frame lengths of, and detect said index frame element and said state frame element with reference to said reference table stored in said storage unit, and process said subsidiary information segment in accordance with said index frame element and said state frame element thus identified and detected.

2. A bidirectional digital wireless system using asymmetric transmission frames as set forth in claim 1, in which said base station comprises:
a system state managing unit for generating a downlink information signal carrying a subsidiary information segment, and a downlink information generating unit for performing error correcting coding and time diversity transmission processes to said downlink information signal generated by said system state managing unit to generate a predetermined number of data frame portions to be time-divided into a plurality of data frame segments respectively corresponding to said guard frame portions of said uplink transmission frames, and output a downlink transmission frame including said data frame segments;

said base station is operative to generate and transmit a plurality of downlink transmission frames each including said data frame segments, whereby said mobile station is operative to receive said downlink transmission frames including said data frame segments in a time division duplexing manner so as to sequentially extract said predetermined number of data frame portions, perform time diversity receiving and error correcting decoding processes to said data frame portions thus extracted to select a data frame portion which agrees with a majority of said data frame portions from among said data frame portions thus extracted, and assume that said data frame portion thus selected accurately carries said subsidiary information segment from among said data frame portions, and process said subsidiary information segment in accordance with said data frame portion thus extracted and selected to ensure reliable and efficient communication with said base station.

3. A bidirectional digital wireless system using asymmetric transmission frames as set forth in claim 2, in which said downlink information generating unit of said base station is operative to perform said diversity transmission process for a variable number of times to generate a number of data frame portions to be time-divided into a plurality of data frame segments respectively corresponding to said guard frame portions of said uplink transmission frames, and output a downlink transmission frame including said data frame segments, said number of data frame portions being specific to each of said downlink transmission frames, said mobile station is operative to receive said downlink transmission frames including said data frame segments in a time division duplexing manner so as to sequentially extract said number of data frame portions, perform time diversity receiving and error processing decoding processes to said data frame portions thus extracted to select a data frame portion which agrees with a majority of said data frame portions from among said data frame portions, and process said subsidiary information segment in accordance with said data frame portion thus extracted and selected to ensure reliable and efficient communication with said base station.

4. A bidirectional digital wireless system using asymmetric transmission frames as set forth in claim 3, in which said mobile station is operative to generate a diversity signal indicative of a number of times to be performed for time diversity, generate and transmit an uplink transmission frame carrying a main information segment including said diversity signal indicative of said number of times.

5. A bidirectional digital wireless system using asymmetric transmission frames as set forth in claim 4, in which said base station is operative to receive said uplink transmission frame carrying a main information segment including said diversity signal indicative of said number of times from said mobile station to extract said diversity signal from said uplink transmission frame, and said downlink information generating unit of said base station is operative to perform said time diversity transmission process for said number of times indicated by said diversity signal to generate said number of data frame portions to be time-divided into a plurality of data frame segments respectively corresponding to said guard frame portions of said uplink transmission frames, and output a downlink transmission frame including said data frame segments.

6. A bidirectional digital wireless system using asymmetric transmission frames as set forth in claim 4, in which said mobile station is operative to generate and transmit a plurality of uplink transmission frames carrying a main information segment including said diversity signal indicative of said number of times, said plurality of uplink transmission frames corresponding to a downlink transmission frame with respect to time length.

7. A bidirectional digital wireless system using asymmetric transmission frames as set forth in claim 4, in which
said mobile station is operative to generate a diversity signal indicative of a number of times to be performed for time diversity in said base station, performs a time diversity transmission process to said diversity signal to output a predetermined number of data frame elements to be time-divided into a predetermined number of data frame segments collectively containing said data frame elements carrying said diversity signal, and transmit said uplink transmission frame including said data frame segments.

8. A bidirectional digital wireless system using asymmetric transmission frames as set forth in claim 7, in which
said base station is operative to receive said uplink transmission frame including said data frame segments carrying said diversity signal from said mobile station in a time division duplexing manner so as to sequentially extract said data frame elements collectively contained in predetermined number of data frame segments,
perform a time diversity receiving process to said data frame elements thus extracted,
select a data frame element which agrees with a majority of said data frame elements from among said data frame elements thus extracted, and assume that data frame element thus selected accurately carries said diversity signal from among said data frame elements by majority, and
perform said time diversity transmission process in accordance with said diversity signal indicative of a number of times to be performed for time diversity in said base station.

9. A bidirectional digital wireless system using asymmetric transmission frames as set forth in claim 2, in which
said mobile station is operative to receive said downlink transmission frames including said data frame segments in a time division duplexing manner so as to count a number of times to be performed for a time diversity receiving process,
said mobile station comprises a storage unit for storing said number of times to be performed for a time diversity receiving process thus counted, whereby
said mobile station is operative to receive said downlink transmission frames including said data frame segments in a time division duplexing manner so as to count a number of times to be performed for a time diversity receiving process,
compare said number of times to be performed for a time diversity receiving process thus currently counted with said number previously counted and stored in said storage unit, and
determine a number of times to be performed for a subsequent time diversity transmission process in said base station on the basis of a result of comparison performed between said number of times to be performed for a time diversity receiving process currently counted with said number previously counted and stored in said storage unit.

10. A bidirectional digital wireless system using asymmetric transmission frames as set forth in claim 9, in which
said mobile station is operative to
judge whether said number of times to be performed for a time diversity receiving process thus currently counted is equal to said number of times to be performed for a time diversity receiving process previously counted and stored in said storage unit,
determine said number of times to be performed for a time diversity receiving process previously counted and stored in said storage unit to be a number of times to be performed for a subsequent time diversity transmission process in said base station when it is judged that said number of times to be performed for a time diversity receiving process thus currently counted is equal to said number of times to be performed for a time diversity receiving process previously counted and stored in said storage,
judge whether said number of times to be performed for a time diversity receiving process thus currently counted is greater than said number previously counted and stored in said storage unit when it is judges that said number of times to be performed for a time diversity receiving process thus currently counted is not equal to said number of times to be performed for a time diversity receiving process previously counted and stored in said storage,
determine a number of times greater than said time diversity receiving process stored in said storage to be a number of times to be performed for a subsequent time diversity transmission process in said base station when it is judges that said number of times to be performed for a time diversity receiving process thus currently counted is greater said number of times to be performed for a time diversity receiving process previously counted and stored in said storage, and
determine a number of times less than said time diversity receiving process stored in said storage to be a number of times to be performed for a subsequent time diversity transmission process in said base station when it is judges that said number of times to be performed for a time diversity receiving process thus currently counted is not greater said number of times to be performed for a time diversity receiving process previously counted and stored in said storage.

11. A bidirectional digital wireless system using asymmetric transmission frames as set forth in claim 2, in which
said mobile station comprises a receive level detecting unit for detecting a received power level,
said mobile station is operative to calculate a distance between said mobile station and said base station with reference to said received power level detected by said receive level detecting unit, and
determine a number of times to be performed for a subsequent time diversity transmission process in said base station on the basis of said distance thus calculated.

12. A bidirectional digital wireless system using asymmetric transmission frames as set forth in claim 1, in which
said base station comprises:
a system state managing unit for generating a downlink information signal carrying a subsidiary information segment, and
a downlink information generating unit for performing error detecting coding and time diversity transmission processes to said downlink information signal generated by said system state managing unit to generate a predetermined number of data frame portions to be time-divided into a plurality of data frame segments respectively corresponding to said guard frame portions of said uplink transmission frames, and output a downlink transmission frame including said data frame segments;

said base station is operative to generate and transmit a plurality of downlink transmission frames each including said data frame segments, whereby said mobile station is operative to receive said downlink transmission frames including said data frame segments in a time division duplexing manner so as to sequentially extract said predetermined number of data frame portions, perform time diversity receiving and error detecting decoding processes to said data frame portions thus extracted to judge whether a predetermined number of said data frame portions are equal to one another or not, select a data frame portion which agrees with a majority of said data frame portions from among said data frame portions thus extracted, and assume that said data frame portion accurately carries said subsidiary information segment when it is judged that said predetermined number of said data frame portions are equal to one another, and process said subsidiary information segment in accordance with said data frame portion thus extracted and selected to ensure reliable and efficient communication with said base station, and discard said data frame portions when it is judged that said predetermined number of said data frame portions are not equal to one another.

13. A bidirectional digital wireless system using asymmetric transmission frames comprising:

a mobile station for generating and transmitting a plurality of uplink transmission frames each including a guard frame portion and a data frame portion carrying a main information segment in a time division duplexing manner; said guard frame portion and said data frame portion being separated from each other with respect to time length; and a base station for receiving said uplink transmission frames, and generating and transmitting a plurality of downlink transmission frames each including an information frame element carrying a subsidiary information segment to said mobile station with reference to said uplink transmission frames in said time division duplexing manner, wherein said base station comprises: a downlink unique word generating unit for generating a downlink unique word signal carrying frame synchronization information; and a downlink information generating unit for generating a pilot signal indicative of transmit power control information, and superimposing said downlink unique word signal on said pilot signal to output a pilot frame element carrying said transmit power control information and said frame synchronization information, and said base station is operative to generate and transmit a plurality of downlink transmission frames each including a plurality of information frame portions each of which contains a portion of said pilot frame element to said mobile station with reference to said uplink transmission frames.

14. A bidirectional digital wireless system using asymmetric transmission frames as set forth in claim 13, in which said mobile station is operative to receive said downlink transmission frames each including said information frame portions each of which contains said portion of pilot frame element carrying said transmit power control information and said frame synchronization information from said base station in a time division duplexing manner so as to sequentially extract said portions of pilot frame element, and perform a transmit power control function and a frame synchronization function in accordance with said pilot frame element to ensure reliable and efficient communication with said base station.

15. A bidirectional digital wireless system using asymmetric transmission frames as set forth in claim 13, in which said base station is operative to divide said pilot frame element into a predetermined number of pilot frame fragments collectively forming said pilot frame element so as to generate and transmit a plurality of downlink transmission frames each including said information frame portions collectively forming said pilot frame element carrying said transmit power control information and said frame synchronization information.

16. A bidirectional digital wireless system using asymmetric transmission frames as set forth in claim 15, in which said mobile station is operative to receive said downlink transmission frames each including said information frame portions collectively forming said pilot frame element carrying said transmit power control information and said frame synchronization information from said base station in a time division duplexing manner so as to sequentially extract said information frame portions, collectively reconstruct said pilot frame element, and perform a transmit power control function and a frame synchronization function in accordance with each pilot frame element to ensure reliable and efficient communication with said base station.

17. A bidirectional digital wireless system using asymmetric transmission frames as set forth in claim 13, in which said base station is operative to divide said pilot frame element into a predetermined number of pilot frame fragments collectively forming said pilot frame element, and respectively attach unique numbers to said pilot frame fragments so as to generate and transmit a plurality of downlink transmission frames each including said information frame portions having respective unique numbers, and collectively forming said pilot frame element carrying said transmit power control information and said frame synchronization information.

18. A bidirectional digital wireless system using asymmetric transmission frames as set forth in claim 17, in which said mobile station is operative to receive said downlink transmission frames each including said information frame portions having respective unique numbers, and collectively forming said pilot frame element carrying said transmit power control information and said frame synchronization information from said base station in a time division duplexing manner so as to sequentially extract said information frame portions, collectively reconstruct said pilot frame element with reference to said respective unique numbers, and perform a transmit power control function and a frame synchronization function in accordance with each pilot frame element to ensure reliable and efficient communication with said base station.

19. A bidirectional digital wireless system using asymmetric transmission frames as set forth in claim 13, in which said base station is operative to generate a pilot frame element carrying said transmit power control information and said frame synchronization information for each of said downlink transmission frames, and divide said pilot frame element into a predetermined number of pilot frame fragments collectively forming said pilot frame element so as to generate and transmit a plurality of downlink transmission frames each including said information frame portions collectively forming said pilot frame element carrying said transmit power control information and said frame synchronization information.

20. A bidirectional digital wireless system using asymmetric transmission frames comprising:
a mobile station for generating and transmitting a plurality of uplink transmission frames each including a guard frame portion and a data frame portion carrying a main information segment in a time division duplexing manner; said guard frame portion and said data frame portion being separated from each other with respect to time length; and
a base station for receiving said uplink transmission frames, and generating and transmitting a plurality of downlink transmission frames each including an information frame element carrying a subsidiary information segment to said mobile station with reference to said uplink transmission frames in said time division duplexing manner, wherein
said base station comprises: a downlink preamble signal generating unit for generating a downlink preamble signal carrying clock synchronizing information; and a downlink information generating unit for generating a pilot signal indicative of transmit power control information, and superimposing said downlink preamble signal on said pilot signal to output a preamble frame element carrying said transmit power control information and said clock synchronization information, and
said base station is operative to generate and transmit a plurality of downlink transmission frames each including a plurality of information frame portions each of which contains said preamble frame element to said mobile station with reference to said uplink transmission frames.

21. A bidirectional digital wireless system using asymmetric transmission frames as set forth in claim 20, in which
said mobile station is operative to receive said downlink transmission frames each including said information frame portions each of which contains said portion of preamble frame element carrying said transmit power control information and said clock synchronization information from said base station in a time division duplexing manner so as to sequentially extract said portions of preamble frame element, and perform a transmit power control function and a clock synchronization function in accordance with said preamble frame element to ensure reliable and efficient communication with said base station.

* * * * *

UNITED STATES PATENT AND TRADEMARK OFFICE
CERTIFICATE OF CORRECTION

PATENT NO.        : 7,317,713 B2
APPLICATION NO. : 10/353704
DATED             : January 8, 2008
INVENTOR(S)       : Shohei Taniguchi It is certified that error appears in the above-identified patent and that said Letters Patent is hereby corrected as shown below:

In Column 54, Line 7, please insert --portion of-- after "which contains said".

Signed and Sealed this

Ninth Day of March, 2010

David J. Kappos
*Director of the United States Patent and Trademark Office*